US008576262B2

(12) United States Patent
Mori et al.

(10) Patent No.: US 8,576,262 B2
(45) Date of Patent: Nov. 5, 2013

(54) LIQUID CRYSTAL DISPLAY APPARATUS

(75) Inventors: Tomohiko Mori, Osaka (JP); Kazunari Tomizawa, Osaka (JP); Yuichi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 371 days.

(21) Appl. No.: 13/142,042

(22) PCT Filed: Dec. 25, 2009

(86) PCT No.: PCT/JP2009/007225
§ 371 (c)(1),
(2), (4) Date: Jun. 24, 2011

(87) PCT Pub. No.: WO2010/073687
PCT Pub. Date: Jul. 1, 2010

(65) Prior Publication Data
US 2011/0254879 A1    Oct. 20, 2011

(30) Foreign Application Priority Data

Dec. 26, 2008   (JP) .................................. 2008-335247
Jun. 1, 2009    (JP) .................................. 2009-132499

(51) Int. Cl.
*G09G 5/10*      (2006.01)
*G09G 3/36*      (2006.01)

(52) U.S. Cl.
USPC ........................................... 345/690; 345/88

(58) Field of Classification Search
None
See application file for complete search history.

(56) References Cited

U.S. PATENT DOCUMENTS

| 4,800,375 A | 1/1989 | Silverstein et al. |
|---|---|---|
| 6,661,488 B1 | 12/2003 | Takeda et al. |
| 6,801,220 B2 | 10/2004 | Greier et al. |
| 6,958,791 B2 | 10/2005 | Shimoshikiryo |
| 7,034,789 B2 | 4/2006 | Takeuchi et al. |
| 7,145,624 B2 | 12/2006 | Kubo et al. |
| 2003/0146893 A1 | 8/2003 | Sawabe |
| 2004/0174389 A1 | 9/2004 | Ben-David et al. |

(Continued)

FOREIGN PATENT DOCUMENTS

| JP | 09-251160 A | 9/1997 |
|---|---|---|
| JP | 11-242225 A | 9/1999 |

(Continued)

OTHER PUBLICATIONS

English translation of Official Communication issued in corresponding International Application PCT/JP2009/007225, mailed on Aug. 25, 2011.

(Continued)

*Primary Examiner* — Nicholas Lee
(74) *Attorney, Agent, or Firm* — Keating & Bennett, LLP

(57) ABSTRACT

A liquid crystal device (100A) according to the present invention has first and second pixels (P1 and P2). Each of the first and second pixels (P1 and P2) includes first, second and third subpixels (R, G, and B). When the input signal indicates that each pixel should represent the first color, the luminances of the respective third subpixels (B1 and B2) of the first and second pixels (P1 and P2) are different from each other. But when the input signal indicates that each pixel should represent the second color, the average luminance of the respective third subpixels (B1 and B2) is substantially the same as when the first color is specified, and the luminances of the respective third subpixels (B1 and B2) are substantially equal to each other.

19 Claims, 39 Drawing Sheets

(56) References Cited

U.S. PATENT DOCUMENTS

| | | |
|---|---|---|
| 2004/0239698 A1 | 12/2004 | Kamada et al. |
| 2005/0122294 A1 | 6/2005 | Ben-David et al. |
| 2006/0164352 A1 | 7/2006 | Yoo et al. |
| 2008/0036718 A1 | 2/2008 | Lee |
| 2009/0153454 A1 | 6/2009 | Irie et al. |

FOREIGN PATENT DOCUMENTS

| | | |
|---|---|---|
| JP | 2001-209047 A | 8/2001 |
| JP | 2001-306023 A | 11/2001 |
| JP | 2003-043525 A | 2/2003 |
| JP | 2004-062146 A | 2/2004 |
| JP | 2004-078157 A | 3/2004 |
| JP | 2004-525402 A | 8/2004 |
| JP | 2004-302270 A | 10/2004 |
| JP | 2006-209135 A | 8/2006 |
| JP | 2007-226242 A | 9/2007 |
| WO | 2007/052381 A1 | 5/2007 |
| WO | WO 2008090845 A1 * | 7/2008 |

OTHER PUBLICATIONS

Official Communication issued in International Patent Application No. PCT/JP2009/007225, mailed on Mar. 23, 2010.

Yang et al.; "31.1: Development of Six Primary-Color LCD"; Society for Information Display, 2005 International Symposium Digest of Technical Papers; vol. XXXVI; Book II; May 25-27, 2005; pp. 1210-1213.

Chino et al.; "25.1: Invited Paper: Development of Wide-Color-Gamut Mobile Displays With Four-Primary-Color LCDs"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; 66 pages.

Official Communication issued in corresponding European Patent Application No. 09834493.0, mailed on Jul. 11, 2012.

* cited by examiner

FIG.1
(a)
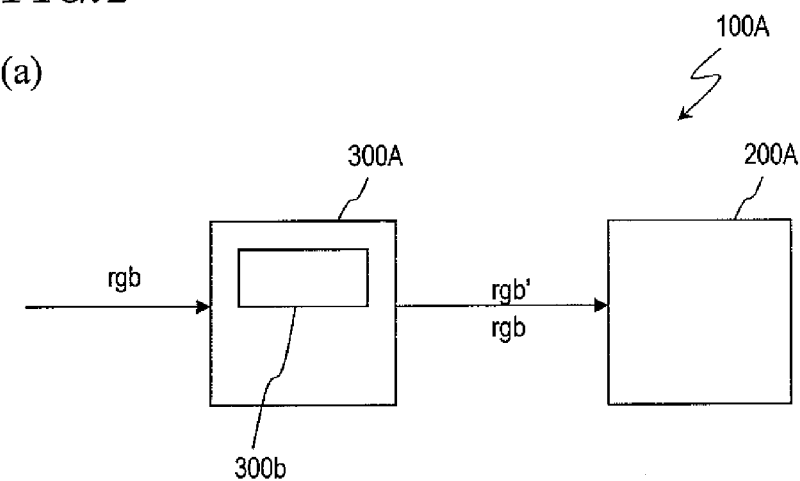
(b)
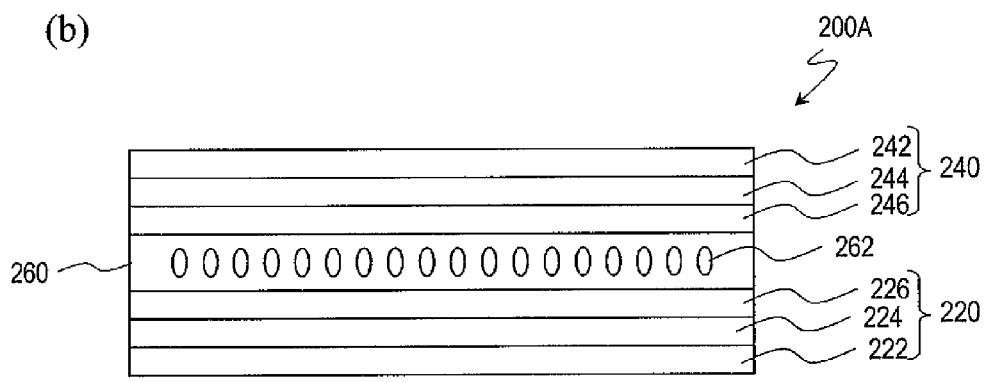

FIG.2
(a)
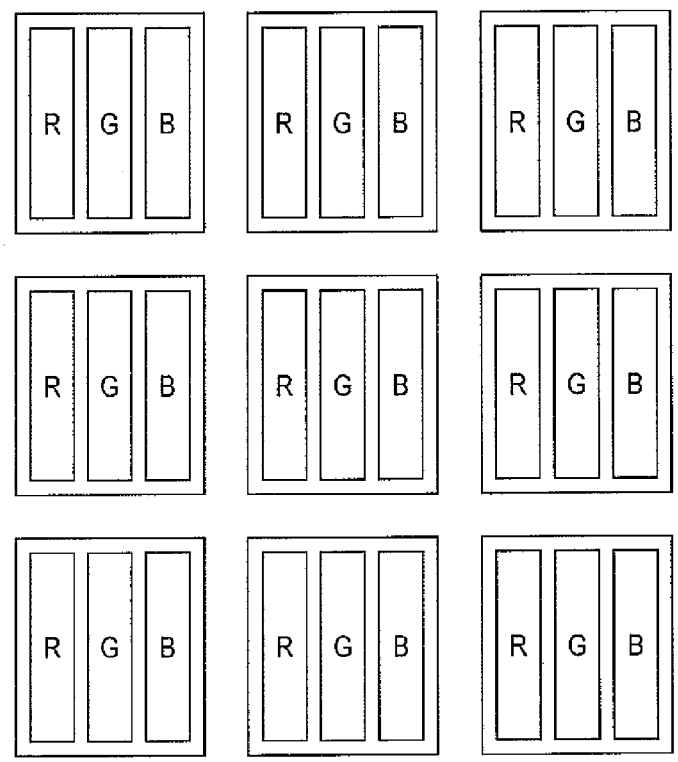
(b)
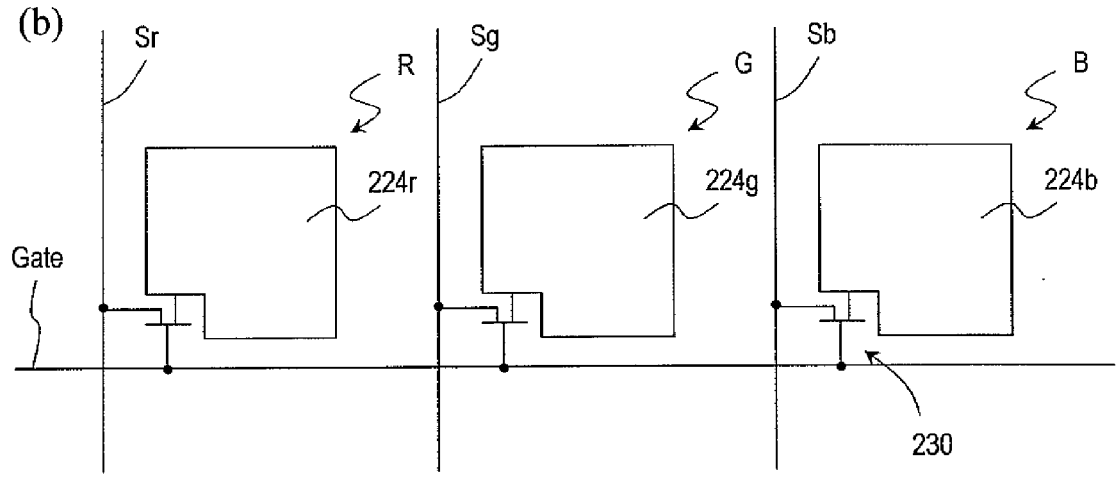

FIG.5
(a)
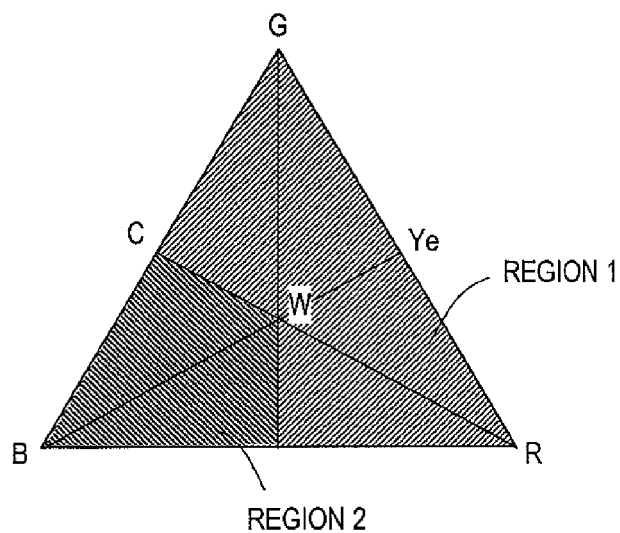
(b)
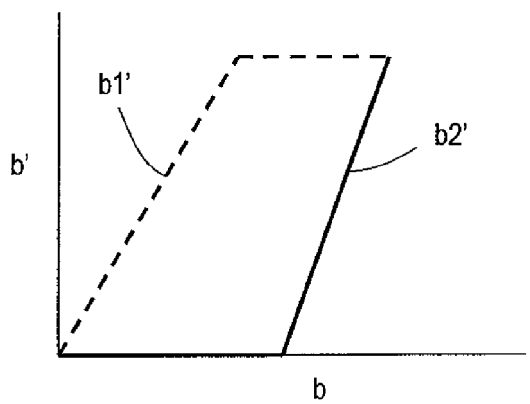
(c)
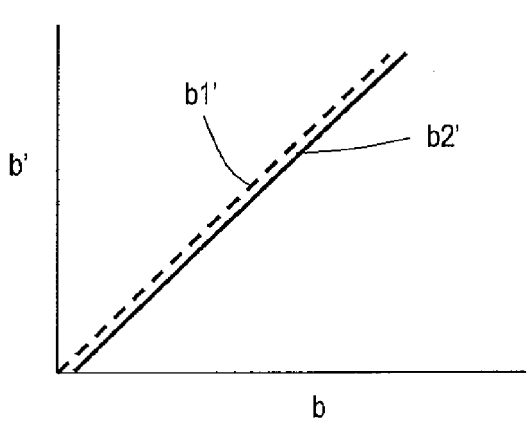

FIG.6
(a)
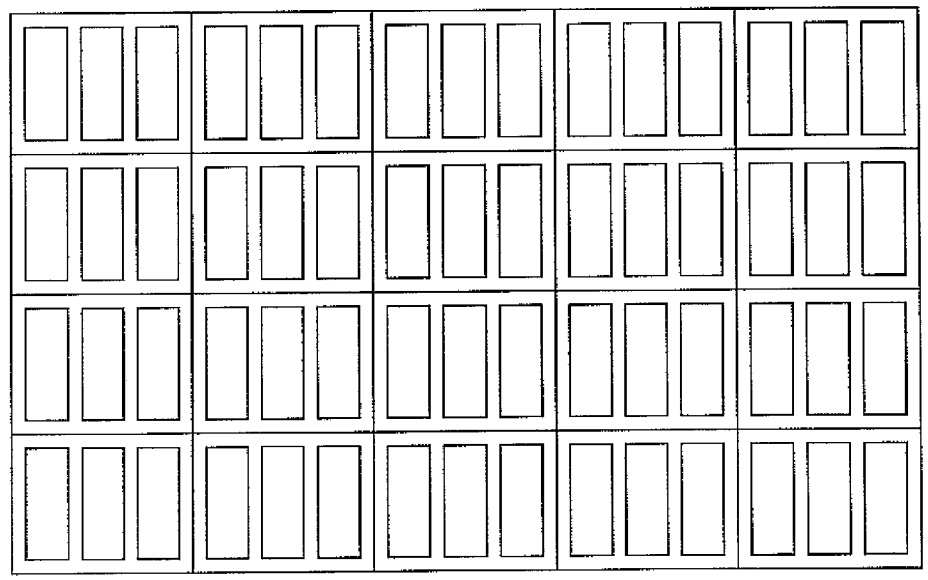
(b)
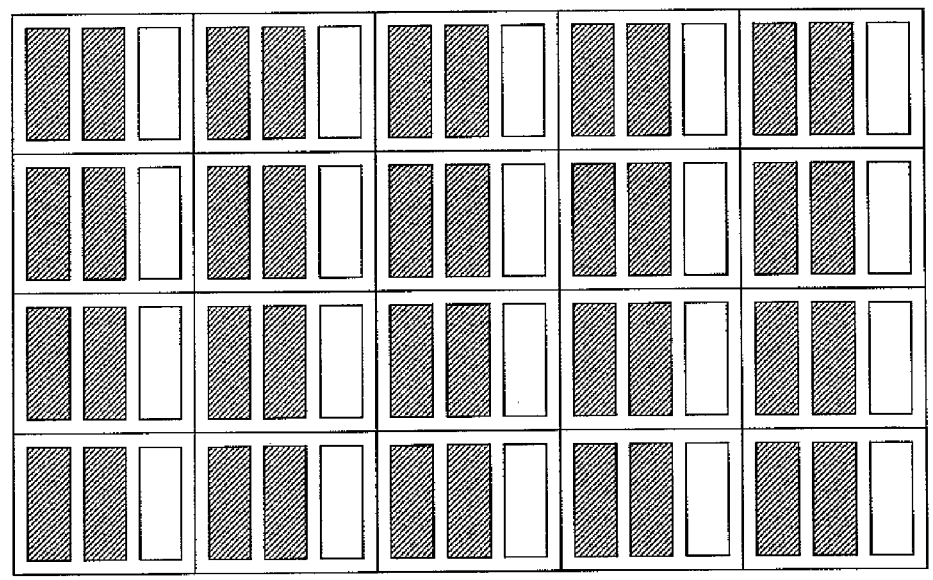

FIG.7
(a)
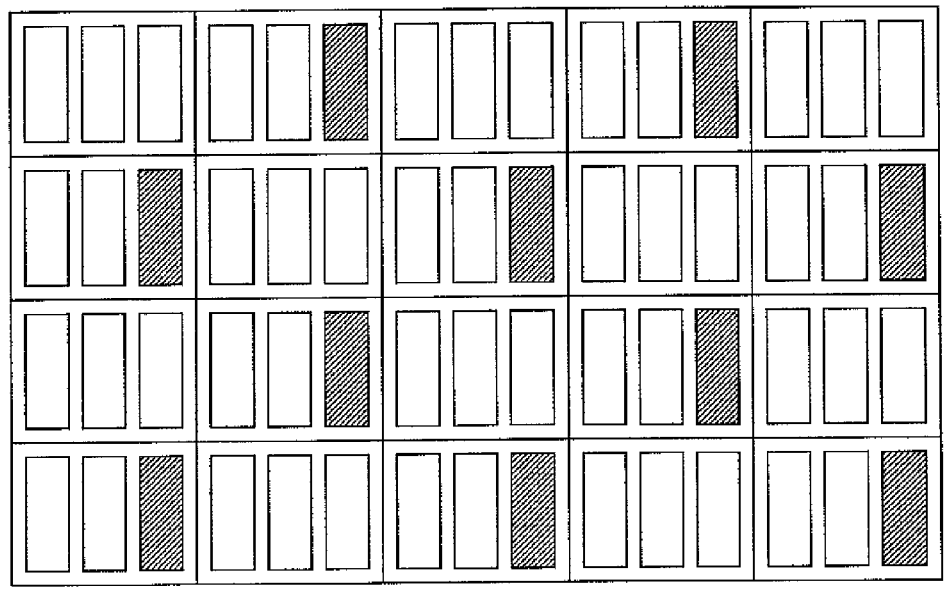
(b)
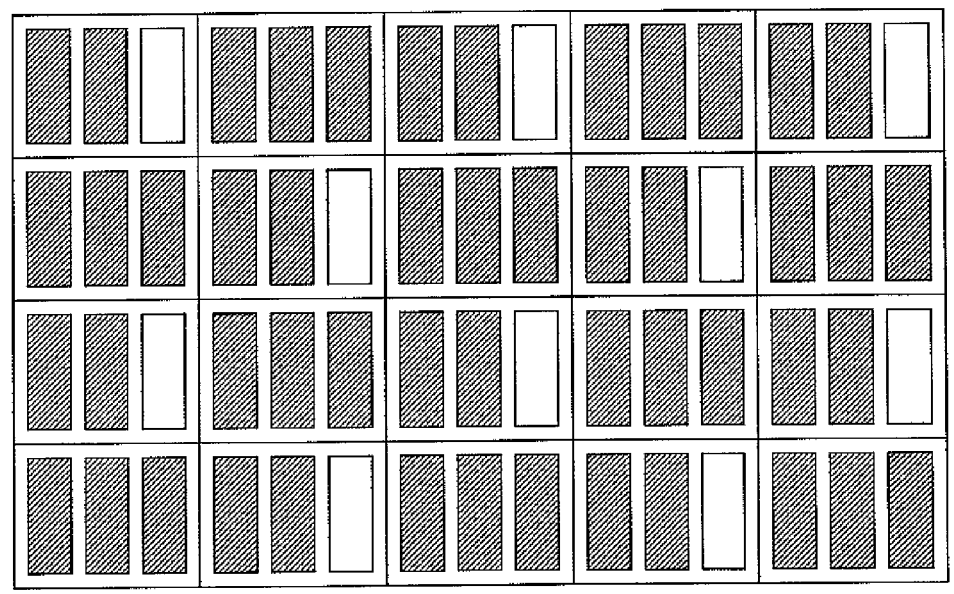

FIG.8
(a)
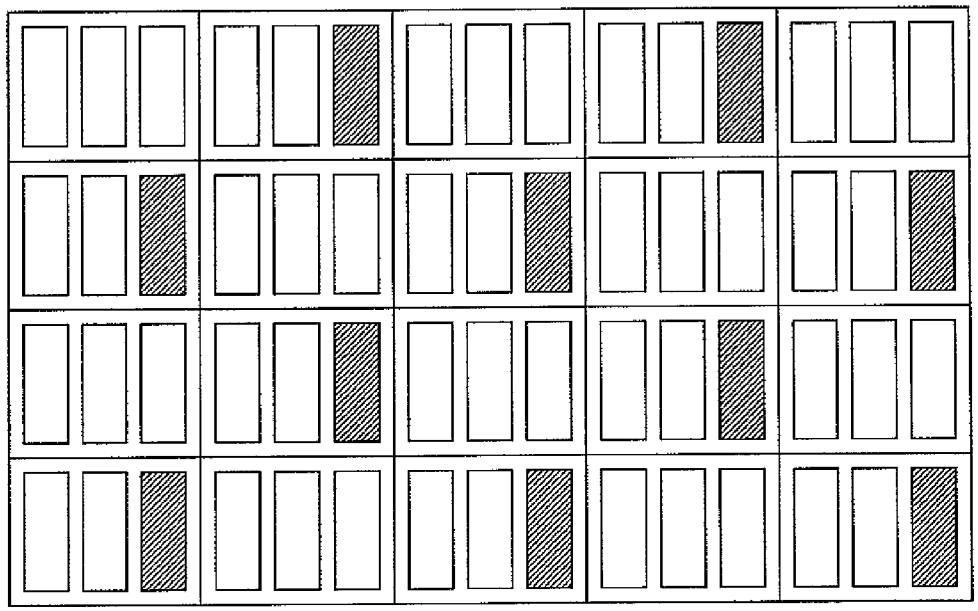
(b)
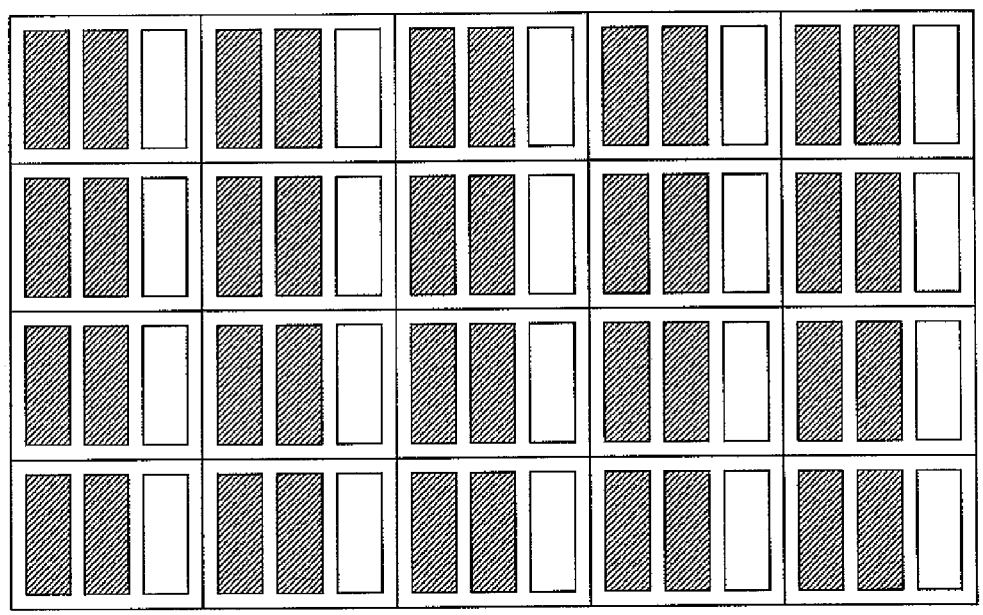

FIG.12
(a)
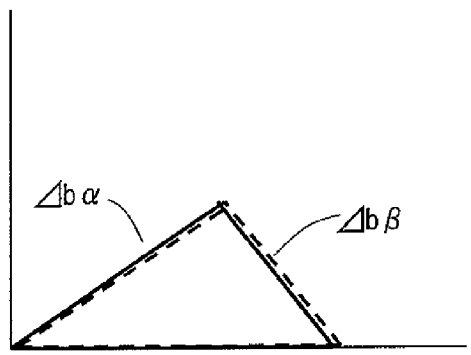
(b)
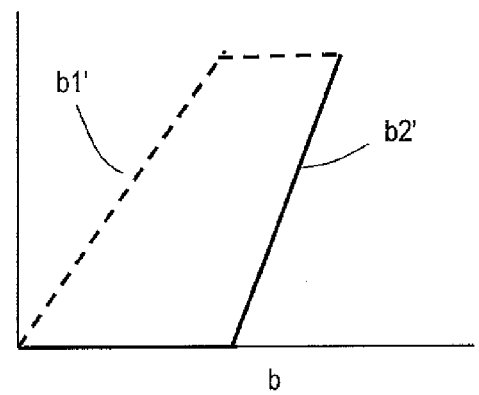
FIG.13
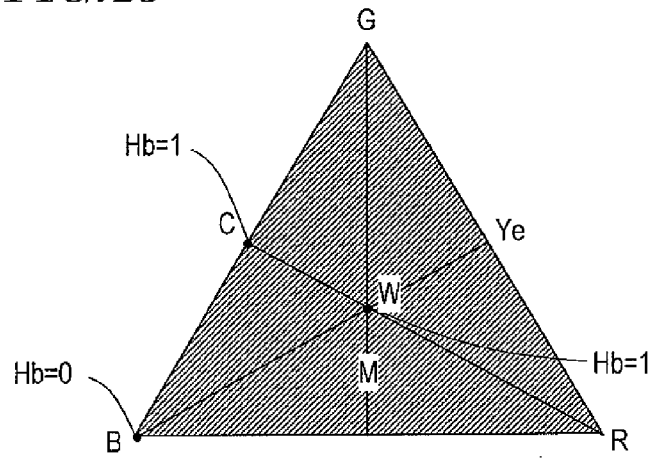

FIG.17
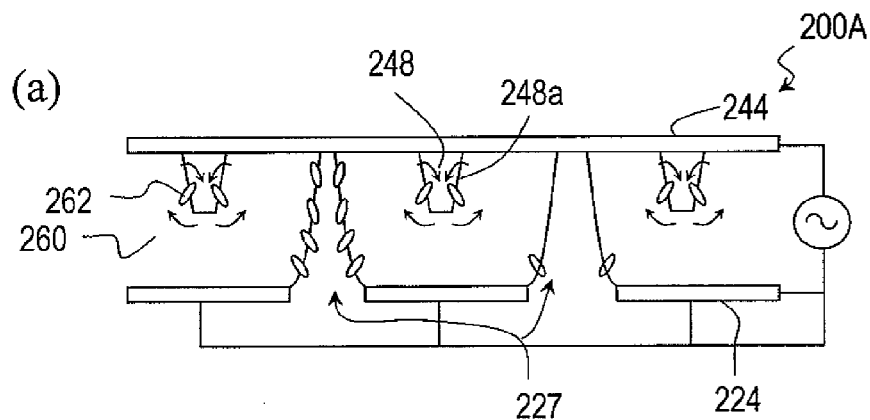
(a)
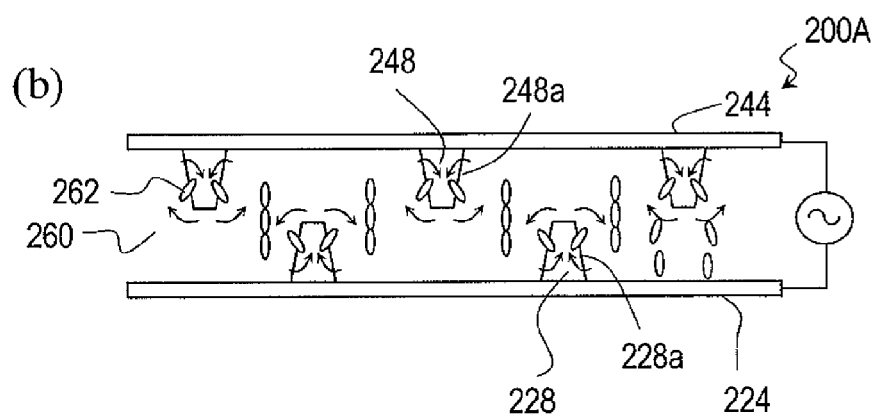
(b)
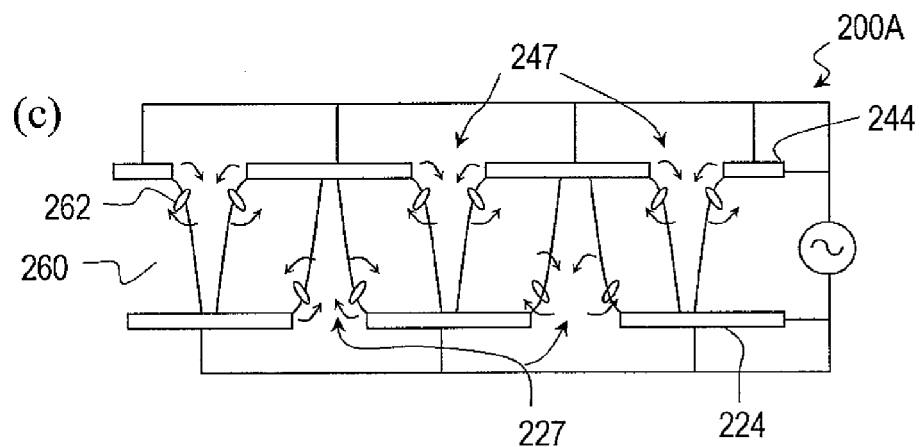
(c)

FIG.20
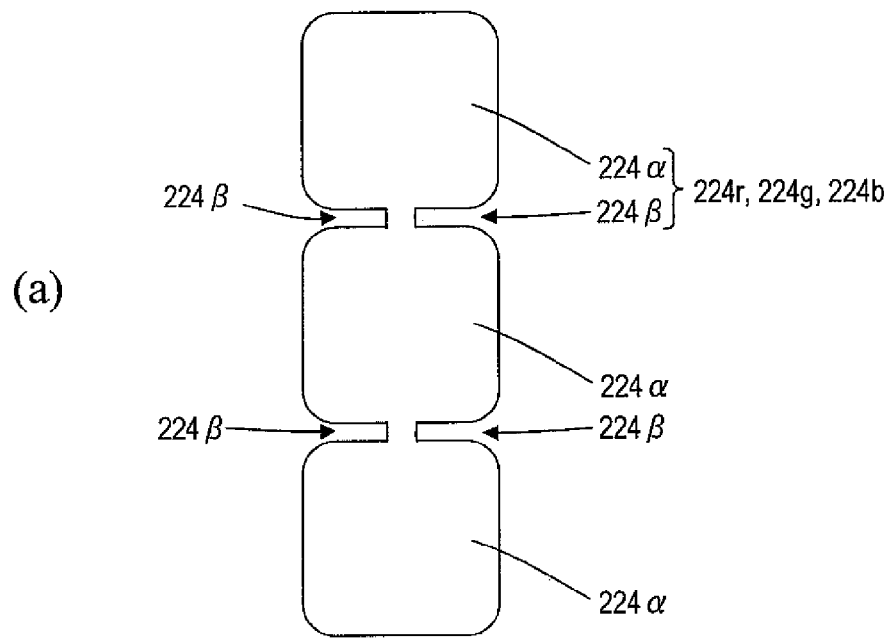
(a)
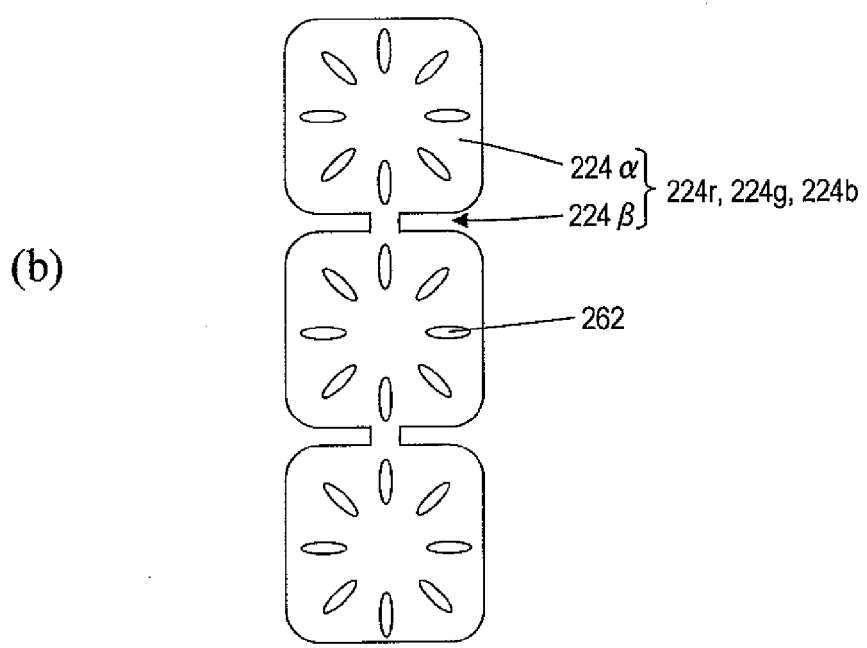
(b)

FIG.23
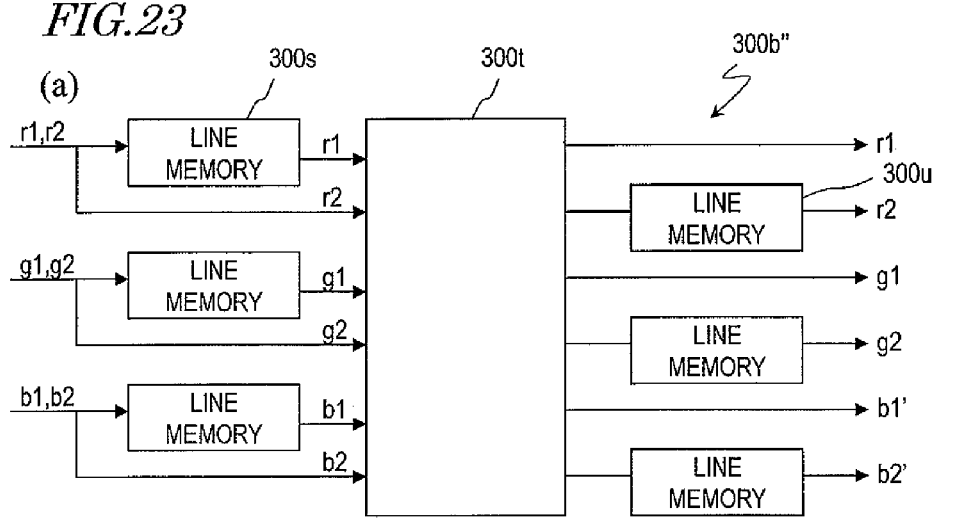
(a)
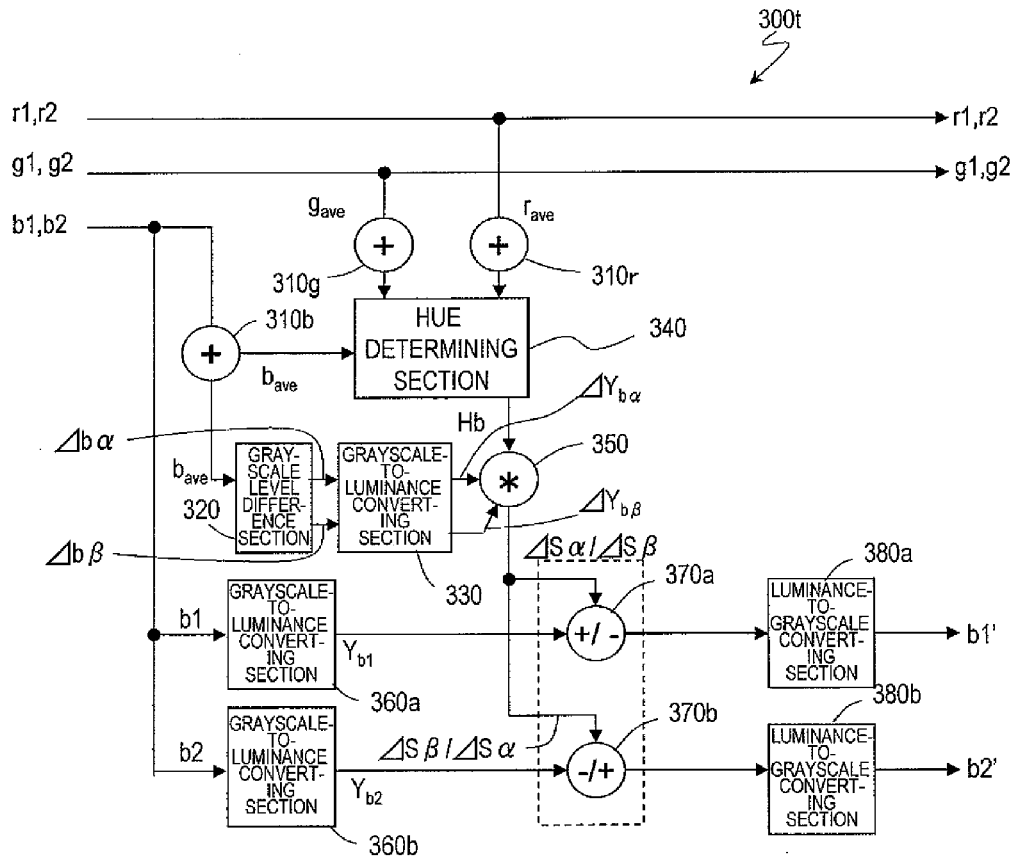
(b)

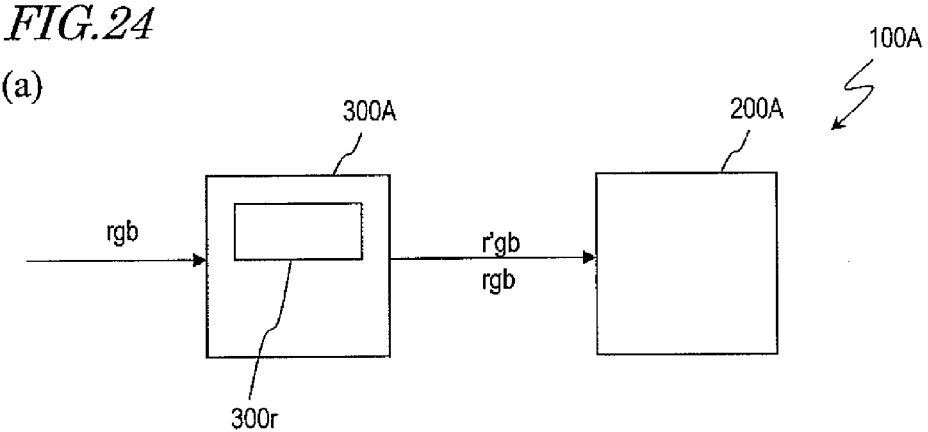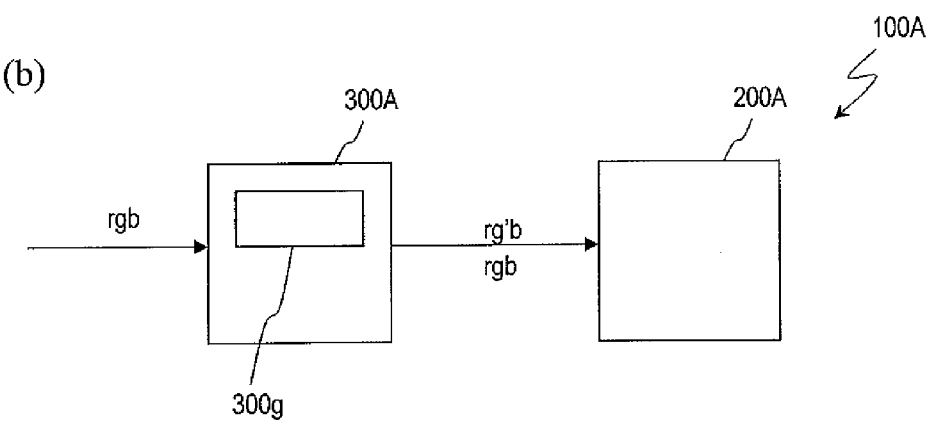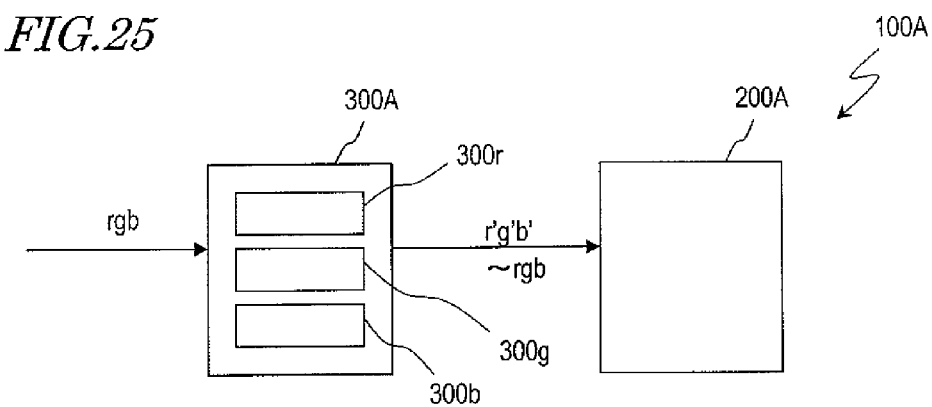

FIG.31
(a)
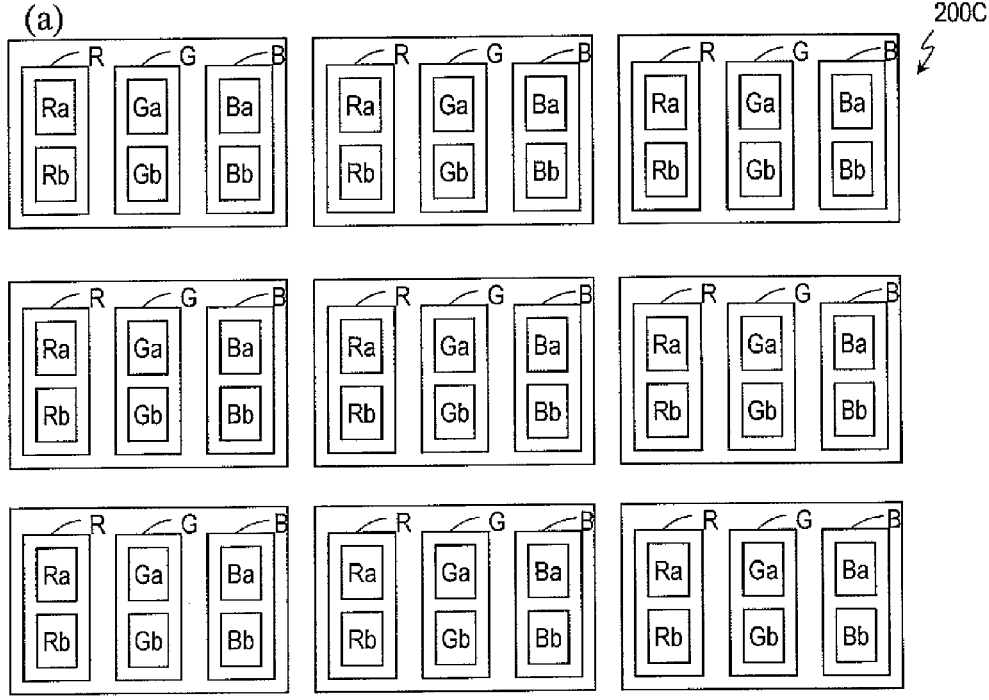
(b)
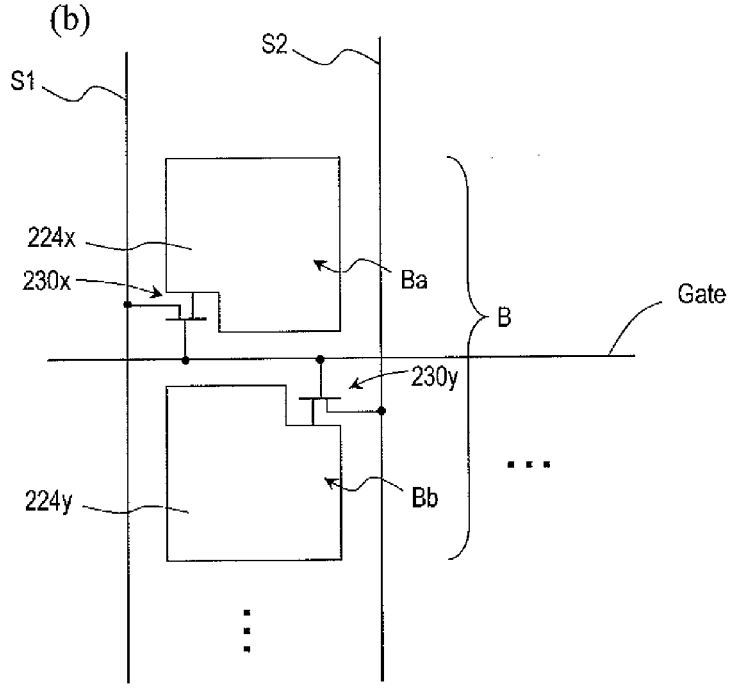

FIG.35
(a)
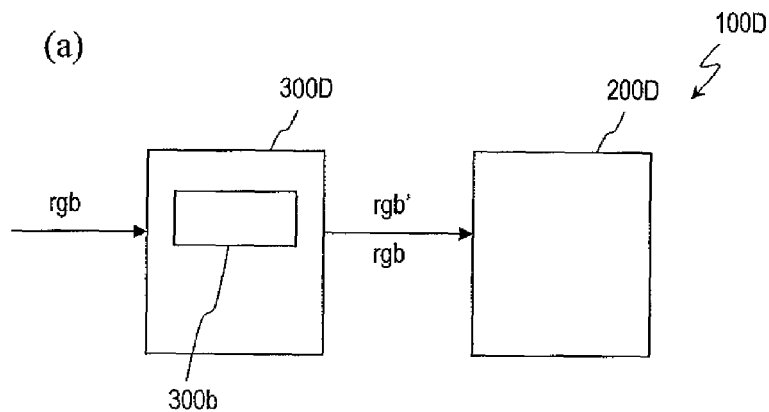
(b)
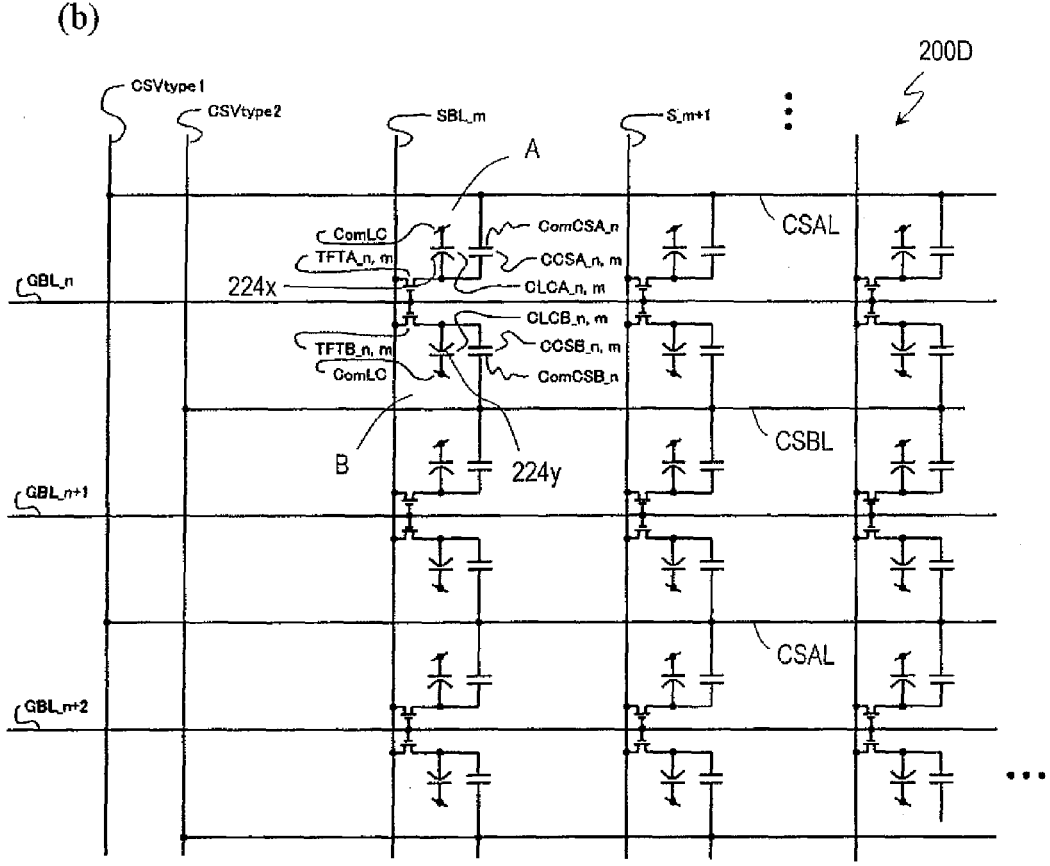

FIG.37
(a) R G B R G B R G B R G B
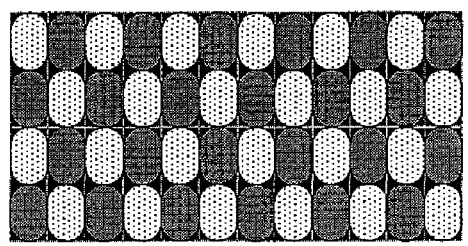
(b) B B B B B B B
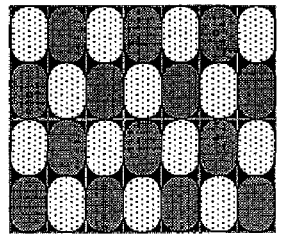
FIG.38
(a) B B B B B B B
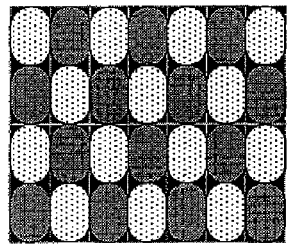
(b) B B B B B B
    D B D B D B
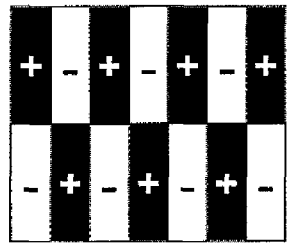
(c)
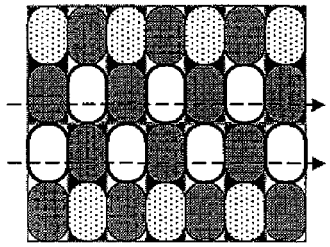
FIG.39
(a)
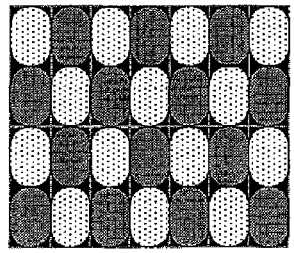
(b)
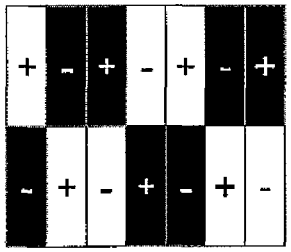
(c)
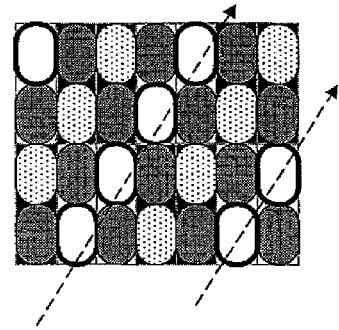

FIG.40
(a) 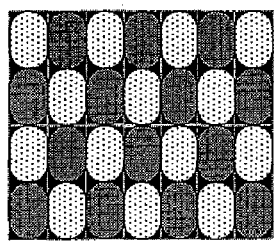
(b) 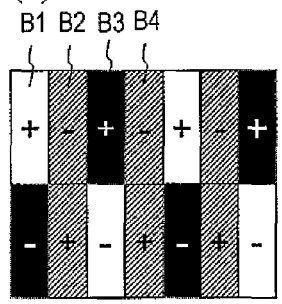
B1 B2 B3 B4
(c) 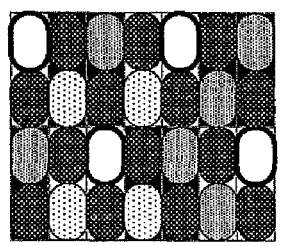

FIG.41
(a)
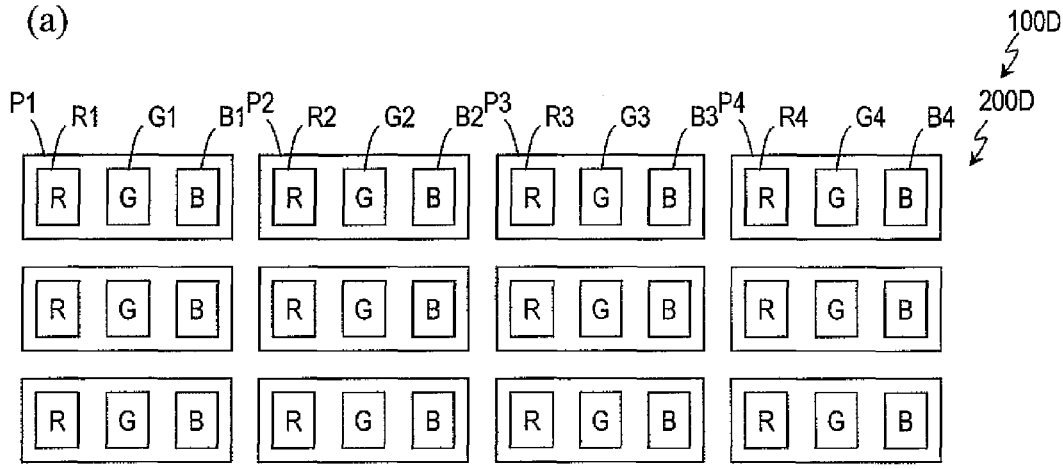
(b)
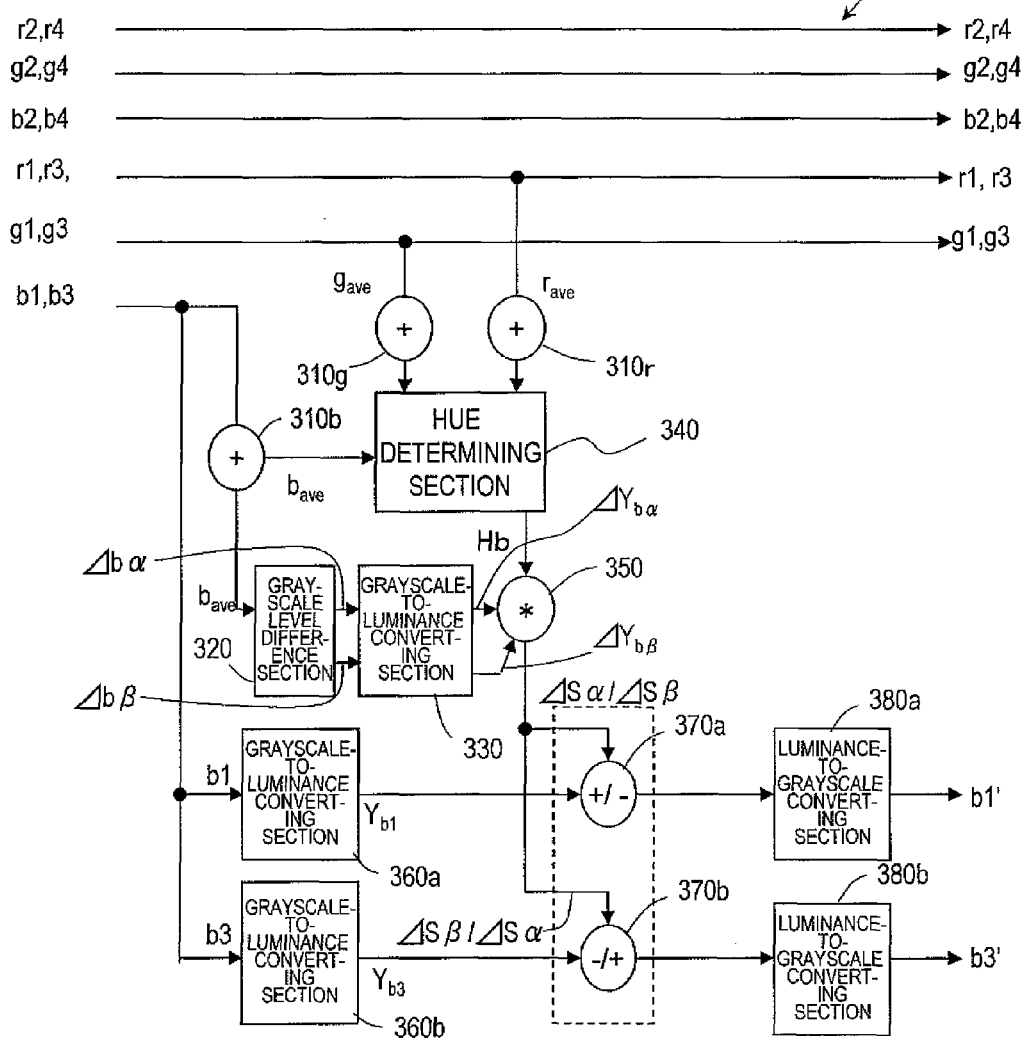

FIG.43
(a)
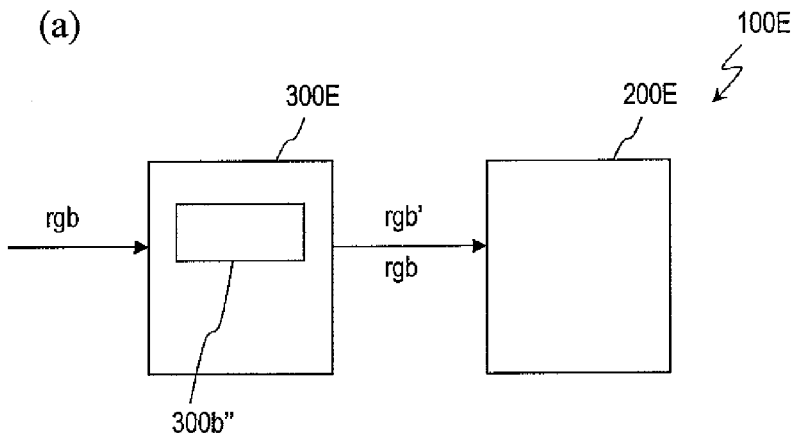
(b)
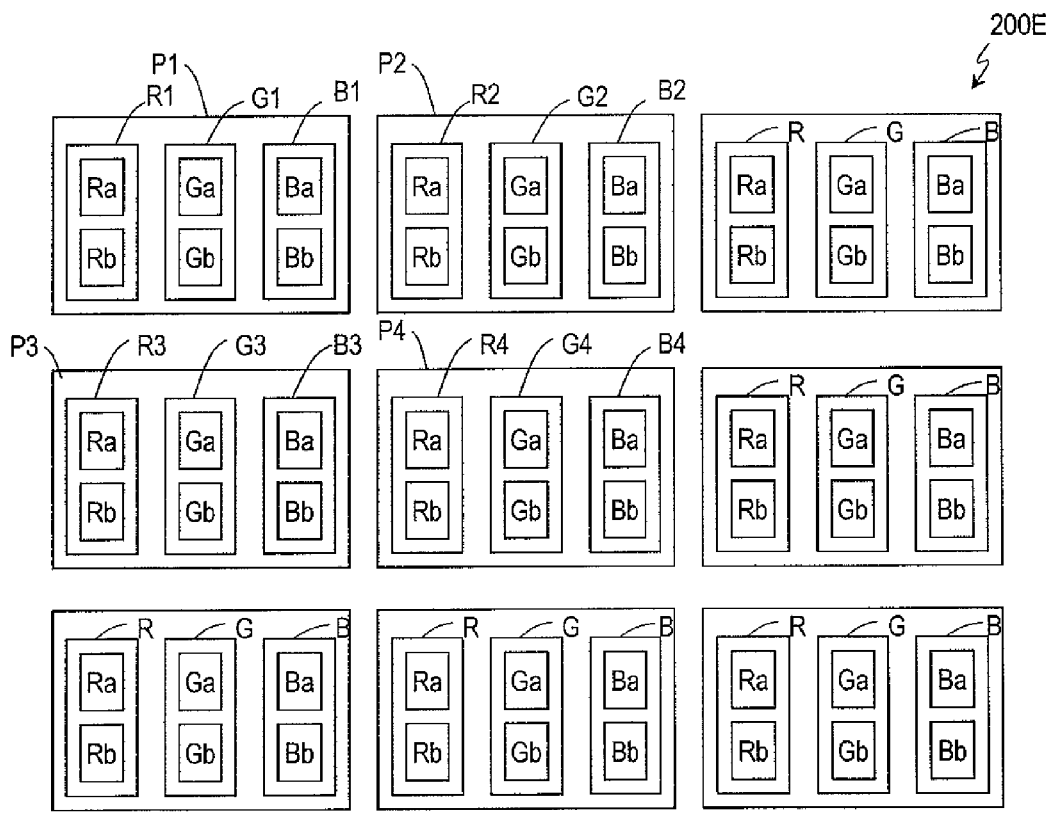

FIG.44
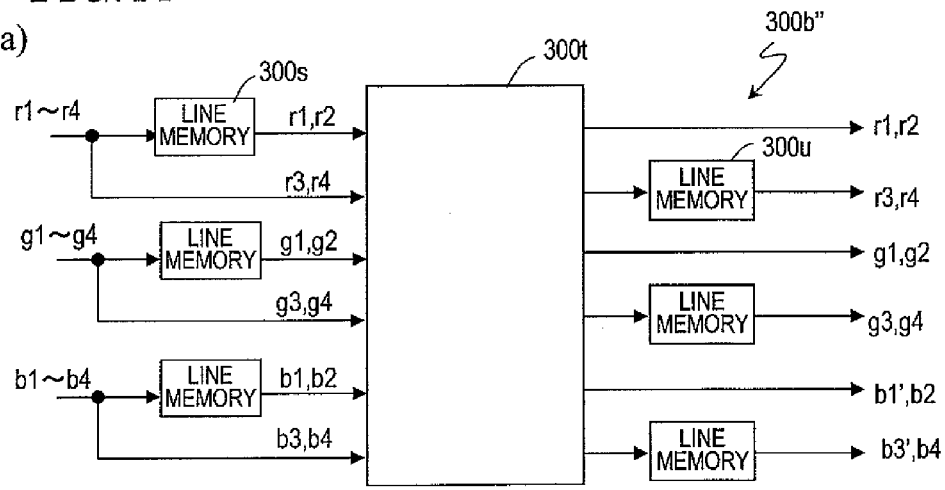
(a)
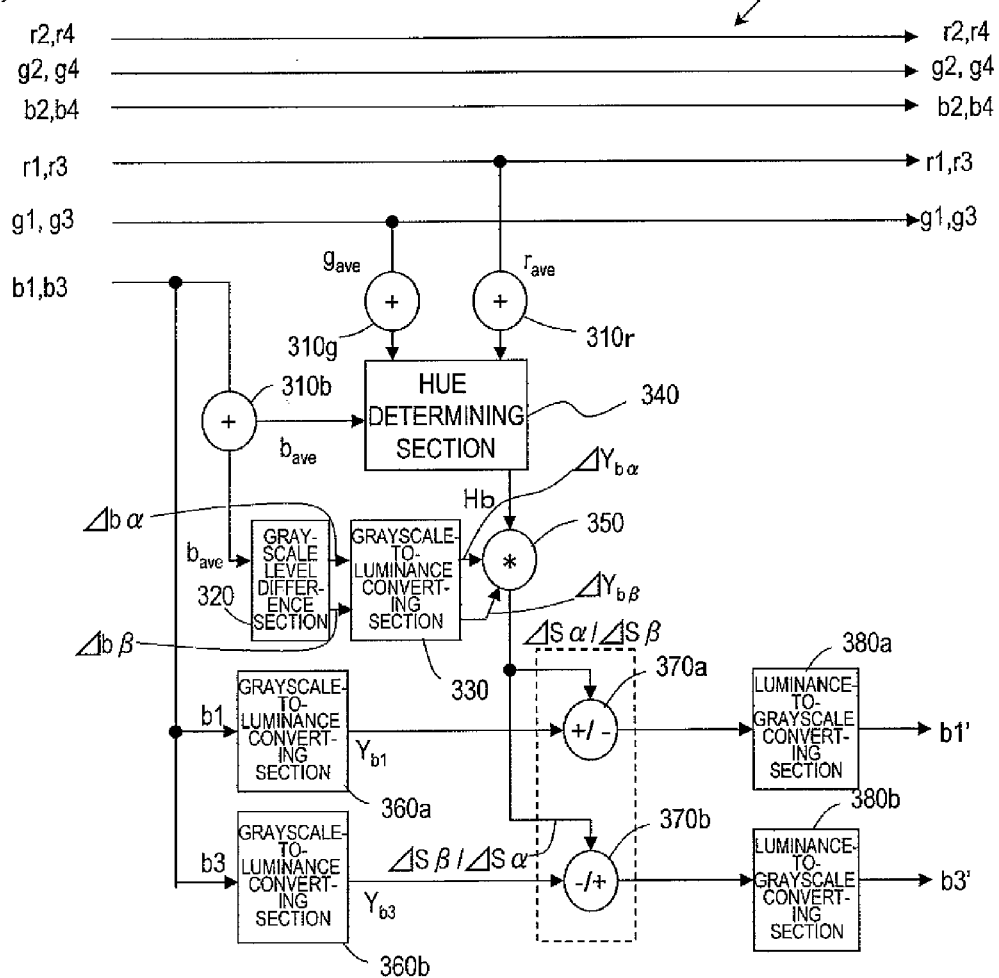
(b)

(a)　　　　　　　　　　　　　(b)

(a)　　　　　　　　　　　　　(b)

FIG.49
(a) 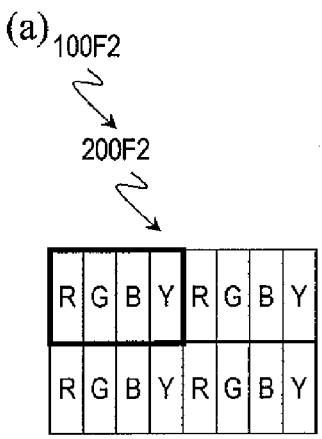
(b) 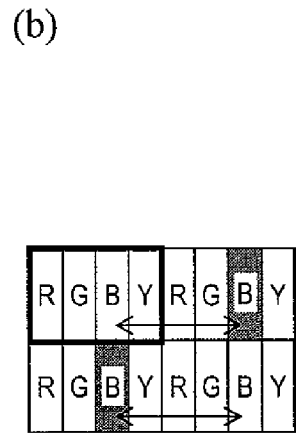
FIG.50
(a) 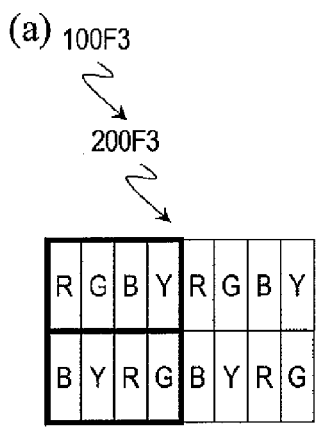
(b) 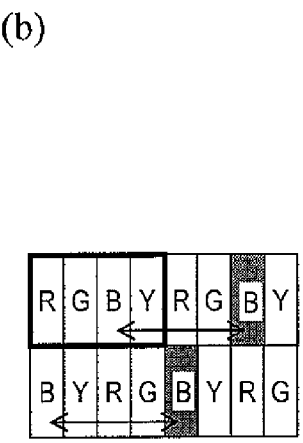
(c) 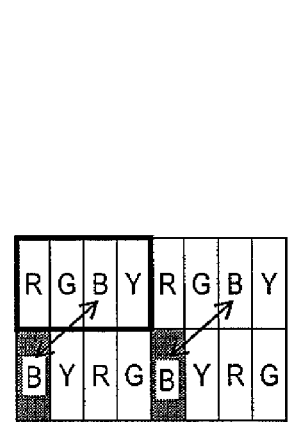
FIG.51
(a) 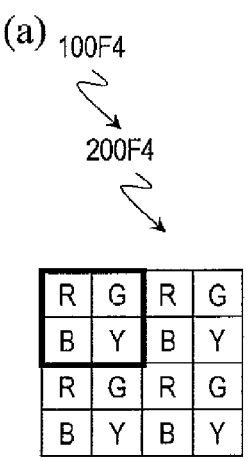
(b) 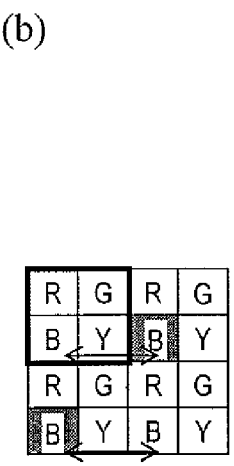

LIQUID CRYSTAL DISPLAY APPARATUS

TECHNICAL FIELD

The present invention relates to a liquid crystal display device.

BACKGROUND ART

Liquid crystal displays (LCDs) have been used in not only TV sets with a big screen but also small display devices such as the monitor screen of a cellphone. In an LCD, one pixel consists of three subpixels representing red (R), green (G) and blue (B) that are the three primary colors of light, and the difference in color between those red, green and blue subpixels is typically produced by color filters.

TN (twisted nematic) mode LCDs, which would often be used in the past, achieved relatively narrow viewing angles, but LCDs of various other modes with wider viewing angles have recently been developed one after another. Examples of those wider viewing angle modes include IPS (in-plane switching) mode and VA (vertical alignment) mode. Among those wide viewing angle modes, the VA mode is adopted in a lot of LCDs because the VA mode would achieve a sufficiently high contrast ratio.

When viewed obliquely, however, the VA mode LCD sometimes produces grayscale inversion. Thus, to minimize such grayscale inversion, an MVA (multi-domain vertical alignment) mode in which multiple liquid crystal domains are defined within a single pixel region is adopted. In an MVA mode LCD, an alignment control structure is provided for at least one of the two substrates, which face each other with a vertical alignment liquid crystal layer interposed between them, so that the alignment control structure contacts with the liquid crystal layer. As the alignment control structure, a linear slit (opening) of an electrode or a rib (projection) may be used, thereby applying alignment control force to the liquid crystal layer from one or both sides thereof. In this manner, multiple (typically four) liquid crystal domains with multiple different alignment directions are defined, thereby minimizing the grayscale inversion.

Also known as another kind of VA mode is a CPA (continuous pinwheel alignment) mode. In a normal CPA mode LCD, its subpixel electrodes have a highly symmetric shape and either an opening or a projection (which is sometimes called a "rivet") is arranged on the surface of the counter substrate in contact with the liquid crystal layer so as to be aligned with the center of a liquid crystal domain. When a voltage is applied, an oblique electric field is generated by the counter electrode and the highly symmetric subpixel electrode and induces radially tilted alignments of liquid crystal molecules. Also, with a rivet provided, the alignment control force of the slope of the rivet stabilizes the tilted alignments of the liquid crystal molecules. As the liquid crystal molecules are radially aligned within a single subpixel in this manner, the grayscale inversion can be minimized.

However, when viewed obliquely, the image displayed on a VA mode LCD will look more whitish as a whole than when viewed straight on (see Patent Document No. 1), which is called a "whitening" phenomenon. In the LCD disclosed in Patent Document No. 1, each subpixel, representing an associated one of the three primary colors of red, green and blue, has multiple regions with mutually different luminances, thereby reducing such a whitening phenomenon when the screen is viewed obliquely and improving the viewing angle characteristic. More specifically, in the LCD disclosed in Patent Document No. 1, electrodes provided for those regions of each subpixel are connected to mutually different data lines (source bus lines) by way of respectively different TFTs. The LCD of Patent Document No. 1 makes the potentials at the electrodes provided for those regions of each subpixel different from each other, thereby making those regions of each subpixel have different luminances and attempting to improve the viewing angle characteristic.

Nevertheless, to make those regions of each subpixel have mutually different luminances, fine electrodes should be provided for those regions of each subpixel, thus increasing the cost and sometimes resulting in a decreased yield. But a TN mode LCD can be made at a lower cost than a VA mode LCD. That is why somebody proposed that the viewing angle characteristic of a TN mode LCD could be improved even without providing multiple electrodes for each subpixel (see Patent Document No. 2, for example). Specifically, in the LCD disclosed in Patent Document No. 2, if two subpixels, which are two adjacent portions to receive the same input signal one after the other, have middle grayscale levels, then the viewing angle characteristic could be improved by setting the grayscale level of one of the two subpixels to be relatively high and that of the other subpixel to be relatively low, respectively. Specifically, supposing such two subpixels, which receive the same input signal one after the other, have middle grayscale levels A and B and the average ($=L(A)+L(B)/2$) of their luminances $L(A)$ and $L(B)$ is identified by $L(X)$, a grayscale level X associated with that average luminance $L(X)$ is obtained and then relatively high and low grayscale levels A' and B' that achieve the luminance $L(X)$ of the grayscale level X are obtained. In this manner, the LCD disclosed in Patent Document No. 2 corrects the grayscale levels A and B represented by the input signal into grayscale levels A' and B', thereby attempting to improve the viewing angle characteristic without providing any such fine electrodes for each subpixel electrode.

CITATION LIST

Patent Literature

Patent Document No. 1: Japanese Patent Application Laid-Open Publication No. 2006-209135

Patent Document No. 2: PCT International Application Japanese National-Phase Publication No. 2004-525402

SUMMARY OF INVENTION

Technical Problem

The liquid crystal display device disclosed in Patent Document No. 1 attempts to improve the viewing angle characteristic by using the grayscale level of a single subpixel to make multiple regions of each subpixel have mutually different luminances. On the other hand, the liquid crystal display device disclosed in Patent Document No. 2 tries to improve the viewing angle characteristic by using the grayscale levels of two subpixels to make them have mutually different luminances. In the liquid crystal display device of Patent Document No. 1, however, when a pixel should represent a color other than the color black, a region with low luminance may be sensible to the viewer according to the color to represent to the viewer or the pixel size and the display quality may be debased. On the other hand, in the liquid crystal display device of Patent Document No. 2, according to the color to represent, it sometimes seems to the viewer that the resolution has decreased and the display quality may decline, too.

It is therefore an object of the present invention to provide a liquid crystal display device that can improve the viewing angle characteristic and minimize the decrease in display quality.

Solution to Problem

A liquid crystal device according to the present invention has multiple pixels including first and second pixels that are arranged adjacent to each other. Each of those pixels includes a number of subpixels including first, second and third subpixels. The average luminance of the respective third subpixels of the first and second pixels when an input signal indicates that each of the first and second pixels should represent a first color is substantially equal to that of the respective third subpixels of the first and second pixels when the input signal indicates that each of the first and second pixels should represent a second color, which is different from the first color. When the input signal indicates that each of the first and second pixels should represent the first color, the luminances of the respective third subpixels of the first and second pixels are different from each other. When the input signal indicates that each of the first and second pixels should represent the second color, the luminances of the respective third subpixels of the first and second pixels are substantially equal to each other.

In one preferred embodiment, the difference in luminance between the respective third subpixels of the first and second pixels changes according to at least one of the average luminance of the respective first subpixels of the first and second pixels and that of the respective second subpixels of the first and second pixels.

In another preferred embodiment, when the input signal indicates that each of the first and second pixels should represent the first color, the respective first and second subpixels of the first and second pixels are in ON state.

In still another preferred embodiment, when the input signal indicates that each of the first and second pixels should represent the second color, the respective first and second subpixels of the first and second pixels are in OFF state.

In a specific preferred embodiment, the first, second and third subpixels are red, green and blue subpixels, respectively.

In another specific preferred embodiment, the first color is an achromatic color and the second color is blue.

In yet another preferred embodiment, the liquid crystal display device further includes: first, second and third subpixel electrodes that define the first, second and third subpixels, respectively; and source bus lines, which are provided for the first, second and third subpixel electrodes, respectively.

In yet another preferred embodiment, each of the first, second and third subpixels has multiple regions that are able to have mutually different luminances.

In this particular preferred embodiment, the liquid crystal display device further includes: first, second and third subpixel electrodes, which define the first, second and third subpixels, respectively, and each of which has divided electrodes that define the multiple regions; source bus lines, which are provided for the first, second and third subpixel electrodes, respectively; and storage capacitor bus lines, which are provided for the respective divided electrodes of the first, second and third subpixel electrodes.

In yet another preferred embodiment, the multiple pixels are arranged in columns and rows to form a matrix pattern. The multiple pixels further include a third pixel, which is adjacent to the first pixel in one of row and column directions and which is diagonally adjacent to the second pixel, and a fourth pixel, which is adjacent to the third and second pixels in the one direction and in the other direction, respectively. When the input signal indicates that each of the third and fourth pixels should represent the first color, the luminances of the respective third subpixels of the third and fourth pixels are substantially equal to each other.

In yet another preferred embodiment, either the input signal or a signal obtained by converting the input signal indicates the respective grayscale levels of the multiple subpixels that are included in each of the multiple pixels. The grayscale levels of the respective third subpixels of the first and second pixels, which are indicated by either the input signal or the converted signal, are corrected according to the hues of the first and second pixels that are also indicated by the input signal.

In yet another preferred embodiment, either the input signal or a signal obtained by converting the input signal indicates the respective grayscale levels of the multiple subpixels that are included in each of the multiple pixels. The grayscale levels of the respective third subpixels of the first and second pixels, which are indicated by either the input signal or the converted signal, are corrected according to not only the hues of the first and second pixels that are also indicated by the input signal but also a difference in grayscale level between the respective third subpixels of the first and second pixels, which is also indicated by the input signal.

In yet another preferred embodiment, if the input signal indicates that the third subpixel of one of the first and second pixels has a first grayscale level and that the third subpixel of the other pixel has either the first grayscale level or a second grayscale level, which is higher than the first grayscale level, then the luminances of the respective third subpixels of the first and second pixels are different from ones that are associated with the grayscale levels indicated by either the input signal or the signal obtained by converting the input signal. If the input signal indicates that the third subpixel of the one pixel has the first grayscale level and that the third subpixel of the other pixel has a third grayscale level, which is higher than the second grayscale level, then the luminances of the respective third subpixels of the first and second pixels are substantially equal to ones that are associated with the grayscale levels indicated by either the input signal or the signal obtained by converting the input signal.

Another liquid crystal device according to the present invention includes a pixel that has a number of subpixels including first, second and third subpixels. Each of the first, second and third subpixels has a number of regions including first and second regions that are able to have mutually different luminances. The average luminance of the first and second regions of the third subpixel when an input signal indicates that the pixel should represent a first color is substantially equal to that of the first and second regions of the third subpixel when the input signal indicates that the pixel should represent a second color, which is different from the first color. When the input signal indicates that the pixel should represent the first color, the luminances of the first and second regions of the third subpixel are different from each other. And when the input signal indicates that the pixel should represent the second color, the luminances of the first and second regions of the third subpixel are substantially equal to each other.

In one preferred embodiment, the liquid crystal display device further includes: first, second and third subpixel electrodes, which define the first, second and third subpixels, respectively, and each of which has first and second divided electrodes that define the first and second regions, respectively; and source bus lines, which are provided for the first and second divided electrodes of the first, second and third subpixel electrodes, respectively.

In another preferred embodiment, the liquid crystal display device further includes: first, second and third subpixel electrodes, which define the first, second and third subpixels, respectively, and each of which has first and second divided electrodes that define the first and second regions, respectively; source bus lines, which are provided for the first, second and third subpixel electrodes, respectively; and gate bus lines, which are provided for the respective first and second divided electrodes of the first, second and third subpixel electrodes.

In a specific preferred embodiment, the first, second and third subpixels are red, green and blue subpixels, respectively.

Still another liquid crystal display device according to the present invention includes multiple pixels that are arranged in columns and rows to form a matrix pattern. The multiple pixels include first, second, third and fourth pixels, which are arranged in this order along either one of the columns or one of the rows. Each of the pixels has a number of subpixels including first, second and third subpixels. The average luminance of the respective third subpixels of the first and third pixels when an input signal indicates that each of the first and third pixels should represent a first color is substantially equal to that of the respective third subpixels of the first and third pixels when the input signal indicates that each of the first and third pixels should represent a second color, which is different from the first color. When the input signal indicates that each of the first and third pixels should represent the first color, the luminances of the respective third subpixels of the first and third pixels are different from each other. On the other hand, when the input signal indicates that each of the first and third pixels should represent the second color, the luminances of the respective third subpixels of the first and third pixels are substantially equal to each other.

In one preferred embodiment, the luminance of the respective third subpixels of the second and fourth pixels is substantially equal to a one that is associated with a grayscale level indicated by either the input signal or a signal obtained by converting the input signal.

Advantageous Effects of Invention

The present invention provides a liquid crystal display device that can improve the viewing angle characteristic and minimize the decrease in display quality.

BRIEF DESCRIPTION OF DRAWINGS

FIG. 1(a) is a schematic representation illustrating a liquid crystal display device as a first preferred embodiment of the present invention and FIG. 1(b) is a schematic representation illustrating the LCD panel of the liquid crystal display device shown in FIG. 1(a).

FIG. 2(a) is a schematic representation illustrating how respective pixels may be arranged in the liquid crystal display device shown in FIG. 1, and FIG. 2(b) is a circuit diagram illustrating the active-matrix substrate of its LCD panel.

FIG. 5 illustrates conceptually how the correcting section works in the liquid crystal display device shown in FIG. 1, wherein FIG. 5(a) is a schematic representation illustrating the hue, and FIGS. 5(b) and 5(c) are graphs showing how the grayscale level of a blue subpixel changes in one situation and in a different situation, respectively.

FIGS. 6(a) and 6(b) are schematic representations illustrating a liquid crystal display device as Comparative Example 1.

FIGS. 7(a) and 7(b) are schematic representations illustrating a liquid crystal display device as Comparative Example 2.

FIGS. 8(a) and 8(b) are schematic representations illustrating a liquid crystal display device as a first preferred embodiment of the present invention.

FIG. 12(a) is a graph showing the grayscale level difference and FIG. 12(b) is a graph showing the grayscale level to be input to an LCD panel.

FIG. 13 is a schematic representation showing a relation between the hue and the hue coefficient in the blue correcting section.

FIGS. 17(a), 17(b) and 17(c) are schematic representations illustrating configurations for the LCD panel of the liquid crystal display device shown in FIG. 1.

FIGS. 20(a) and 20(b) are plan views schematically illustrating a region allocated to one subpixel in the LCD panel of the liquid crystal display device shown in FIG. 1.

FIG. 23(a) is a schematic representation illustrating a configuration for the blue correcting section of a liquid crystal display device as a modified example of the first preferred embodiment, and FIG. 23(b) is a schematic representation illustrating a configuration for its grayscale control section.

FIGS. 24(a) and 24(b) are schematic representations illustrating a liquid crystal display device as a modified example of the first preferred embodiment when its correcting section includes only a red correcting section and only a green correcting section, respectively.

FIG. 25 is a schematic representation illustrating a liquid crystal display device as another modified example of the first preferred embodiment when its correcting section includes red, green and blue correcting sections.

FIG. 31(a) is a schematic representation illustrating how respective pixels may be arranged in the liquid crystal display device shown in FIG. 30, and FIG. 31(b) is a circuit diagram illustrating the active-matrix substrate of its LCD panel.

FIG. 35(a) is a schematic representation illustrating a liquid crystal display device as a fourth preferred embodiment of the present invention and FIG. 35(b) is an equivalent circuit diagram of its LCD panel.

FIG. 37(a) is a schematic representation illustrating a liquid crystal display device as Comparative Example 3 and FIG. 37(b) is a schematic representation illustrating only blue subpixels of the liquid crystal display device of Comparative Example 3.

FIG. 38(a) is a schematic representation illustrating how the blue subpixels of the liquid crystal display device shown in FIG. 35 look when the input signal indicates that each pixel should represent the color blue, FIG. 38(b) is a schematic representation showing how the blue correcting section controls the brightness levels, and FIG. 38(c) is a schematic representation illustrating blue subpixels that have had their luminances corrected as shown in FIG. 38(b) when the input signal indicates that each pixel should represent an achromatic color.

FIG. 39(a) is a schematic representation illustrating how the blue subpixels of the liquid crystal display device shown in FIG. 35 look when the input signal indicates that each pixel should represent the color blue, FIG. 39(b) is a schematic representation showing how the blue correcting section controls the brightness levels, and FIG. 39(c) is a schematic representation illustrating blue subpixels that have had their luminances corrected as shown in FIG. 39(b) when the input signal indicates that each pixel should represent an achromatic color.

FIG. 40(a) is a schematic representation illustrating how the blue subpixels of the liquid crystal display device shown in FIG. 35 look when the input signal indicates that each pixel should represent the color blue, FIG. 40(b) is a schematic representation showing how the blue correcting section controls the brightness levels, and FIG. 40(c) is a schematic representation illustrating blue subpixels that have had their luminances corrected as shown in FIG. 40(b) when the input signal indicates that each pixel should represent an achromatic color.

FIG. 41(a) is a schematic representation illustrating an LCD panel that is designed to make the correction shown in FIG. 40 for the liquid crystal display device and FIG. 41(b) is a schematic representation illustrating a configuration for its blue correcting section.

FIG. 43(a) is a schematic representation illustrating a liquid crystal display device as a fifth preferred embodiment of the present invention and FIG. 43(b) is a schematic representation illustrating its LCD panel.

FIG. 44(a) is a schematic representation illustrating a configuration for the blue correcting section shown in FIG. 43 and FIG. 44(b) is a schematic representation illustrating its grayscale control section.

FIG. 49(a) is a schematic representation illustrating how subpixels may be arranged in the multi-primary-color display panel of a liquid crystal display device as a modified example of the sixth preferred embodiment and FIG. 49(b) is a schematic representation illustrating where blue subpixels, of which the luminances need to be controlled, are located with respect to bright blue subpixels.

FIG. 50(a) is a schematic representation illustrating how subpixels may be arranged in the multi-primary-color display panel of a liquid crystal display device as another modified example of the sixth preferred embodiment and FIGS. 50(b) and 50(c) are schematic representations illustrating where blue subpixels, of which the luminances need to be controlled, are located with respect to bright blue subpixels.

FIG. 51(a) is a schematic representation illustrating how subpixels may be arranged in the multi-primary-color display panel of a liquid crystal display device as still another modified example of the sixth preferred embodiment and FIG. 51(b) is a schematic representation illustrating where blue subpixels, of which the luminances need to be controlled, are located with respect to bright blue subpixels.

DESCRIPTION OF EMBODIMENTS

Figure 3:
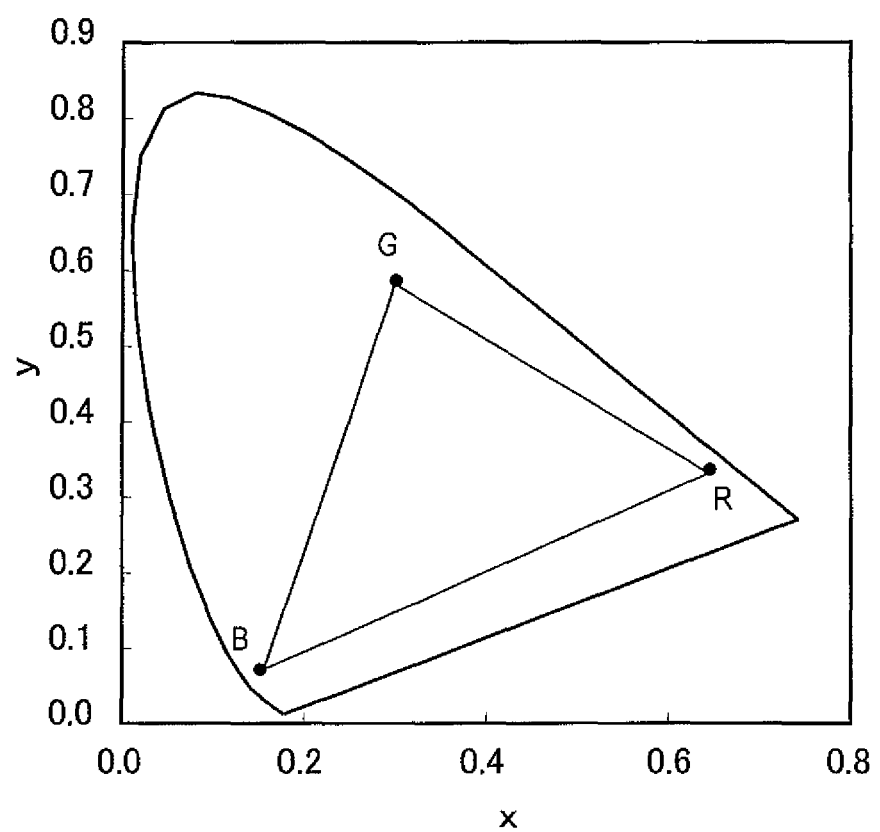
FIG. 3 is a chromaticity diagram of the LCD panel in the liquid crystal display device shown in FIG. 1.

Hereinafter, preferred embodiments of a liquid crystal display device according to the present invention will be described with reference to the accompanying drawings. It should be noted, however, that the present invention is in no way limited to the specific preferred embodiments to be described below.

Embodiment 1

A first specific preferred embodiment of a liquid crystal display device according to the present invention will now be described. FIG. 1(a) is a schematic representation illustrating a liquid crystal display device 100A as a first preferred embodiment of the present invention. The liquid crystal display device 100A includes an LCD panel 200A and a correcting section 300A. The LCD panel 200A has a number of pixels that are arranged in columns and rows to form a matrix pattern. In the LCD panel 200A of this preferred embodiment, each of those pixels includes red, green and blue subpixels. In the following description, the liquid crystal display device will sometimes be simply referred to herein as just a "display device".

The correcting section 300A makes correction on at least one of the grayscale levels (or its associated luminance levels) of red, green and blue subpixels as indicated by the input signal when one condition is satisfied but does not make the correction when another condition is satisfied. In this preferred embodiment, the correcting section 300A includes a blue correcting section 300b, which corrects the grayscale level b of a blue subpixel as indicated by the input signal into a grayscale level b' when one condition is satisfied but which outputs the grayscale level b of the blue subpixel as it is (i.e., just as indicated by the input signal) when another condition is satisfied.

The input signal may be compatible with a cathode ray tube (CRT) with a γ value of 2.2 and is compliant with the NTSC (National Television Standards Committee) standard. The input signal indicates the grayscale levels r, g and b of red, green and blue subpixels, which are usually represented by eight bits. Or the input signal may have a value that can be converted into the grayscale levels r, g and b of red, green and blue subpixels and that is represented as a three-dimensional value. In FIG. 1(a), the grayscale levels r, g and b of the input signal are collectively identified by rgb. It should be noted that if the input signal is compliant with the BT. 709 standard, the grayscale levels r, g and b indicated by the input signal fall within the range of the lowest grayscale level (e.g., grayscale level 0) through the highest grayscale level (e.g., grayscale level 255) and the luminances of the red, green and blue subpixels fall within the range of zero through one. The input signal may be YCrCb signal, for example. The grayscale levels rgb indicated by the input signal are input through the correcting section 300A to the LCD panel 200A, which converts the grayscale levels into luminance levels. As a result, voltages representing the luminance levels are applied to the liquid crystal layer 260 of the LCD panel 200A (see FIG. 1(b)).

In a three-primary-color liquid crystal display device, if either the grayscale levels or luminance levels of red, green and blue subpixels are all zero, a pixel displays the color black. On the other hand, if either the grayscale levels or luminance levels of red, green and blue subpixels are all one, then a pixel displays the color white. Optionally, a liquid crystal display device may perform independent gamma correction processing as will be described later. In a liquid crystal display device in which no independent gamma correction is carried out, however, if the highest luminance of red, green and blue subpixels after the color temperatures have been adjusted to the intended ones in a TV set is supposed to be one and if an achromatic color is going to be displayed, then the red, green and blue subpixels have either the same grayscale level or the same maximum luminance ratio of the luminance levels. That is why if the color represented by a pixel changes from black into white while remaining an achromatic color, then the grayscale level of the red, green and blue subpixels or the ratio of the luminance levels of these subpixels to its maximum luminance does increase but is still the same between those red, green and blue subpixels. In the following description, if the luminance of each subpixel in an LCD panel is the lowest one corresponding to the lowest grayscale level, then that subpixel will be referred to herein as an "OFF-state subpixel". On the other hand, if the luminance of each subpixel is higher than that lowest luminance, then that subpixel will be referred to herein as an "ON-state subpixel".

FIG. 1(b) is a schematic representation illustrating the LCD panel 200A, which includes an active-matrix substrate 220 with pixel electrodes 224 and an alignment layer 226 that are provided on an insulating substrate 222, a counter substrate 240 with a counter electrode 244 and another alignment layer 246 that are provided on another insulating substrate 242, and a liquid crystal layer 260, which is interposed between the active-matrix substrate 220 and the counter substrate 240. Although not shown, two polarizers are provided for the active-matrix substrate 220 and the counter substrate 240, respectively, and are arranged so that their polarization axes satisfy the crossed Nicols relation. Although not shown in FIG. 1(b), lines, insulating layers and other members are actually assembled on the active-matrix substrate 220, while a color filter layer etc. are actually provided for the counter substrate 240. The liquid crystal layer 260 has a substantially uniform thickness. In the LCD panel 200A, a number of pixels are arranged in columns and rows to form a matrix pattern. Each of those pixels is defined by an associated pixel electrode 224 and the red, green and blue subpixels are defined by divided subpixel electrodes of the pixel electrode 224.

This LCD panel 200A operates in the VA mode, for example. Thus, the alignment layers 226 and 246 are vertical alignment layers and the liquid crystal layer 260 is a vertical alignment liquid crystal layer. As used herein, the "vertical alignment liquid crystal layer" refers to a liquid crystal layer in which the axis of its liquid crystal molecules (which will be sometimes referred to herein as an "axial direction") defines an angle of approximately 85 degrees or more with respect to the surface of the vertical alignment layers 226 and 246. The liquid crystal layer 260 includes a nematic liquid crystal material with negative dielectric anisotropy. Using such a liquid crystal material along with two polarizers that are arranged as crossed Nicols, this device conducts a display operation in a normally black mode. Specifically, in that mode, when no voltage is applied to the liquid crystal layer 260, the liquid crystal molecules 262 in the liquid crystal layer 260 are aligned substantially parallel to a normal to the principal surface of the alignment layers 226 and 246. On the other hand, when a voltage that is higher than a predetermined voltage is applied to the liquid crystal layer 260, the liquid crystal molecules 262 in the liquid crystal layer 260 are aligned substantially parallel to the principal surface of the alignment layers 226 and 246. Also, when a high voltage is applied to the liquid crystal layer 260, the liquid crystal molecules 262 will be aligned symmetrically either within a subpixel or within a particular region of the subpixel, thus contributing to improving the viewing angle characteristic. In this example, each of the active-matrix substrate 220 and the counter substrate 240 has its alignment layer 226, 246. However, according to the present invention, at least one of the active-matrix substrate 220 and the counter substrate 240 needs to have its alignment layer 226 or 246. Nevertheless, in order to stabilize the alignments, it is still preferred that both of the active-matrix substrate 220 and the counter substrate 240 have their own alignment layer 226, 246.

FIG. 2(a) illustrates how pixels and subpixels, included in each of those pixels, may be arranged in this LCD panel 200A. As an example, FIG. 2(a) illustrates an arrangement of pixels in three columns and three rows. Each of those pixels includes three subpixels, which are red, green and blue subpixels R, G and B that are arranged in the row direction. The luminances of these subpixels can be controlled independently of each other. The arrangement of color filters in this LCD panel 200A corresponds to the arrangement shown in FIG. 2(a).

In the following description, a subpixel's luminance level corresponding to the lowest grayscale level (e.g., grayscale level 0) will be represented herein as "0" and a subpixel's luminance level corresponding to the highest grayscale level (e.g., grayscale level 255) will be represented herein as "1" for convenience sake. Even if their luminance levels are equal to each other, the red, green and blue subpixels may actually have mutually different luminances because the "luminance level" herein means the ratio of the luminance of each subpixel to its highest luminance. For example, if the input signal indicates that a pixel should represent the color black, all of the grayscale levels r, g and b indicated by the input signal are the lowest grayscale level (e.g., grayscale level 0). On the other hand, if the input signal indicates that a pixel should represent the color white, all of the grayscale levels r, g and b are the highest grayscale level (e.g., grayscale level 255). In the following description, the grayscale level will sometimes be normalized with the highest grayscale level and the grayscale level will be represented as a ratio of zero through one.

FIG. 2(b) illustrates an equivalent circuit diagram of one pixel in this liquid crystal display device 100A. A TFT 230 is connected to a subpixel electrode 224b that is provided for a blue subpixel B. The TFT 230 has its gate electrode connected to a gate bus line Gate and its source electrode connected to a source bus line Sb. The other red and green subpixels R and G also have the same configuration.

FIG. 3 is a chromaticity diagram of the LCD panel 200A. If the grayscale level of a red subpixel is the highest one and if that of green and blue subpixels is the lowest one, then the LCD panel 200A has the R chromaticity shown in FIG. 3. On the other hand, if the grayscale level of the green subpixel is the highest one and if that of red and blue subpixels is the lowest one, then the LCD panel 200A has the G chromaticity shown in FIG. 3. And if the grayscale level of a blue subpixel is the highest one and if that of red and green subpixels is the lowest one, then the LCD panel 200A has the B chromaticity shown in FIG. 3. The color reproduction range of the liquid crystal display device 100A is represented by the triangle, of which the vertices are defined by R, G and B coordinates shown in FIG. 3.

Figure 4:
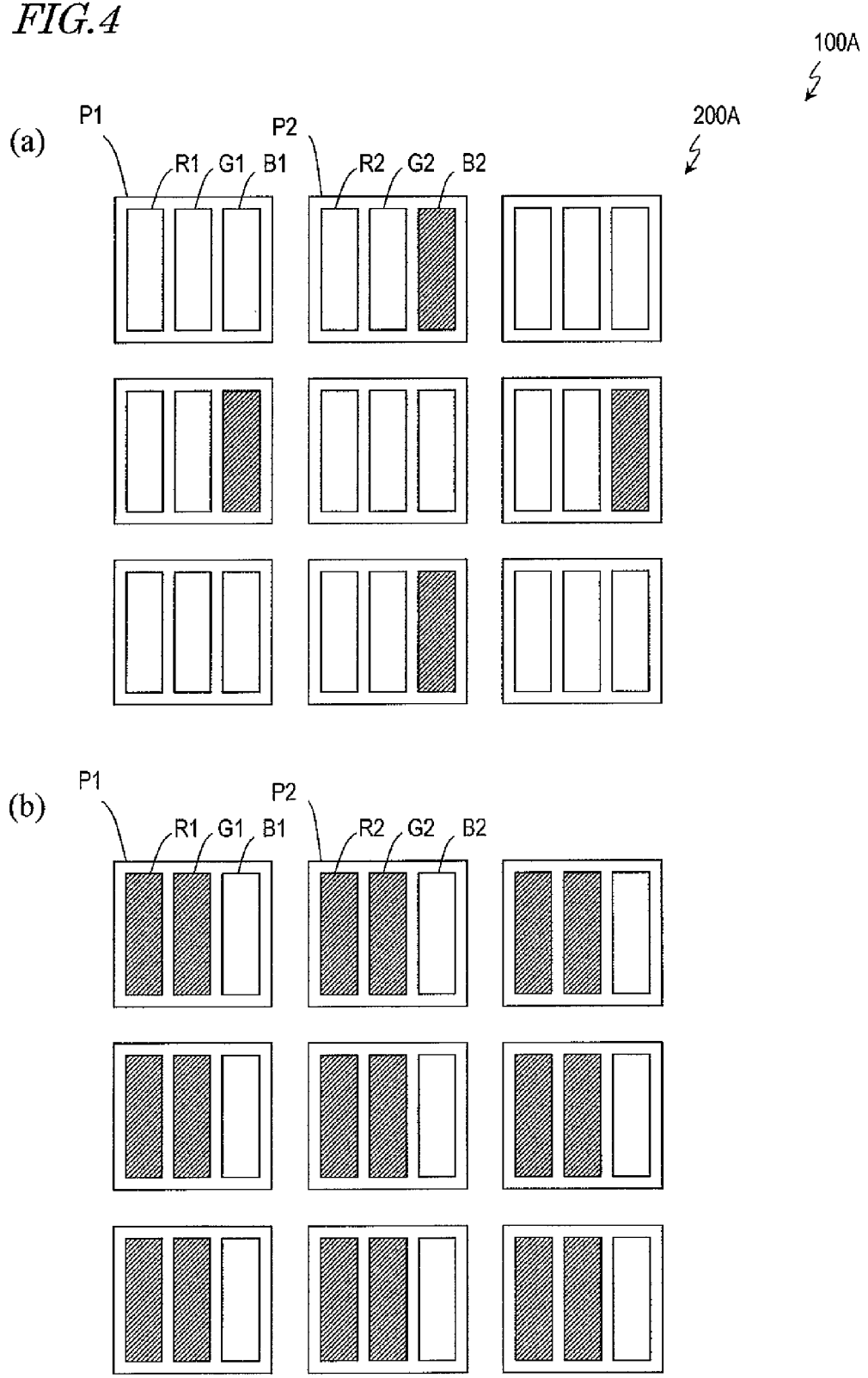
FIGS. 4(a) and 4(b) are schematic representations illustrating the LCD panel of a liquid crystal display device according to a preferred embodiment of the present invention.

Hereinafter, it will be outlined with reference to FIGS. 1, 4 and 5 how the liquid crystal display device 100A of this preferred embodiment operates in principle. In the example to be described below, the input signal is supposed to indicate that each and every pixel should represent the same color to avoid complicating the description overly. Also, the grayscale levels of respective subpixels indicated by the input signal will be identified by r, g and b, which will be referred to herein as "reference grayscale levels".

FIGS. 4(a) and 4(b) illustrate the appearance of the LCD panel 200A of this liquid crystal display device 100A. In FIG. 4(a), the input signal indicates that every pixel should represent the same achromatic color. On the other hand, in FIG. 4(b), the input signal indicates that every pixel should represent the same color blue. In each of FIGS. 4(a) and 4(b), two pixels that are adjacent to each other in the row direction are taken as an example. One of those two pixels is identified by P1 and its red, green and blue subpixels are identified by R1, G1 and B1, respectively. The other pixel is identified by P2 and its red, green and blue subpixels are identified by R2, G2 and B2, respectively.

First of all, it will be described with reference to FIG. 4(a) how the LCD panel 200A looks when the color indicated by the input signal is an achromatic color. In such a situation, the grayscale levels of the red, green and blue subpixels are equal to each other.

In the LCD panel 200A, the luminances of red and green subpixels R1 and G1 belonging to one P1 of two adjacent pixels are equal to those of red and green subpixels R2 and G2 belonging to the other pixel P2. But as the blue correcting sections 300b shown in FIG. 1(a) has made corrections, the luminance of the blue subpixel B1 of one P1 of the two adjacent pixels in the LCD panel 200A is different from that of the blue subpixel B2 of the other pixel P2. For example, although the red, green and blue subpixels R1, G1 and B1 belonging to the pixel P1 are all in ON state, the red and green subpixels R2 and G2 belonging to the pixel P2 are ON but the blue subpixel B2 thereof is OFF. In FIG. 4(a), look at any two blue subpixels belonging to two pixels that are adjacent to each other in the row direction, and it can be seen that their brightness levels are opposite to each other. And the same can be said about any two blue subpixels belonging to two pixels that are adjacent to each other in the column direction, too.

In this manner, using two blue subpixels belonging to two adjacent pixels as a unit, the blue correcting section 300b controls the luminances of those blue subpixels. That is why even if the input signal indicates that such blue subpixels belonging to two adjacent pixels have the same grayscale level, the LCD panel 200A corrects the grayscale level so that those two blue subpixels have mutually different luminances. As a result of this correction, one of the two blue subpixels belonging to those two adjacent pixels has its luminance increased by the magnitude of shift $\Delta S\alpha$, while the other blue subpixel has its luminance decreased by the magnitude of shift $\Delta S\beta$. Consequently, those two blue subpixels belonging to the two adjacent pixels have mutually different luminances. In two blue subpixels, one blue subpixel with the higher luminance will be referred to herein as a "bright blue subpixel", while the other blue subpixel with the lower luminance as a "dark blue subpixel". In this case, the luminance of the bright blue subpixel is higher than a luminance corresponding to a reference grayscale level, while that of the dark blue subpixel is lower than the luminance corresponding to the reference grayscale level.

Also, when the screen is viewed straight on, the difference between the luminance of the bright blue subpixel and the luminance corresponding to the reference grayscale level is substantially equal to the difference between the luminance corresponding to the reference grayscale level and the luminance of the dark blue subpixel, and the magnitude of shift ΔSα is ideally equal to the magnitude of shift ΔSβ. That is why the average of the luminances of respective blue subpixels belonging to two adjacent pixels in this LCD panel 200A as viewed straight on is substantially equal to that of the luminances corresponding to the grayscale levels of two adjacent blue subpixels as indicated by the input signal. In this preferred embodiment, the blue correcting section 300b makes corrections on the grayscale levels of blue subpixels belonging to two pixels that are adjacent to each other in the row direction.

If the blue correcting section 300b makes such corrections, the two blue subpixels belonging to two adjacent pixels have mutually different grayscale-luminance characteristics (i.e., different gamma characteristics). As a result, the viewing angle characteristic when the screen is viewed obliquely can be improved. In that case, the colors represented by those two adjacent pixels are strictly different from each other. However, if the LCD panel 200A has a sufficiently high resolution, the color sensed by a human viewer with his or her eyes will be the average of those two colors represented by the two adjacent pixels. As will be described later, in the liquid crystal display device 100A of this preferred embodiment, the LCD panel 200A just needs to have a comparatively high resolution and the blue correcting section 300b makes a correction when a decrease in resolution is hardly sensible.

For example, if the input signal indicates that the grayscale levels (r, g, b) of the red, green and blue subpixels should be (50, 50, 50), the liquid crystal display device 100A corrects the grayscale level of the blue subpixel into either 69 (=(2× $(50/255)^{2.2})^{1/2.2}$×255) or zero. As a result, in the LCD panel 200A, the red, green and blue subpixels R1, G1 and B1 belonging to the pixel P1 come to have luminances corresponding to the grayscale levels (50, 50, 69), while the red, green and blue subpixels R2, G2 and B2 belonging to the pixel P2 come to have luminances corresponding to the grayscale levels (50, 50, 0).

On the other hand, if the input signal indicates that the grayscale levels of the red, green and blue subpixels should be (186, 186, 186), the liquid crystal display device 100A corrects the grayscale level of the blue subpixel into either 255 $(=(2\times(186/255)^{2.2})^{1/2.2}\times255)$ or zero. As a result, in the LCD panel 200A, the red, green and blue subpixels R1, G1 and B1 belonging to the pixel P1 come to have luminances corresponding to the grayscale levels (186, 186, 255), while the red, green and blue subpixels R2, G2 and B2 belonging to the pixel P2 come to have luminances corresponding to the grayscale levels (186, 186, 0). In this manner, in a situation where subpixels other than the blue subpixel are turned ON, even if the blue subpixels belonging to two adjacent pixels have grayscale levels 255 and 0, those subpixels will look averaged, and no decrease in resolution will be sensed, to the human viewer's eye because other subpixels have been turned ON.

Next, it will be described with reference to FIG. 4(b) how the LCD panel 200A looks when the input signal indicates that the color blue should be represented. In this case, the input signal indicates that the red and green subpixels should have a grayscale level of zero and that the blue subpixel should have a middle grayscale level. In such a situation, since the red and green subpixels are both OFF in the LCD panel 200A, a blue subpixel with a low resolution would be easily sensible to the viewer.

In that case, in the liquid crystal display device 100A of this preferred embodiment, the blue correcting section 300b does not make any correction so that the red and green subpixels belonging to two adjacent pixels on the LCD panel 200A of the liquid crystal display device 100A have a luminance of zero and that the blue subpixels belonging to those two pixels also have the same luminance. For example, the red and green subpixels R1 and G1 belonging to the pixel P1 are OFF but the blue subpixel B1 thereof is ON. Likewise, the red and green subpixels R2 and G2 belonging to the pixel P2 are OFF but the blue subpixel B2 thereof is ON. In this manner, if a decrease in resolution is easily sensible, the blue correcting section 300b does not make any correction.

For example, if the input signal indicates that the grayscale levels of the red, green and blue subpixels should be (0, 0, 50), the liquid crystal display device 100A does not correct the grayscale level of the blue subpixel. As a result, in the LCD panel 200A, the red, green and blue subpixels R1, G1 and B1 belonging to the pixel P1 come to have luminances corresponding to the grayscale levels (0, 0, 50), while the red, green and blue subpixels R2, G2 and B2 belonging to the pixel P2 come to have luminances corresponding to the grayscale levels (0, 0, 50).

Also, if the input signal indicates that the grayscale levels of the red, green and blue subpixels should be (0, 0, 186), the liquid crystal display device 100A does not correct the grayscale level of the blue subpixel, either. As a result, in the LCD panel 200A, the red, green and blue subpixels R1, G1 and B1 belonging to the pixel P1 come to have luminances corresponding to the grayscale levels (0, 0, 186), while the red, green and blue subpixels R2, G2 and B2 belonging to the pixel P2 come to have luminances corresponding to the grayscale levels (0, 0, 186).

Hereinafter, it will be described with reference to FIG. 5 whether the blue correcting section 300b should make a correction or not. The blue correcting section 300b makes that decision based on the hue of the color specified by the input signal.

FIG. 5(a) is a schematic hue diagram and represents the color reproduction range of the LCD panel 200A as a regular triangle. For example, if the hue of the color specified by the input signal falls within Region 1, the blue correcting section 300b shown in FIG. 1(a) corrects the grayscale level b indicated by the input signal into a grayscale level b'. It should be noted that Region 2 represents a situation where the grayscale level b is higher than any other grayscale level r or g and Region 1 represents the other situations.

FIG. 5(b) shows a relation between the grayscale level b in Region 1 shown in FIG. 5(a) as indicated by the input signal and the corrected grayscale level b' of the blue subpixel. In this case, the grayscale level b1' indicates that of the bright blue subpixel of one of two adjacent pixels (e.g., the blue subpixel B1 of the pixel P1 shown in FIG. 4), while the grayscale level b2' indicates that of the dark blue subpixel of the other pixel (e.g., the blue subpixel B2 of the pixel P2 shown in FIG. 4).

As the grayscale level b1 increases, the grayscale level b1' increases but the grayscale level b2' remains zero when the grayscale level b is relatively low. But once the grayscale level b1' has reached the highest grayscale level with the increase in the grayscale level b, the grayscale level b2' starts to increase soon. As can be seen, unless the grayscale level b is the lowest grayscale level or the highest grayscale level, the grayscale level b1' is different from the grayscale level b2'. By having the correcting section 300A make such a correction, the viewing angle characteristic as viewed obliquely can be improved.

FIG. 5(c) shows a relation between the grayscale level b as indicated by the input signal and the corrected grayscale level b' of the blue subpixel in Region 2 shown in FIG. 5(a). In a situation where the hue of the color indicated by the input signal falls within Region 2 shown in FIG. 5(a), if the blue correcting section 300b shown in FIG. 1(a) has made a correction, the viewer may sense that the luminance of the bright blue subpixel belonging to one pixel is different from that of the dark blue subpixel belonging to the other pixel. That is why the blue correcting section 300b does not make any correction. In that case, the grayscale levels b1' and b2' of the respective blue subpixels of one of two adjacent pixels (e.g., the pixel P1 shown in FIG. 4) and the other pixel (e.g., the pixel P2 shown in FIG. 4) are equal to the grayscale level b as indicated by the input signal. As described above, if a decrease in resolution is easily sensible, the blue correcting section 300b does not make any correction. Consequently, the blue correcting section 300b can improve the viewing angle characteristic when the screen is viewed obliquely and can minimize a substantial decrease in resolution.

Hereinafter, advantages of the liquid crystal display device 100A of this preferred embodiment over its counterparts as Comparative Examples 1 and 2 will be described. In the example to be described below, the input signal is also supposed to indicate that every pixel should represent the same color.

First of all, a liquid crystal display device as Comparative Example 1 will be described with reference to FIG. 6. In the liquid crystal display device of Comparative Example 1, blue subpixels belonging to different pixels have the same luminance.

FIGS. 6(a) and 6(b) are schematic representations illustrating the liquid crystal display device of Comparative Example 1. If the highest grayscale level is 255, the grayscale levels of red, green and blue subpixels as indicated by the input signal are (50, 50, 50) in FIG. 6(a) and (0, 0, 50) in FIG. 6(b).

If the input signal indicates that the red, green and blue subpixels should have grayscale levels (50, 50, 50), the liquid crystal display device of Comparative Example 1 does not make any correction on the grayscale level of the blue subpixel, and therefore, the luminance of the blue subpixel corresponds to grayscale level 50. In that case, the whitening phenomenon is rather noticeable when the screen is viewed obliquely.

On the other hand, if the input signal indicates that the red, green and blue subpixels should have grayscale levels (0, 0, 50), the grayscale level of the blue subpixel is not corrected, either, and therefore, the luminance of the blue subpixel also corresponds to grayscale level 50. In that case, the whitening phenomenon is rather noticeable when the screen is viewed obliquely.

Next, a liquid crystal display device as Comparative Example 2 will be described. The liquid crystal display device of Comparative Example 2 makes a correction according to the grayscale level of the blue subpixel. FIGS. 7(a) and 7(b) are schematic representations illustrating a liquid crystal display device as Comparative Example 2. In the liquid crystal display device of Comparative Example 2, among blue subpixels belonging to different pixels, two blue subpixels belonging to two pixels that are adjacent to each other in either the row direction or the column direction have mutually different luminances and two diagonally adjacent blue subpixels have the same luminance.

The grayscale levels of red, green and blue subpixels as indicated by the input signal are (50, 50, 50) in FIG. 7(a) and (0, 0, 50) in FIG. 7(b), respectively.

If the input signal indicates that the red, green and blue subpixels should have grayscale levels (50, 50, 50), the liquid crystal display device of Comparative Example 2 corrects the grayscale level of the blue subpixel. As a result, the blue subpixel comes to have a luminance corresponding to grayscale level 69 $(=(2\times(50/255)^{2.2})^{1/2.2}\times255)$ or zero. In that case, the whitening phenomenon is less noticeable when the screen is viewed obliquely.

On the other hand, if the input signal indicates that the red, green and blue subpixels should have grayscale levels (0, 0, 50), the grayscale level of the blue subpixel is also corrected into grayscale level 69 or 0. In that case, the whitening phenomenon is less noticeable when the screen is viewed obliquely. Nevertheless, since every red subpixel and every green subpixel are OFF, the ON and OFF states of the blue subpixels are easily sensible. As a result, a blue spot pattern will be seen on the screen, and a decrease in resolution will be sensible.

Next, a liquid crystal display device 100A according to this preferred embodiment will be described with reference to FIG. 8. Unlike the liquid crystal display device of Comparative Example 2, the liquid crystal display device 100A of this preferred embodiment makes a correction based on not only the grayscale level of blue subpixels but also those of red and green subpixel as well.

The grayscale levels of red, green and blue subpixels as indicated by the input signal are also (50, 50, 50) in FIG. 8(a) and (0, 0, 50) in FIG. 8(b), respectively.

If the input signal indicates that the red, green and blue subpixels should have grayscale levels (50, 50, 50), the liquid crystal display device 100A of this preferred embodiment corrects the grayscale level of the blue subpixel. As a result, the blue subpixel comes to have a luminance corresponding to grayscale level 69 or zero as shown in FIG. 8(a). In that case, the whitening phenomenon is less noticeable when the screen is viewed obliquely. That grayscale level 50 of each blue subpixel is displayed by using two blue subpixels belonging to two adjacent pixels. Thus, strictly speaking, the resolution of the color blue has decreased. However, since the red and green subpixels are ON, that decrease in the resolution of the blue subpixels is not sensible to the human viewer's eye.

On the other hand, if the input signal indicates that the red, green and blue subpixels should have grayscale levels (0, 0, 50), the grayscale level of the blue subpixel is not corrected. And each blue subpixel has a luminance corresponding to the grayscale level 50 as shown in FIG. 8(b). In that case, although every red subpixel and every green subpixel are OFF, every blue subpixel is ON, and therefore, a decrease in resolution can be minimized.

In the liquid crystal display device 100A of this preferred embodiment, the blue correcting section 300b makes a correction based on not only the grayscale level of the blue subpixels but also those of red and green subpixels as well. That is why even if every blue subpixel has the same grayscale level but if red and green subpixels have varying grayscale levels, the blue correcting section 300b may or may not correct the grayscale level of the blue subpixels.

As described above, the correcting section 300A does correct the grayscale level rgb as indicated by the input signal if a predetermined condition is satisfied but does not correct the grayscale level rgb as indicated by the input signal if another condition is satisfied. By having the correcting section 300A make a correction, the viewing angle characteristic as viewed obliquely can be improved. Strictly speaking, the resolution somewhat decreases as a result of the correction. But the correcting section 300A makes the correction only when a decrease in resolution is not easily sensible. Stated otherwise, if a decrease in resolution is easily sensible, the correcting section 300A does not make any correction. Thus, such a correcting section 300A can not only improve the viewing angle characteristic as viewed obliquely but also minimize a substantial decrease in resolution as well.

Figure 9:
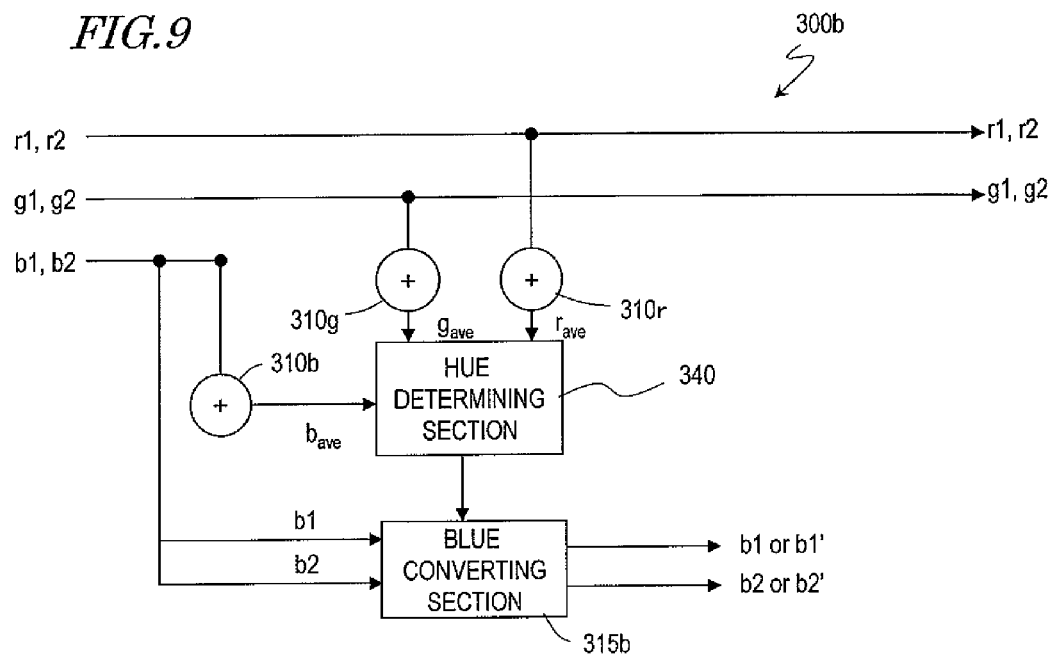
FIG. 9 is a schematic representation illustrating a configuration for a blue correcting section in the liquid crystal display device shown in FIG. 1.
Figure 10:
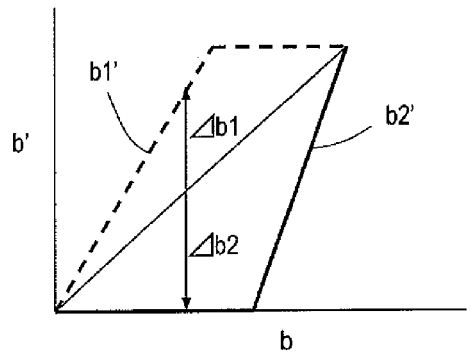
FIG. 10 is a graph showing how the blue correcting section shown in FIG. 9 carries out conversion.

Hereinafter, the blue correcting section 300b will be described with reference to FIGS. 9 and 10. FIG. 9 is a schematic representation illustrating the configuration of the blue correcting section 300b. In FIG. 9, the grayscale levels r1, g1 and b1 are indicated by the input signal for the respective subpixels R1, G1 and B1 of the pixel P1 shown in FIG. 4, while the grayscale levels r2, g2 and b2 are indicated by the input signal for the respective subpixels R2, G2 and B2 of the pixel P2. In this case, the grayscale levels r1, r2, g1 and g2 are not corrected by the blue correcting section 300b but the grayscale levels b1 and b2 are corrected in the following manner.

First of all, the average of the grayscale levels b1 and b2 is calculated by using an adding section 310b. In the following description, the average of the grayscale levels b1 and b2 will be referred to herein as an average grayscale level $b_{ave}$. Likewise, the average of the grayscale levels r1 and r2 is calculated by using an adding section 310r and that of the grayscale levels g1 and g2 is calculated by using an adding section 310g. In the following description, the average of the grayscale levels r1 and r2 and that of the grayscale levels g1 and g2 will be referred to herein as an average grayscale level $r_{ave}$ and an average grayscale level $g_{ave}$, respectively.

The hue determining section 340 determines the hue of the color represented by the input signal. Specifically, the hue determining section 340 determines the hue by using average grayscale levels $r_{ave}$, $g_{ave}$ and $b_{ave}$. For example, if one of $r_{ave} > b_{ave}$, $g_{ave} > b_{ave}$ and $b_{ave} = 0$ is satisfied, then the hue determining section 340 determines that the hue is not blue. Also, for example, if $b_{ave} > 0$ and $r_{ave} = g_{ave} = 0$ are satisfied, then the hue determining section 340 determines that the hue is blue.

In this manner, the blue converting section 315b changes the grayscale levels b1 and b2 of the blue subpixels based on the decision made by the hue determining section 340. If the hue determining section 340 has determined that the hue is not blue, the blue converting section 315b changes the grayscale levels b1 and b2 of the blue subpixels into b1' and b2', respectively, so that their relative luminance as viewed obliquely becomes closer to their relative luminance as viewed straight on.

When making a correction, the blue converting section 315b outputs a grayscale level b' based on the grayscale level b of the blue subpixel as indicated by the input signal. FIG. 10 shows the relation between the input grayscale level b and the output grayscale level b' when a correction needs to be made. The grayscale level b1' is b1+Δb1 and the grayscale level b2' is b2−Δb2.

In accordance with this relation, the blue converting section 315b converts the grayscale level b1 into the grayscale level b1' and outputs it, and also converts the grayscale level b2 into the grayscale level b2' and outputs it. Optionally, the blue converting section 315b may carry out this conversion by reference to a lookup table. Alternatively, the blue converting section 315b may determine the grayscale level b' based on the grayscale level b by making predetermined calculations. By providing the grayscale levels b1' and b2' for the LCD panel 200A, the blue subpixel B1 comes to have a luminance corresponding to the sum of the luminance level $Y_{b1}$ and the magnitude of shift ΔSα and the blue subpixel B2 comes to have a luminance corresponding to the difference between the luminance level $Y_{b2}$ and the magnitude of shift ΔSβ.

Thus, if the hue determining section 340 has determined that the hue is blue, the blue converting section 315 outputs the grayscale levels b1 and b2 of the blue subpixels as they are without converting them. In that case, the grayscale level b1 is equal to the grayscale level b2. In the LCD panel 200A, the average straight viewing luminance corresponding to the grayscale levels b1' and b2' is substantially equal to the one corresponding to the grayscale levels b1 and b2.

As described above, the liquid crystal display device 100A of this preferred embodiment includes the blue correcting section 300b and controls the luminance of the blue subpixel according to the grayscale levels of red, green and blue subpixels, thereby improving the viewing angle characteristic and minimizing a decrease in resolution at the same time. In the preferred embodiment described above, the blue correcting section 300b decides, by the grayscale levels of red, green and blue subpixels, whether the grayscale level of the blue subpixel needs to be corrected or not. And in the LCD panel 200A, the luminances of the red, green and blue subpixels change by the predetermined magnitude of shift ΔSα or ΔSβ. However, the present invention is in no way limited to that specific preferred embodiment. Alternatively, the blue correcting section 300b may not only decide whether or not to correct the grayscale level of the blue subpixel but also change the magnitude of shift ΔSα or ΔSβ when the correction is required both by making reference to the grayscale levels of the red, green and blue subpixels.

Figure 11:
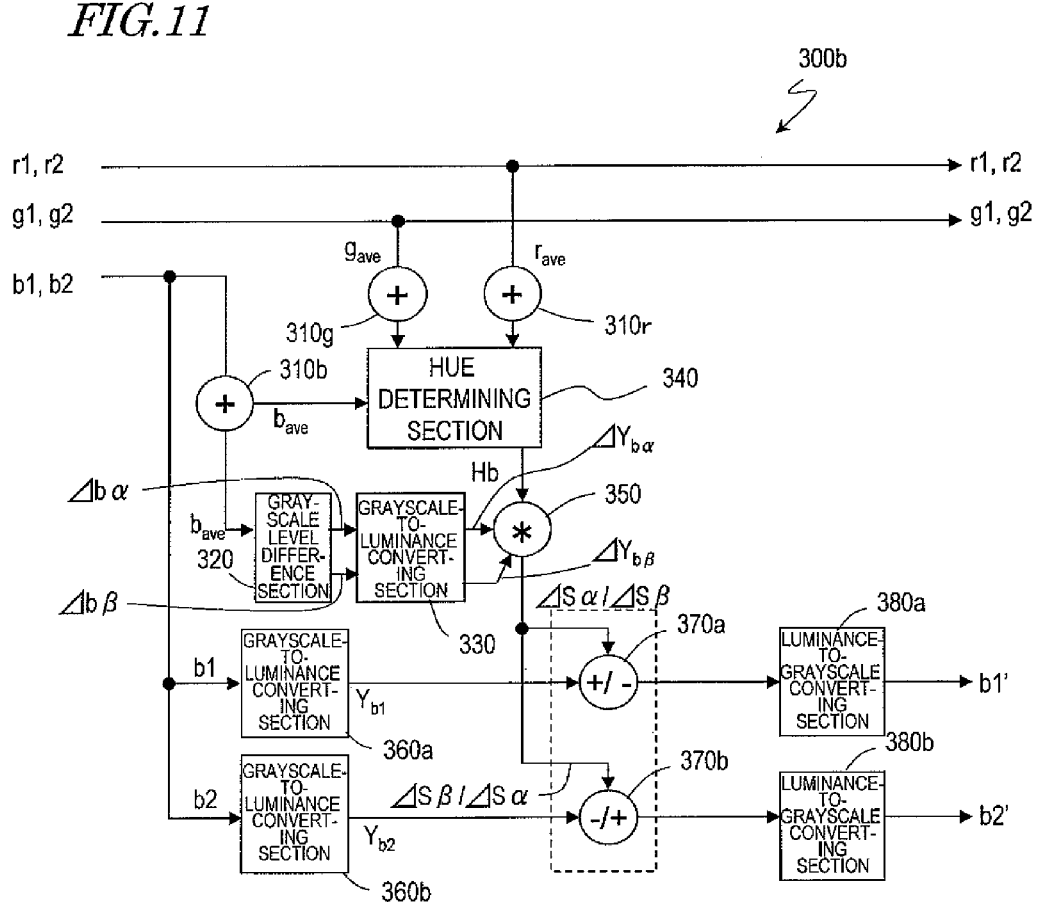
FIG. 11 is a schematic representation illustrating a specific configuration for the blue correcting section of the liquid crystal display device shown in FIG. 1.

Hereinafter, a specific configuration for the blue correcting section 300b will be described with reference to FIG. 11. In FIG. 11, the grayscale levels r1, g1 and b1 are indicated by the input signal for the respective subpixels R1, G1 and B1 of the pixel P1 shown in FIG. 4, while the grayscale levels r2, g2 and b2 are indicated by the input signal for the respective subpixels R2, G2 and B2 of the pixel P2. In this correcting section 300A, the magnitudes of shift ΔSβ and ΔSβ of the respective luminance levels of the blue subpixels B1 and B2 are obtained in the following manner.

First of all, the average grayscale level $b_{ave}$ of the grayscale levels b1 and b2 is calculated by using an adding section 310b. Next, a grayscale level difference section 320 calculates two grayscale level differences Δbα and Δbβ with respect to the single average grayscale level $b_{ave}$. The grayscale level differences Δbα and Δbβ are associated with a bright blue subpixel and a dark blue subpixel, respectively.

In this manner, the grayscale level difference section 320 calculates two grayscale level differences Δbα and Δbβ with respect to the single average grayscale level $b_{ave}$. In this case, the average grayscale level $b_{ave}$ and the grayscale level differences Δbα and Δbβ may satisfy the predetermined relation shown in FIG. 12(a), for example. As the average grayscale level $b_{ave}$ increases from a low grayscale toward a predetermined middle grayscale, the grayscale level differences Δbα and Δbβ both increase. On the other hand, as the average grayscale level $b_{ave}$ increases from the predetermined middle grayscale toward a high grayscale, the grayscale level differences Δbα and Δbβ both decrease. The grayscale level difference section 320 may determine the grayscale level differences Δbα and Δbβ with respect to the average grayscale level $b_{ave}$ by reference to a lookup table. Alternatively, the grayscale level difference section 320 may also determine the grayscale level differences Δbα and Δbβ by performing predetermined computations on the average grayscale level $b_{ave}$.

Next, a grayscale-to-luminance converting section 330 converts the grayscale level differences Δbα and Δbβ into luminance level differences $\Delta Y_b \alpha$ and $\Delta Y_b \beta$, respectively. In this case, the greater the luminance level difference $\Delta Y_b \alpha$, $\Delta Y_b \beta$, the greater the magnitude of shift Δsα, ΔSβ. Ideally, the magnitude of shift ΔSα is equal to the magnitude of shift ΔSβ. That is why the grayscale level difference section 320 may give only one of the grayscale level differences Δbα and Δbβ to calculate only one of the magnitudes of shift ΔSα and ΔSβ.

Meanwhile, the average grayscale level $r_{ave}$ of the grayscale levels r1 and r2 is calculated by another adding section 310r and the average grayscale level $g_{ave}$ of the grayscale levels g1 and g2 is calculated by still another adding section 310g.

The hue determining section 340 determines the hue of the color represented by the input signal. Specifically, the hue determining section 340 determines the hue by using average grayscale levels $r_{ave}$, $g_{ave}$ and $b_{ave}$. The hue coefficient Hb is a function that varies according to the hue. Specifically, the hue coefficient Hb is a function that decreases as the blue component of the color to represent increases. Supposing function Max is a function representing the highest one of multiple variables, function Second is a function representing the second highest one of the multiple variables, M=MAX ($r_{ave}$, $g_{ave}$, $b_{ave}$) and S=Second ($r_{ave}$, $g_{ave}$, $b_{ave}$), the hue coefficient Hb can be represented as Hb=S/M ($b_{ave} \geq r_{ave}$, $b_{ave} \geq g_{ave}$ and $b_{ave} > 0$). More specifically, if $b_{ave} \geq g_{ave} \geq r_{ave}$ and $b_{ave} > 0$, then Hb=$g_{ave}/b_{ave}$. Also, if $b_{ave} \geq r_{ave} \geq g_{ave}$ and $b_{ave} > 0$ then Hb=$r_{ave}/b_{ave}$. Furthermore, if at least one of $b_{ave} < r_{ave}$, $b_{ave} < g_{ave}$ and $b_{ave} = 0$ is satisfied, then Hb=1.

Next, the magnitudes of shift ΔSα and ΔSβ are calculated. In this case, the magnitude of shift ΔSα is obtained as the product of $\Delta Y_b \alpha$ and the hue coefficient Hb, while the magnitude of shift ΔSβ is obtained as the product of $\Delta Y_b \beta$ and the hue coefficient Hb. A multiplying section 350 multiplies the luminance level differences $\Delta Y_b \alpha$ and $\Delta Y_b \beta$ by the hue coefficient Hb, thereby obtaining the magnitudes of shift ΔSα and ΔSβ.

Meanwhile, a grayscale-to-luminance converting section 360a carries out a grayscale-to-luminance conversion on the grayscale level b1, thereby obtaining a luminance level $Y_{b1}$, which can be calculated by the following equation:

$$Y_{b1} = b1^{2.2} \text{ (where } 0 \leq b1 \leq 1\text{)}$$

In the same way, another grayscale-to-luminance converting section 360b carries out a grayscale-to-luminance conversion on the grayscale level b2, thereby obtaining a luminance level $Y_{b2}$.

Next, an adding and subtracting section 370a adds the luminance level $Y_{b1}$ and the magnitude of shift ΔSα together, and then the sum is subjected to luminance-to-grayscale conversion by a luminance-to-grayscale converting section 380a, thereby obtaining a grayscale level b1'. On the other hand, another adding and subtracting section 370b subtracts the magnitude of shift ΔSβ from the luminance level $Y_{b2}$, and then the remainder is subjected to luminance-to-grayscale conversion by another luminance-to-grayscale converting section 380b, thereby obtaining a grayscale level b2'. In general, if the input signal indicates that a pixel should represent an achromatic color at a middle grayscale, then the grayscale levels r, g and b indicated by the input signal are equal to each other. Consequently, in this LCD panel 200A, the luminance level $Y_{b1}'$ is higher than the luminance levels $Y_r$ and $Y_g$ but the luminance level $Y_{b2}'$ is lower than the luminance levels $Y_r$ and $Y_g$. Also, the average of the luminance levels $Y_{b1}'$ and $Y_{b2}'$ is almost equal to the luminance levels $Y_r$ and $Y_g$.

FIG. 12(b) shows the grayscale level of the blue subpixel to be entered into the LCD panel 200A. In this case, the input signal indicates that an achromatic color should be represented and the hue coefficient Hb may be equal to one, for example. As the grayscale level difference section 320 gives the grayscale level differences Δbα and Δbβ, the grayscale level b1' is given by b1+Δb1 and the grayscale level b2' is given by b2−Δb2. As described above, using the grayscale levels b1' and b2', the blue subpixel B1 comes to have a luminance corresponding to the sum of the luminance level $Y_{b1}$ and the magnitude of shift ΔSα and the blue subpixel B2 comes to have a luminance corresponding to the difference between the luminance level $Y_{b2}$ and the magnitude of shift ΔSβ. On the other hand, if the hue coefficient Hb is zero, the grayscale levels b1 and b2 of the blue subpixels as indicated by the input signal are output as the grayscale levels and b2'.

As described above, the magnitudes of shift ΔSα and ΔSβ are represented by a function that includes the hue coefficient Hb as a parameter and change as the hue coefficient Hb varies. Hereinafter, it will be described with reference to FIG. 13 how the blue correcting section 300b changes the hue coefficient. FIG. 13 is a schematic hue diagram and represents the color reproduction range of the LCD panel 200A as a regular triangle. For example, if the grayscale level as indicated by the input signal satisfies $r_{ave}=g_{ave}=b_{ave}$, the hue coefficient Hb becomes one. Likewise, if the grayscale level as indicated by the input signal satisfies $0=r_{ave}<g_{ave}=b_{ave}$, then the hue coefficient Hb also becomes one. On the other hand, if $0=r_{ave}=g_{ave}<b_{ave}$, then the hue coefficient Hb becomes zero.

For example, if the grayscale levels ($r_{ave}$, $g_{ave}$, $b_{ave}$) of red, green and blue subpixels are (128, 128, 128) with respect to the highest grayscale level of 255, the hue coefficient Hb is one, and therefore, the magnitudes of shift ΔSα and ΔSβ become $\Delta Y_b \alpha$ and $\Delta Y_b \beta$, respectively. On the other hand, if ($r_{ave}$, $g_{ave}$, $b_{ave}$) are (0, 0, 128), the hue coefficient Hb becomes zero, and therefore, the magnitudes of shift ΔSα and ΔSβ become zero. Furthermore, if ($r_{ave}$, $g_{ave}$, $b_{ave}$) are (64, 64, 128), which are halfway between these two situations, then Hb=0.5, and the magnitudes of shift ΔSα and ΔSβ become 0.5×$\Delta Y_b \alpha$ and 0.5Δ $Y_b \beta$, respectively, which are half as large as when Hb=1.0. In this manner, the magnitudes of shift ΔSα and ΔSβ change continuously according to the hue indicated by the input signal, and a sudden change of the display characteristic can be minimized. FIG. 12(b) is a graph showing a result obtained when the hue coefficient Hb is one. If the hue coefficient Hb is zero, on the other hand, then the grayscale level b1 (=b2) as indicated by the input signal becomes equal to the output grayscale levels b1' and b2'. As can be seen, if the red and green subpixels are in OFF state, the same grayscale level as the level specified by the input signal for the blue subpixel is output when the hue coefficient Hb is used. As a result, the resolution of the color blue does not decrease. On the other hand, if the red and green subpixels are in ON state (e.g., if the input signal indicates that the respective subpixels should have the same grayscale level), the resolution of the color blue does decrease, strictly speaking. Actually, however, that decrease in the resolution of the color blue is not easily sensible to the human viewer's eye. Furthermore, since the hue coefficient Hb is a function that changes continuously when the red and green subpixels are in OFF state and when an achromatic color should be displayed, such a sudden change of the display characteristic can be minimized.

As described above, the blue correcting section 300b changes the magnitude of shift according to the color indicated by the input signal. As a result, not only can the viewing angle characteristic be improved but also can the decrease in resolution be minimized as well. In the blue correcting section 300b shown in FIG. 11, the grayscale level section 320 calculates a grayscale level difference corresponding to the average grayscale level $b_{ave}$, and the magnitude of shift can be changed easily according to the hue by using the grayscale level difference.

In the example described above, the grayscale level b1 indicated by the input signal is equal to the grayscale level b2. However, the present invention is in no way limited to that specific preferred embodiment. Alternatively, the grayscale level b1 indicated by the input signal may be different from the grayscale level b2. Nevertheless, if the grayscale level b1 is different from the grayscale level b2, then the luminance level $Y_{b1}$ that has been subjected to the grayscale-luminance conversion by the grayscale-to-luminance converting section 360a shown in FIG. 11 is different from the luminance level $Y_{b2}$ that has been subjected to the grayscale-luminance conversion by the grayscale-to-luminance converting section 360b. If there is a great difference in luminance level between adjacent pixels (particularly when a text is displayed), the difference between those luminance levels $Y_{b1}$ and $Y_{b2}$ is even more significant.

Figure 14:
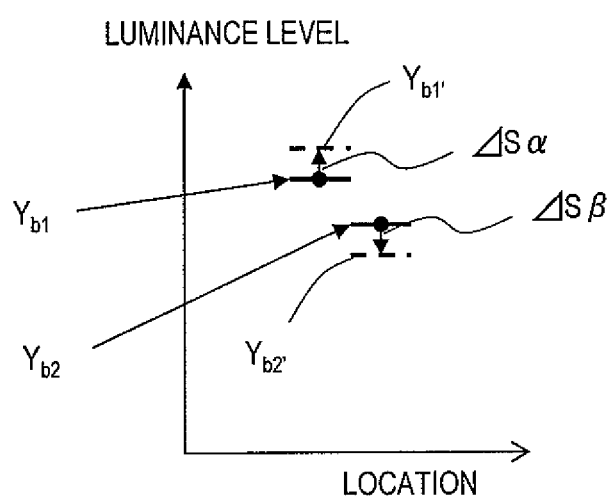
FIG. 14 is a schematic representation showing how the luminance level changes in a situation where blue subpixels belonging to adjacent pixels have mutually different grayscale levels in the liquid crystal display device shown in FIG. 1.

Specifically, if the grayscale level b1 is higher than the grayscale level b2, the luminance-to-grayscale converting sections 380a and 380b perform luminance-to-grayscale conversion based on the sum of the luminance level $Y_{b1}$ and the magnitude of shift ΔSα and the difference between the luminance level $Y_{b2}$ and the magnitude of shift ΔSβ respectively. In that case, as shown in FIG. 14, the luminance level $Y_{b1}'$ corresponding to the grayscale level b1' will be higher by the magnitude of shift ΔSα than the luminance level $Y_{b1}$ corresponding to the grayscale level b1. The luminance level $Y_{b2}'$ corresponding to the grayscale level b2' will be lower by the magnitude of shift ΔSβ than the luminance level $Y_{b2}$ corresponding to the grayscale level b2. As a result, the difference between the respective luminances corresponding to the grayscale levels b1' and b2' will be bigger than the difference between the respective luminances corresponding to the grayscale levels b1 and b2.

Now take a look at four of the multiple pixels, which are arranged two columns and two rows to form a matrix. And the upper left, upper right, lower left and lower right portions of the matrix will be referred to herein as pixels P1 through P4, respectively. Also, the grayscale levels of respective blue subpixels as indicated by the input signal with respect to those pixels P1 through P4 will be identified herein by b1 through b4, respectively. As already described with reference to FIG. 8(a), if the input signal indicates that the respective subpixels should represent the same color (i.e., the grayscale levels b1 through b4 are equal to each other), the grayscale level b1' is higher than the grayscale level b2' and the grayscale level b4' is higher than the grayscale level b3'.

Also, suppose the input signal indicates that the pixels P1 and P3 should have high grayscales, the pixels P2 and P4 should have low grayscales, there is a display boundary between the pixels P1 and P3 and between the pixels P2 and P4, the grayscale levels b1 and b2 satisfy b1>b2, and the grayscale levels b3 and b4 satisfy b3>b4. In that case, the difference between the respective luminances corresponding to the grayscale levels b1' and b2' will be bigger than the difference between the respective luminances corresponding to the grayscale levels b1 and b2. On the other hand, the difference between the respective luminances corresponding to the grayscale levels b3' and b4' will be smaller than the difference between the respective luminances corresponding to the grayscale levels b3 and b4.

Also, as described above, if the color indicated by the input signal is a single color (such as the color blue), then the hue coefficient Hb is either equal to, or close to, zero. In that case, the magnitude of shift decreases, the input signal is output as it is, and therefore, the resolution can be maintained. On the other hand, if the color indicated by the input signal is an achromatic color, then the hue coefficient Hb is either equal to, or close to, one. In that case, the luminance difference in a corrected image will increase and decrease from one column of pixels to another compared to the original image, thus making the edges look uneven and causing a decrease in resolution. Furthermore, if the grayscale levels b1 and b2 are either equal to, or close to, each other, such unevenness is not so noticeable considering the human visual sense. However, the bigger the difference between the grayscale levels b1 and b2, the more noticeable such unevenness gets.

Hereinafter, a specific example will be described with reference to FIG. 15. In this example, the input signal is supposed to indicate that a line in an achromatic color with a relatively high luminance (i.e., a light gray line) should be displayed with a line width of one pixel on the background in an achromatic color with a relatively low luminance (i.e., a dark gray background). In that case, ideally, the viewer should sense that light gray line.

Figure 15:
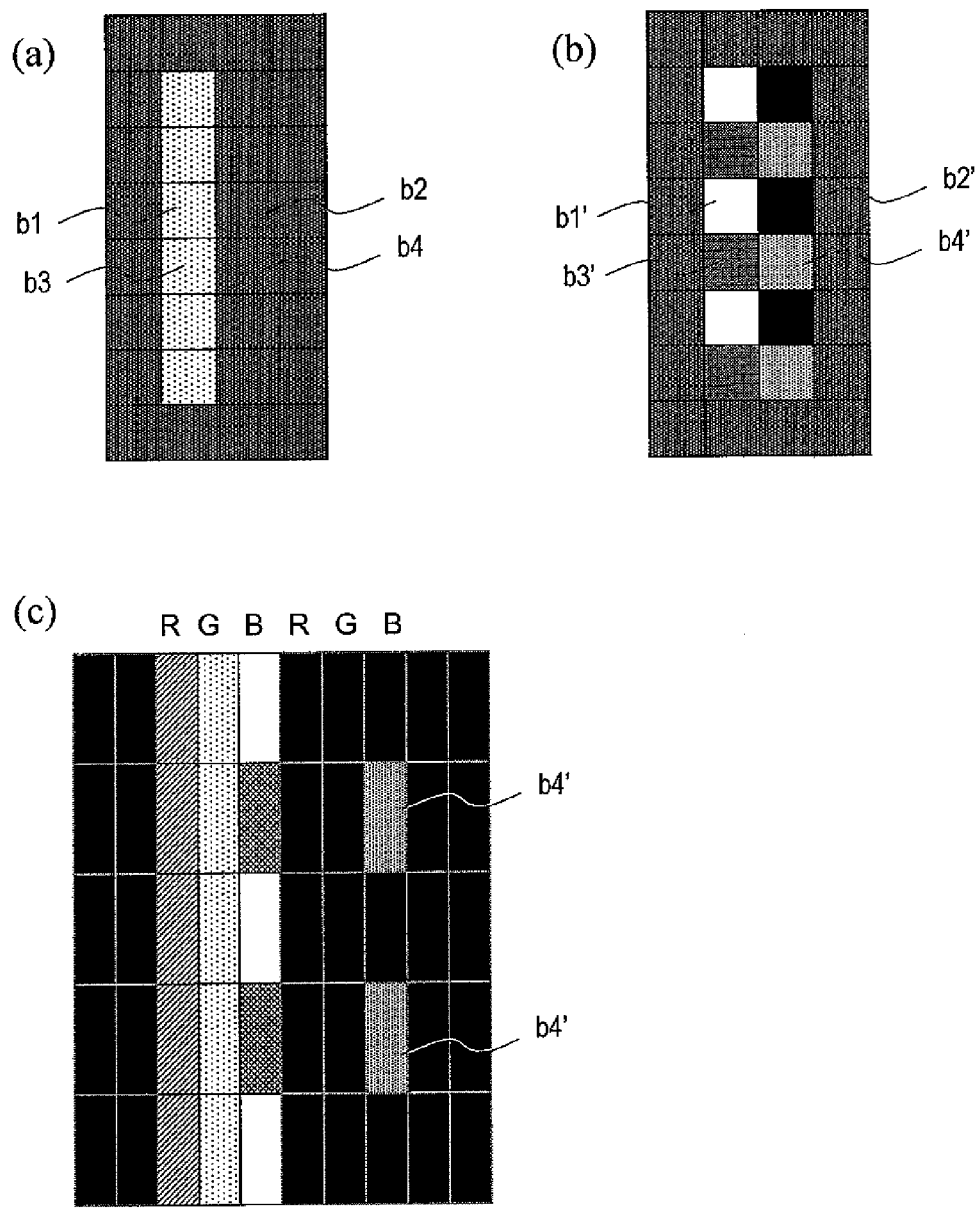
FIG. 15(a) is a schematic representation illustrating the liquid crystal display device of Comparative Example 1 and FIGS. 15(b) and 15(c) are schematic representations illustrating the liquid crystal display device of the first preferred embodiment.

FIG. 15 (a) shows the luminances of blue subpixels in the liquid crystal display device of Comparative Example 1. Only blue subpixels are shown in FIG. 15(a). Also, as for the grayscale levels b1 through b4 of the blue subpixels as indicated by the input signal with respect to the four pixels P1 through P4, the grayscale levels b1 and b2 satisfy b1>b2 and the grayscale levels b3 and b4 satisfy b3>b4. In that case, in the liquid crystal display device of Comparative Example 1, the blue subpixels of those four pixels P1 through P4 have luminances corresponding to the grayscale levels b1 through b4 indicated by the input signal.

FIG. 15(b) shows the luminances of blue subpixels in the liquid crystal display device 100A. In this liquid crystal display device 100A, the grayscale level b1' of the blue subpixel of the pixel P1 is higher than the grayscale level b1, the grayscale level b2' of the blue subpixel of the pixel P2 is lower than the grayscale level b2, the grayscale level b3' of the blue subpixel of the pixel P3 is lower than the grayscale level b3, and the grayscale level b4' of the blue subpixel of the pixel P4 is higher than the grayscale level b4. In this manner, in any two pixels that are adjacent to each other in either the row direction or the column direction, the grayscale level (luminance) alternately increases and decreases with respect to the one indicated by the input signal. That is why comparing FIGS. 15(a) and 15(b) to each other, it can be seen that in this liquid crystal display device 100A, the difference between the grayscale levels b1' and b2' becomes greater than the difference between the grayscale levels b1 and b2 as indicated by the input signal. On the other hand, the difference between the grayscale levels b3' and b4' becomes smaller than the difference between the grayscale levels b3 and b4 as indicated by the input signal. As a result, in this liquid crystal display device 100A, not only the column including the pixels P1 and P3 that are associated with the relatively high grayscale levels b1 and b3 in the input signal but also the pixel P4 that is associated with the relatively low grayscale level b4 in the input signal have blue subpixels with relatively high luminances. In that case, even if the input signal indicates that a light gray line should be represented in the image displayed, this liquid crystal display device 100A will display not only the light gray line but also blue dotted lines adjacent to that line as shown in FIG. 15(a). Consequently, the display quality decreases significantly in the contours of the gray line.

In the example described above, the magnitude of shift ΔSα is obtained as the product of the luminance level difference $ΔY_b α$ and the hue coefficient Hb and the magnitude of shift ΔSβ is obtained as the product of the luminance level difference $ΔY_b β$ and the hue coefficient Hb. To avoid that, however, a different parameter may be used in determining the magnitudes of shift ΔSα and ΔSβ. In general, when a text image is displayed, for example, the grayscale levels b1 and b2 are significantly different from each other in edges between a line of pixels that are displayed in the column direction and their adjacent pixels that are displayed in the background. That is why if the hue coefficient Hb is close to one, the difference between the grayscale levels b1' and b2' may further increase and the image quality may decrease as a result of the correction. To avoid such a situation, a continuous coefficient representing the degree of color continuity between adjacent pixels as indicated by the input signal may also be used as an additional parameter to calculate the magnitudes of shift $\Delta S\alpha$ and $\Delta S\beta$. If there is a relatively big difference between the grayscale levels b1 and b2, the magnitudes of shift $\Delta S\alpha$ and $\Delta S\beta$ may vary according to the continuous coefficient so as to be decreased either to zero or significantly. As a result, the decrease in image quality can be minimized. For example, if there is a relatively small difference between the grayscale levels b1 and b2, then the continuous coefficient increases and the luminances of blue subpixels belonging to adjacent pixels are controlled. However, if there is a relatively big difference between the grayscale levels b1 and b2 in the image boundary area, then the continuous coefficient may decrease and the luminances of the blue subpixels need not be controlled.

Figure 16:
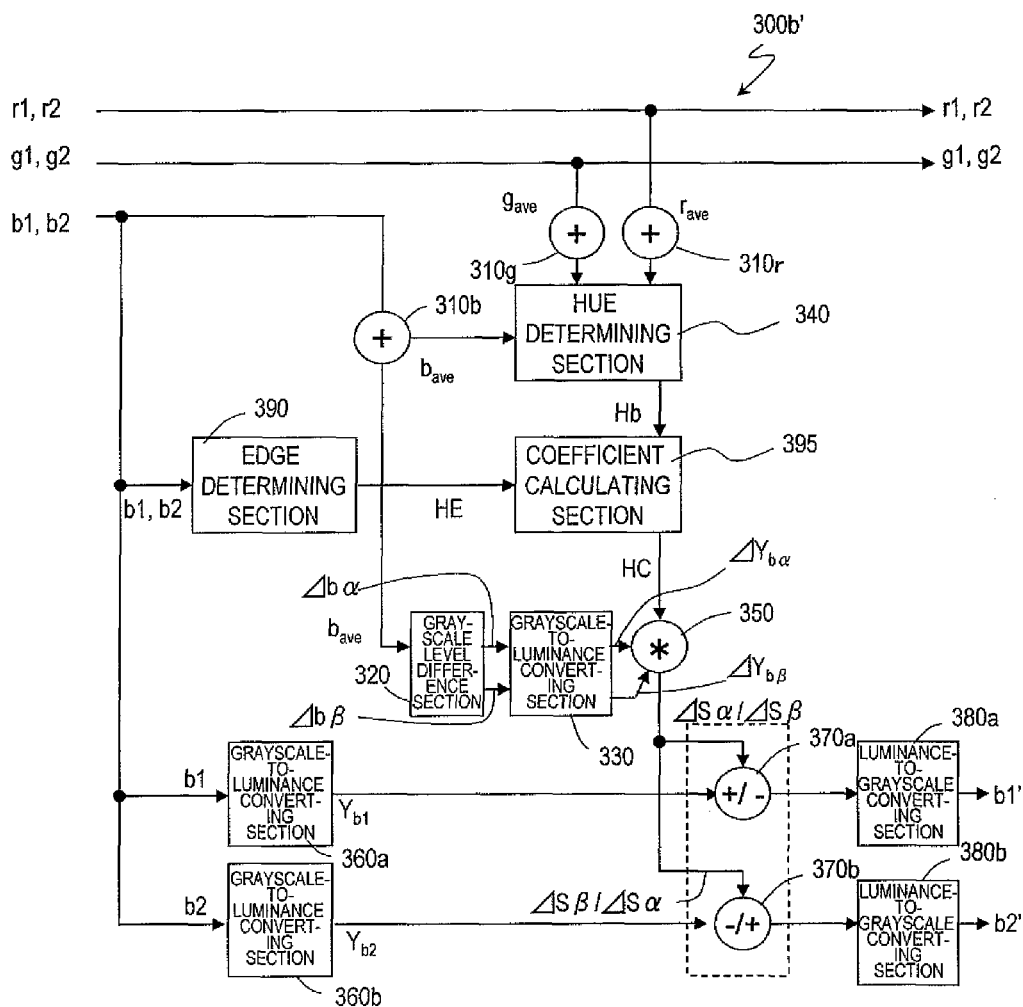
FIG. 16 is a schematic representation illustrating a configuration for a blue correcting section in a liquid crystal display device as a modified example of the first preferred embodiment.

Hereinafter, a blue correcting section 300b' for controlling the luminances of blue subpixels as described above will be described with reference to FIG. 16. In the following example, edge coefficients are used in place of the continuous coefficients. This blue correcting section 300b' has the same configuration as the blue correcting section 300b that has already been described with reference to FIG. 11 except that this blue correcting section 300b' further includes an edge determining section 390 and a coefficient calculating section 395. And description of their common features will be omitted herein to avoid redundancies.

The edge determining section 390 obtains an edge coefficient HE based on the grayscale levels b1 and b2 that are indicated by the input signal. The edge coefficient HE is a function that increases as the difference in grayscale level between the blue subpixels of two adjacent pixels increases. If there is a relatively big difference between the grayscale levels b1 and b2 (i.e., if there is a low degree of continuity between the grayscale levels b1 and b2), then the edge coefficient HE is high. On the other hand, if there is a relatively small difference between the grayscale levels b1 and b2 (i.e., if there is a high degree of continuity between the grayscale levels b1 and b2), then the edge coefficient HE is low. In this manner, the lower the continuity in grayscale level between the blue subpixels of two adjacent pixels (i.e., the smaller the continuous coefficient described above), the higher the edge coefficient HE. And the higher the continuity in grayscale level between them (i.e., the greater the continuous coefficient described above), the lower the edge coefficient HE.

Also, the edge coefficient HE changes continuously according to the difference in grayscale level between the blue subpixels of two adjacent pixels. For example, if the absolute value of the difference in grayscale level between the blue subpixels of two adjacent pixels is |b1−b2| and if MAX=MAX (b1, b2), then the edge coefficient HE can be represented as HE−|b1−b2|/MAX. However, if MAX=0, then HE=0.

Next, the coefficient calculating section 395 calculates a correction coefficient HC based on the hue coefficient Hb that has been obtained by the hue determining section 340 and the edge coefficient HE that has been obtained by the edge determining section 390. The correction coefficient HC may be represented as HC=Hb−HE, for example. Optionally, clipping may be carried out so that the correction coefficient HC falls within the range of 0 to 1 in the coefficient calculating section 395. Subsequently, the multiplying section 350 multiplies the correction coefficient HC and the luminance level differences $\Delta Y_B\alpha$ and $\Delta Y_B\beta$ together, thereby obtaining the magnitudes of shift $\Delta S\alpha$ and $\Delta S\beta$.

In this manner, the blue correcting section 300b' obtains the magnitudes of shift $\Delta S\alpha$ and $\Delta S\beta$ by multiplying together the correction coefficient HC, which has been obtained based on the hue coefficient Hb and the edge coefficient HE, and the luminance level differences $\Delta Y_B\alpha$ and $\Delta Y_B\beta$. As described above, the edge coefficient HE is a function that increases as the difference in grayscale level between the blue subpixels of two adjacent pixels increases. That is why the greater the edge coefficient HE, the smaller the correction coefficient HC that regulates the distribution of luminances and the less uneven the edges can get. As also described above, the hue coefficient Hb is a function that changes continuously and the edge coefficient HE is also a function that changes continuously according to the difference in grayscale level between the blue subpixels of two adjacent pixels. For that reason, the correction coefficient HC also changes continuously and a sudden change on the display can be minimized.

In the example described above, the hue and the level difference are supposed to be determined based on the average grayscale level. However, this is only an example of the present invention. Alternatively, the hue and the level difference may also be determined based on the average luminance level. Nevertheless, since the luminance level is obtained by raising the grayscale level to the $2.2^{th}$ power, the precision required also needs to be increased to the same degree. For that reason, the lookup table that stores the luminance level difference needs a huge circuit size, while the lookup table that stores the grayscale level difference can be implemented in a small circuit size.

In the preferred embodiment described above, the hue coefficient is changed so that as the hue changes, the color as viewed obliquely varies continuously. Optionally, this technique may be used to minimize the color shift.

If the input signal indicates that the grayscale levels r, g and b of red, green and blue subpixels should satisfy the relation r>b>g, the color red may look having a tint of the color magenta when viewed obliquely. For example, if the input signal indicates that the grayscale levels ($r_{ave}$, $g_{ave}$, $b_{ave}$) of red, green and blue subpixels should be (200, 0, 50) and that a bluish color red should be represented, the liquid crystal display device of Comparative Example 1 has x, y and Y values when viewed straight on and when viewed obliquely at 60 degrees and also has chromaticity difference $\Delta u'v'$ from the situation where the screen was viewed straight on as shown in the following Table 1:

TABLE 1

|  | x | y | Y | $\Delta u'v'$ |
|---|---|---|---|---|
| Viewed straight on | 0.631 | 0.311 | 0.167 | — |
| Viewed obliquely (60°) | 0.456 | 0.222 | 0.182 | 0.119 |

Consequently, when viewed obliquely, the color represented by the liquid crystal display device of Comparative Example 1 looks having a tint of the color magenta compared to the situation where the screen is viewed straight on.

In the liquid crystal display device 100A of this preferred embodiment, if the input signal indicates that the grayscale levels ($r_{ave}$, $g_{ave}$, $b_{ave}$) of red, green and blue subpixels should be (200, 0, 50), then the grayscale levels b1' and b2' become grayscale levels 69 and 0, respectively. In that case, the x, y and Y values when viewed straight on and when viewed obliquely at 60 degrees and chromaticity difference $\Delta u'v'$ from the situation where the screen was viewed straight on are as shown in the following Table 2:

TABLE 2

|  | x | y | Y | Δu'v' |
|---|---|---|---|---|
| Viewed straight on | 0.631 | 0.311 | 0.167 | — |
| Viewed obliquely (60°) | 0.510 | 0.250 | 0.175 | 0.079 |

In this manner, the liquid crystal display device 100A of this preferred embodiment can minimize the color shift toward the color magenta by correcting the luminance of the blue subpixel.

Furthermore, if the grayscale level b (≠0) specified by the input signal for the blue subpixel is lower than the grayscale level r, g of the red or green subpixel (e.g., when the color yellow needs to be represented), the color shift toward the color white can be reduced by improving the viewing angle characteristic of the color blue. Likewise, if the input signal indicates that the grayscale levels r, g, and b of red, green and blue subpixels satisfy the relation g>b>r (e.g., when a bluish color green needs to be represented), the color shift toward the color cyan can be reduced.

Also, as described above, the LCD panel 200A operates in the VA mode. Hereinafter, a specific exemplary configuration for the LCD panel 200A will be described. The LCD panel 200A may operate in the MVA mode. A configuration for such an MVA mode LCD panel 200A will be described with reference to FIGS. 17(a) to 17(c).

The LCD panel 200A includes pixel electrodes 224, a counter electrode 244 that faces the pixel electrodes 224, and a vertical alignment liquid crystal layer 260 that is interposed between the pixel electrodes 224 and the counter electrode 244. No alignment layers are shown in FIG. 17.

Slits 227 or ribs 228 are arranged on the pixel electrodes 224 in contact with the liquid crystal layer 260. On the other hand, slits 247 or ribs 248 are arranged on the counter electrode 244 in contact with the liquid crystal layer 260. The former group of slits 227 or ribs 228 provided in the pixel electrodes 224 side of the liquid crystal layer 260 will be referred to herein as "first alignment control means", while the latter group of slits 247 or ribs 248 provided in the counter electrode 244 side of the liquid crystal layer 260 as "second alignment control means".

In each liquid crystal region defined between the first and second alignment control means, liquid crystal molecules 262 are given alignment control force by the first and second alignment control means and will fall (or tilt) in the direction indicated by the arrows in FIG. 17 when a voltage is applied to between the pixel electrodes 224 and the counter electrode 244. That is to say, since the liquid crystal molecules 262 fall in the same direction in each liquid crystal region, such a region can be regarded as a liquid crystal domain.

The first and second alignment control means (which will sometimes be collectively referred to herein as "alignment control means") are arranged in stripes in each subpixel. FIGS. 17(a) to 17(c) are cross-sectional views as viewed on a plane that intersects at right angles with the direction in which those striped alignment control means runs. On two sides of each alignment control means, produced are two liquid crystal domains, in one of which liquid crystal molecules 262 fall in a particular direction and in the other of which liquid crystal molecules 262 fall in another direction that defines an angle of 180 degrees with respect to that particular direction. As the alignment control means, any of various alignment control means (domain regulating means) as disclosed in Japanese Patent Application Laid-Open Publication No. 11-242225 may be used, for example.

In FIG. 17(a), slits 227 (where there is no conductive film) are provided as the first alignment control means, and ribs (i.e., projections) 248 are provided as the second alignment control means. These slits 227 and ribs 248 are extended so as to run in stripes (or strips). When a potential difference is produced between one pixel electrode 224 and the counter electrode 244, each slit 227 generates an oblique electric field in a region of the liquid crystal layer 260 around the edges of the slit 227 and induces alignments of the liquid crystal molecules 262 perpendicularly to the direction in which the slit 227 runs. On the other hand, each rib 248 induces alignments of the liquid crystal molecules 262 substantially perpendicularly to its side surface 248a, and eventually, perpendicularly to the direction in which the rib 248 runs. Each slit 227 and its associated rib 248 are arranged parallel to each other with a certain interval left between them. That is to say, a liquid crystal domain is defined between one slit 227 and its associated rib 248 that are adjacent to each other.

Unlike the configuration shown in FIG. 17(a), one group of ribs 228 and another group of ribs 248 are provided as the first and second alignment control means, respectively, in the configuration shown in FIG. 17(b). Those two groups of ribs 228 and 248 are arranged parallel to each other with a certain gap left between them and induce alignments of the liquid crystal molecules 262 substantially perpendicularly to their side surfaces 228a and 248a, thereby producing liquid crystal domains between them.

Unlike the configuration shown in FIG. 17(a), one group of slits 227 and another group of slits 247 are provided as the first and second alignment control means, respectively, in the configuration shown in FIG. 17(c). When a potential difference is produced between the pixel electrodes 224 and the counter electrode 244, those two groups of slits 227 and 247 generate an oblique electric field in a region of the liquid crystal layer 260 around their edges and induce alignments of the liquid crystal molecules 262 perpendicularly to the direction in which the slits 227 and 247 run. Those slits 227 and 247 are also arranged parallel to each other with a certain gap left between them, thereby producing liquid crystal domains between them.

As described above, such ribs and slits may be used in any arbitrary combination as the first and second alignment control means. If the configuration shown in FIG. 17(a) is adopted for the LCD panel 200A, then the increase in the number of manufacturing processing steps required can be minimized. Specifically, even if slits need to be cut through the pixel electrodes, no additional process steps have to be done. As for the counter electrode, on the other hand, the number of manufacturing processing steps increases less with the ribs provided than with the slits cut. However, it is naturally possible to adopt a configuration in which only ribs are used as the alignment control means or a configuration in which just slits are used as the alignment control means.

Figure 18:
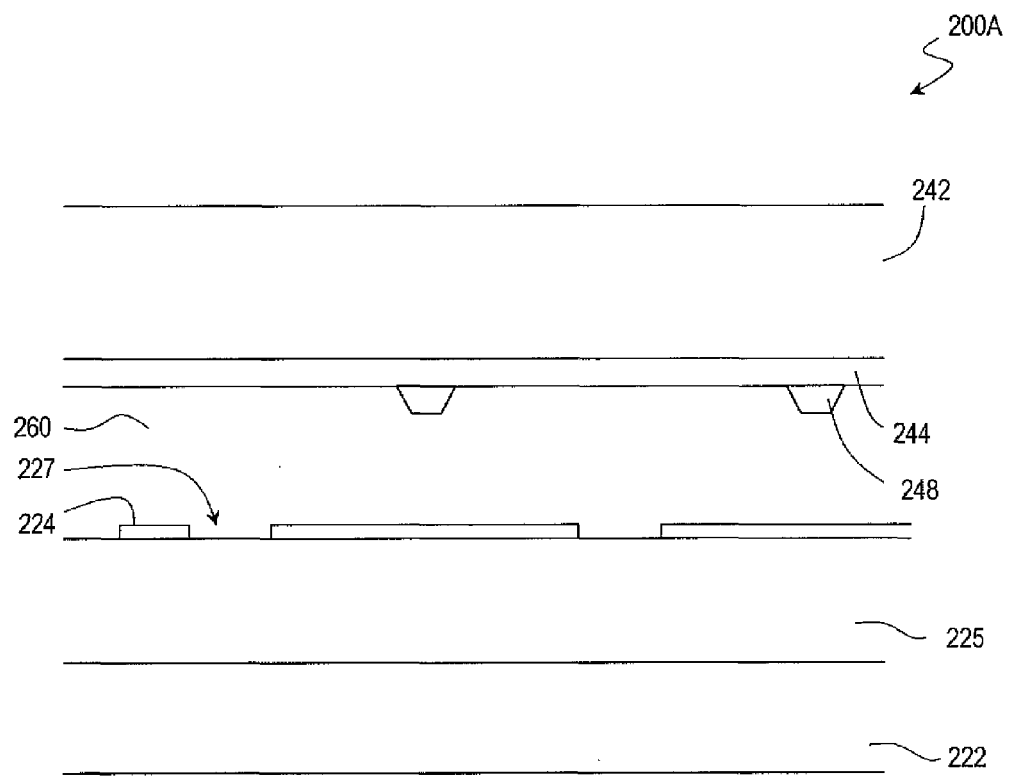
FIG. 18 is a partial cross-sectional view schematically illustrating a cross-sectional structure of the LCD panel of the liquid crystal display device shown in FIG. 1.
Figure 19:
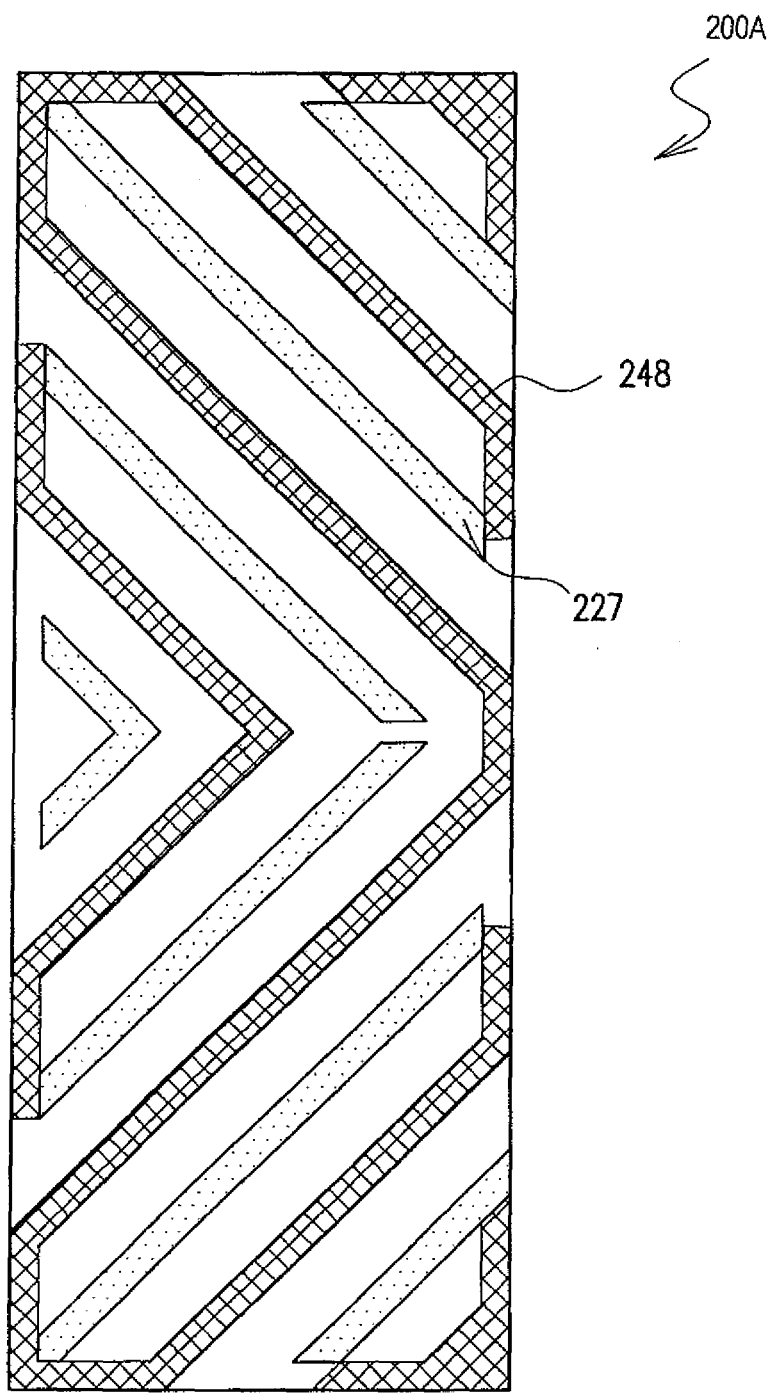
FIG. 19 is a plan view schematically illustrating a region allocated to one subpixel in the LCD panel of the liquid crystal display device shown in FIG. 1.

FIG. 18 is a partial cross-sectional view schematically illustrating a cross-sectional structure for the LCD panel 200A. FIG. 19 is a plan view schematically illustrating a region allocated to one subpixel in the LCD panel 200A. As shown in FIG. 19, the slits 227 have been cut so as to run in stripes and parallel to their adjacent ribs 248.

Figure 21:
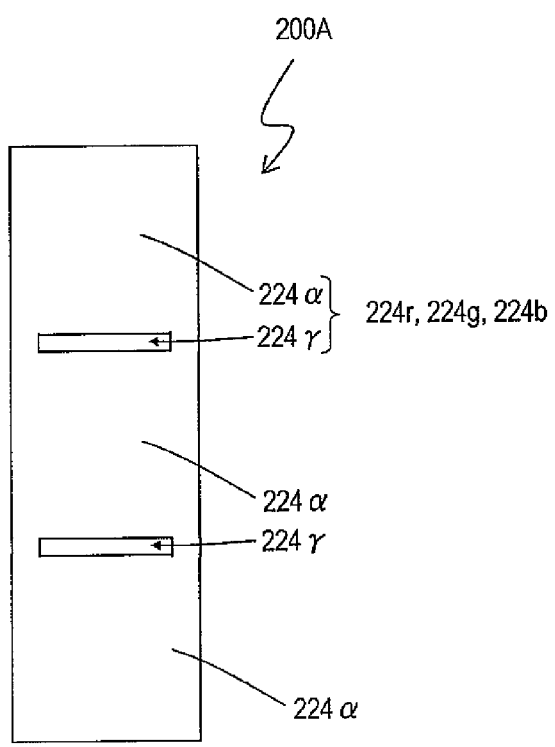
FIG. 21 is a plan view schematically illustrating a region allocated to one subpixel in the LCD panel of the liquid crystal display device shown in FIG. 1.

On the surface of an insulating substrate 222, arranged in contact with a liquid crystal layer 260 are gate bus lines (scan lines), source bus lines (signal lines) and TFTs (none of which are shown in FIG. 21), and an interlayer insulating film 225 is provided to cover all of those lines and TFTs. And pixel electrodes 224 have been formed on that interlayer insulating film 225. The pixel electrodes 224 and the counter electrode 244 face each other with the liquid crystal layer 260 interposed between them.

Striped slits 227 have been cut through the pixel electrodes 224. And almost the entire surface of the pixel electrodes 224, as well as inside the slits 227, is covered with a vertical alignment layer (not shown). As shown in FIG. 19, those slits 227 run in stripes. Two adjacent slits 227 are arranged parallel to each other so that each slit 227 splits the gap between its adjacent ribs 248 into two substantially evenly.

In the region between a striped slit 227 and its associated rib 248, which are arranged parallel to each other, the alignment direction of liquid crystal molecules 262 is controlled by the slit 227 and the rib 248 that interpose that region. As a result, two domains are produced on both sides of the slit 227 and on both sides of the rib 248 so that the alignment direction of the liquid crystal molecules 262 in one of those two domains is different from that of the liquid crystal molecules 262 in the other domain by 180 degrees. In this LCD panel 200A, the slits 227 are arranged to run in two different directions that define an angle of 90 degrees between them, so are the ribs 248 as shown in FIG. 19. Consequently, four liquid crystal domains, in any of which the alignment direction of the liquid crystal molecules 262 is different by 90 degrees from their counterparts in each of its adjacent domains, are produced in each subpixel.

Also, the insulating substrates 222 and 242 and two polarizers (not shown) to put on the outside of those substrates 222 and 242 are arranged as crossed Nicols so that their transmission axes cross each other substantially at right angles. If the polarizers are arranged so that the alignment direction in each of the four domains, which is different by 90 degrees from the one in any adjacent domain, and the transmission axis of its associated one of the polarizers define an angle of 45 degrees between them, the variation in retardation due to the creation of those domains can be used most efficiently. For that reason, the polarizers are preferably arranged so that their transmission axes define an angle of substantially 45 degrees with respect to the directions in which the slits 227 and the ribs 248 run. Also, in a display device such as a TV to which the viewer often changes his or her viewing direction horizontally, the transmission axis of one of the two polarizers is preferably arranged horizontally with respect to the display screen in order to reduce the viewing angle dependence of the display quality. In the LCD panel 200A with such a configuration, when a predetermined voltage is applied to the liquid crystal layer 260, a number of regions (i.e., domains) where the liquid crystal molecules 262 tilt in mutually different directions are produced in each subpixel, thus realizing a display with a wide viewing angle.

In the preferred embodiment described above, the LCD panel 200A is supposed to operate in the MVA mode. However, this is just an example of the present invention. Alternatively, the LCD panel 200A may also operate in a CPA mode.

Hereinafter, a CPA mode LCD panel 200A will be described with reference to FIGS. 20 and 21. Each subpixel electrode 224r, 224g, 224b of the LCD panel 200A shown in FIG. 20(a) has multiple notches 224β at predetermined locations, which divide the subpixel electrode 224r, 224g, 224b into a number of unit electrodes 224α. Each of those unit electrodes 224α has a substantially rectangular shape. In the example shown in FIG. 20, each subpixel electrode 224r, 224g, 224b is supposed to be divided into three unit electrodes 224α. However, the number of divisions does not have to be three.

When a voltage is applied to between the subpixel electrode 224r, 224g, 224b with such a configuration and the counter electrode (not shown), an oblique electric field is generated around the outer periphery of the subpixel electrode 224r, 224g, 224b and inside its notches 224β, thereby producing a number of liquid crystal domains in which liquid crystal molecules are aligned axisymmetrically (i.e., have radially tilted orientations) as shown in FIG. 20(b). One liquid crystal domain is produced on each unit electrode 224α. And in each liquid crystal domain, the liquid crystal molecules 262 tilt in almost every direction. That is to say, in this LCD panel 200A, there are an infinite number of regions where the liquid crystal molecules 262 tilt in mutually different directions. As a result, a wide viewing angle display is realized.

The subpixel electrode 224r, 224g, 224b shown in FIG. 20 has notches 224β. Alternatively, the notches 224β may be replaced with openings 224γ as shown in FIG. 21. Each subpixel electrode 224r, 224g, 224b shown in FIG. 21 has multiple openings 224γ, which divide the subpixel electrode 224r, 224g, 224b into a number of unit electrodes 224α. When a voltage is applied to between such a subpixel electrode 224r, 224g, 224b and the counter electrode (not shown), an oblique electric field is generated around the outer periphery of the subpixel electrode 224r, 224g, 224b and inside its openings 224γ, thereby producing a number of liquid crystal domains in which liquid crystal molecules are aligned axisymmetrically (i.e., have radially tilted orientations).

In the examples illustrated in FIGS. 20 and 21, each single subpixel electrode 224r, 224g, 224b has either multiple notches 224β or multiple openings 224γ. However, if each subpixel electrode 224r, 224g, 224b needs to be split into two, only one notch 224β or opening 224γ may be provided. In other words, by providing at least one notch 224β or opening 224γ for each subpixel electrode 224r, 224g, 224b, multiple axisymmetrically aligned liquid crystal domains can be produced. The subpixel electrode 224r, 224g, 224b may have any of various shapes as disclosed in Japanese Patent Application Laid-Open Publication No. 2003-43525, for example.

Figure 22:
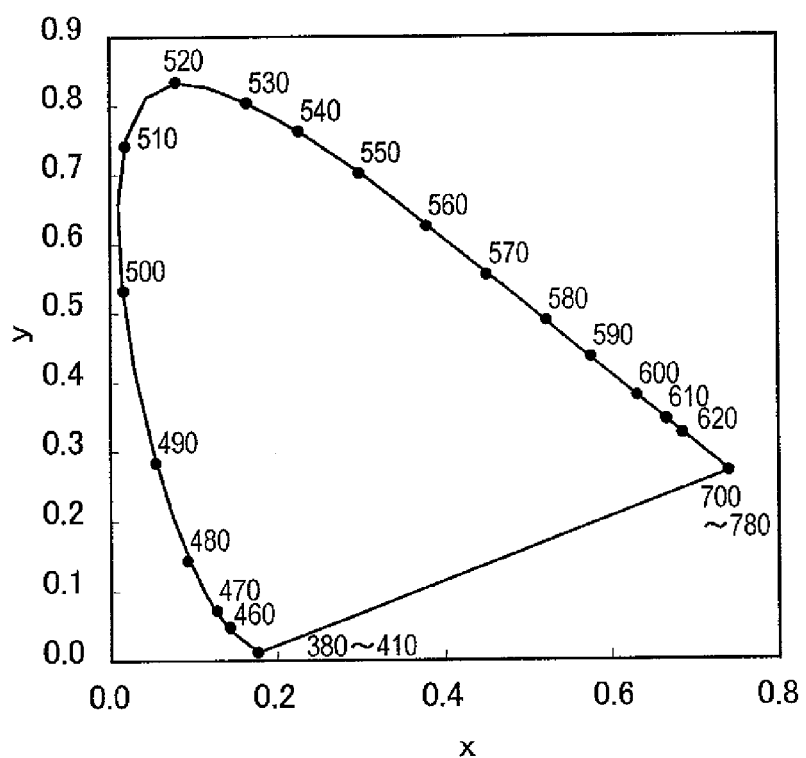
FIG. 22 is a chromaticity diagram of the XYZ color system showing the dominant wavelengths of respective subpixels in the LCD panel of the liquid crystal display device shown in FIG. 1.

FIG. 22 shows the xy chromaticity diagram of the XYZ color system. The spectrum locus and dominant wavelengths are shown in FIG. 22. In the LCD panel 200A, red subpixels have a dominant wavelength of 605 nm to 635 nm, green subpixels have a dominant wavelength of 520 nm to 550 nm, and blue subpixels have a dominant wavelength of 470 nm or less.

In the preferred embodiment described above, the luminances of blue subpixels are supposed to be controlled by using, as a unit, two blue subpixels belonging to two pixels that are arranged adjacent to each other in the row direction. However, the present invention is in no way limited to that specific preferred embodiment. Alternatively, the luminances of blue subpixels may also be controlled by using, as a unit, two blue subpixels belonging to two pixels that are arranged adjacent to each other in the column direction. Nevertheless, if those blue subpixels belonging to two adjacent pixels in the column direction are used as a unit, line memories and other circuit components are needed, thus increasing the circuit size required.

FIG. 23 is a schematic representation illustrating a blue correcting section 300b" that is designed to control the luminances using, as a unit, two blue subpixels belonging to two pixels that are adjacent to each other in the column direction. As shown in FIG. 23(a), the blue correcting section 300b" includes first-stage line memories 300s, a grayscale control section 300t, and second-stage line memories 300u. The grayscale levels r1, g1 and b1 are indicated by the input signal for red, green and blue subpixels belonging to one pixel. On the other hand, the grayscale levels r2, g2 and b2 are indicated by the input signal for red, green and blue subpixels belonging to another pixel that is adjacent to the former pixel in the column direction and located on the next row. The first-stage line memories 300s delay the input of the grayscale levels r1, g1, and b1 to the grayscale control section 300t by one line.

FIG. 23(b) is a schematic representation illustrating the grayscale control section 300t. In the grayscale control section 300t, the average grayscale level $b_{ave}$ of the grayscale levels b1 and b2 is calculated by using an adding section 310b. Next, a grayscale level difference section 320 calculates two grayscale level differences $\Delta b\alpha$ and $\Delta b\beta$ with respect to the single average grayscale level $b_{ave}$. Thereafter, a grayscale-to-luminance converting section 330 converts the grayscale level differences $\Delta b\alpha$ and $\Delta b\beta$ into luminance level differences $\Delta Y_b\alpha$ and $\Delta Y_b\beta$, respectively.

Meanwhile, the average grayscale level $r_{ave}$ of the grayscale levels r1 and r2 is calculated by using an adding section 310r. And the average grayscale level $g_{ave}$ of the grayscale levels g1 and g2 is calculated by using an adding section 310g. Then, a hue determining section 340 calculates a hue coefficient Hb based on these average grayscale levels $r_{ave}$, $g_{ave}$ and $b_{ave}$.

Next, the magnitudes of shift $\Delta S\alpha$ and $\Delta S\beta$ are calculated. In this case, the magnitude of shift $\Delta S\alpha$ is obtained as the product of $\Delta Y_b\alpha$ and the hue coefficient Hb, while the magnitude of shift $\Delta S\beta$ is obtained as the product of $\Delta Y_b\beta$ and the hue coefficient Hb. A multiplying section 350 multiplies the luminance level differences $\Delta Y_b\alpha$ and $\Delta Y_b\beta$ by the hue coefficient Hb, thereby obtaining the magnitudes of shift $\Delta S\alpha$ and $\Delta S\beta$.

Meanwhile, a grayscale-to-luminance converting section 360a carries out a grayscale-to-luminance conversion on the grayscale level b1, thereby obtaining a luminance level $Y_{b1}$. In the same way, another grayscale-to-luminance converting section 360b carries out a grayscale-to-luminance conversion on the grayscale level b2, thereby obtaining a luminance level $Y_{b2}$. Next, an adding and subtracting section 370a adds the luminance level $Y_{b1}$ and the magnitude of shift $\Delta S\alpha$ together, and then the sum is subjected to luminance-to-grayscale conversion by a luminance-to-grayscale converting section 380a, thereby obtaining a grayscale level b1'. On the other hand, another adding and subtracting section 370b subtracts the magnitude of shift $\Delta S\beta$ from the luminance level $Y_{b2}$, and then the remainder is subjected to luminance-to-grayscale conversion by another luminance-to-grayscale converting section 380b, thereby obtaining a grayscale level b2'. After that, the second-stage line memories 300u delay the output of the grayscale levels r2, g2 and b2' by one line as shown in FIG. 23(a). In this manner, the blue correcting section 300b" controls the luminances by using, as a unit, two blue subpixels belonging to two pixels that are adjacent to each other in the column direction.

In the preferred embodiment described above, the input signal is supposed to be a YCrCb signal, which is usually used as a color TV signal. However, the input signal does not have to be a YCrCb signal but may also indicate the grayscale levels of respective subpixels representing either the three primary colors of R, G and B or any other set of three primary colors such as Ye, M and C (where Ye denotes yellow, M denotes magenta and C denotes cyan).

Also, in the preferred embodiment described above, the grayscale levels are supposed to be indicated by the input signal and the correcting section 300A is supposed to correct the grayscale level of blue subpixels. However, the present invention is in no way limited to that specific preferred embodiment. Alternatively, the luminance levels may be indicated by the input signal. Or the grayscale levels may be converted into luminance levels and then the correcting section 300A may correct the luminance level of blue subpixels. Nevertheless, the luminance level is obtained by raising the grayscale level to the $2.2^{th}$ power and the precision of the luminance level should be higher than that of the grayscale level to the same degree. That is why a circuit for correcting the grayscale levels can be implemented at a lower cost than a circuit for correcting the luminance levels.

In the preferred embodiment described above, the correcting section 300A is supposed to include a blue correcting section 300b. However, the present invention is in no way limited to that specific preferred embodiment. Alternatively, the correcting section 300A may include a red correcting section 300r or a green correcting section 300g.

As shown in FIG. 24(a), the correcting section 300A may include a red correcting section 300r, which has the same configuration as the blue correcting section 300b that has already been described with reference to FIG. 11. Hereinafter, the red correcting section 300r will be described with reference to FIG. 11.

In the red correcting section 300r, for example, the hue determining section 340 also determines the hue of the color indicated by the input signal. Specifically, the hue determining section 340 determines a hue coefficient Hr by using the average grayscale levels $r_{ave}$, $g_{ave}$ and $b_{ave}$. The hue coefficient Hr is a function that varies according to the hue. For example, the hue coefficient Hr can be represented as Hr=S/M ($r_{ave} \geq g_{ave}$, $r_{ave} \geq b_{ave}$ and $r_{ave} > 0$). Specifically, if $r_{ave} \geq g_{ave} \geq b_{ave}$ and $r_{ave} > 0$, then Hr=$g_{ave}/r_{ave}$. Also, if $r_{ave} \geq b_{ave} \geq g_{ave}$ and $r_{ave} > 0$, then Hr=$b_{ave}/r_{ave}$. Furthermore, if at least one of $r_{ave} < g_{ave}$, $r_{ave} < b_{ave}$ and $r_{ave} = 0$ is satisfied, then Hr=1.

Alternatively, as shown in FIG. 24(b), the correcting section 300A may include a green correcting section 300g, which has the same configuration as the blue correcting section 300b that has already been described with reference to FIG. 11. Hereinafter, the green correcting section 300g will be described with reference to FIG. 11 again.

Likewise, in the green correcting section 300g, the hue determining section 340 also determines the hue of the color indicated by the input signal. Specifically, the hue determining section 340 determines a hue coefficient Hg by using the average grayscale levels $r_{ave}$, $g_{ave}$ and $b_{ave}$. The hue coefficient Hg is a function that varies according to the hue. The hue coefficient Hg can be represented as Hg=S/M ($g_{ave} \geq r_{ave}$, $g_{ave} \geq b_{ave}$ and $g_{ave} > 0$). More specifically, if $g_{ave} \geq r_{ave} \geq b_{ave}$ and $g_{ave} > 0$ then Hg=$r_{ave}/g_{ave}$. Also, if $g_{ave} \geq b_{ave} \geq r_{ave}$ and $g_{ave} > 0$, then Hg=$b_{ave}/g_{ave}$. Furthermore, if at least one of $g_{ave} < r_{ave}$, $g_{ave} < b_{ave}$ and $g_{ave} = 0$ is satisfied, then Hg=1.

However, it is known that to the human eye, the resolution of the color blue is lower than that of any other color. Particularly when each of the subpixels of a pixel is turned ON as in representing an achromatic color in a middle grayscale tone, if the resolution nominally decreases in the blue subpixel, the decrease in the substantial resolution is hardly sensible. In view of this consideration, it is more effective to correct the grayscale level of the blue subpixels than doing the same for subpixels of any other color. Also, as for colors other than the color blue, it is also known that the color red also has a relatively low resolution. That is why even if the subpixel, of which the nominal resolution will decrease in an achromatic color with a middle grayscale, is a red subpixel, a decrease in substantial resolution is no more easily sensible to the eye than the blue subpixel is. Consequently, the same effect can be achieved even for the color red, too.

Optionally, the hue coefficient Hr, Hg or Hb may also be represented by a different function. For example, the hue coefficient Hr may be given by Hr=1−$r_{ave}$/M (where $g_{ave} > r_{ave}$ and $b_{ave} > r_{ave}$). Specifically, if $g_{ave} \geq b_{ave} > r_{ave}$, then $Hr=1-r_{ave}/g_{ave}$. On the other hand, if $b_{ave} \geq g_{ave} > r_{ave}$, then $Hr=1-r_{ave}/b_{ave}$. If $r_{ave} \geq g_{ave}$, $r_{ave} \geq b_{ave}$ or $r_{ave}=0$ is satisfied, then $Hr=0$.

Also, the hue coefficient Hg may be given by $Hg=1-g_{ave}/M$ (where $r_{ave} > g_{ave}$, and $b_{ave} > g_{ave}$). Specifically, if $r_{ave} \geq b_{ave} > g_{ave}$, then $Hg=1-g_{ave}/r_{ave}$. On the other hand, if $b_{ave} \geq r_{ave} > g_{ave}$, then $Hg=1-g_{ave}/b_{ave}$. If $g_{ave} \geq r_{ave}$, $g_{ave} \geq b_{ave}$ or $g_{ave}=0$ is satisfied, then $Hg=0$.

In these cases, both of the hue coefficients Hr and Hg become equal to one less often and come to have relatively small values. As a result, the grayscale difference decreases and the decrease in resolution is less easily sensible. It should be noted that not just for the hue coefficients Hr and Hg but also for the hue coefficient Hb, $Hb=1-b_{ave}/M$ (where $r_{ave} > b_{ave}$ and $g_{ave} > b_{ave}$) may be satisfied. Also, if $b_{ave} \geq r_{ave}$, $b_{ave} \geq g_{ave}$ or $b_{ave}=0$ is satisfied, then $Hb=0$.

Furthermore, in the preferred embodiment described above, correction is supposed to be made on one of the grayscale levels of red, green and blue subpixels. However, the present invention is in no way limited to that specific preferred embodiment.

As shown in FIG. 25, the correcting section 300A may include a red correcting section 300r, a green correcting section 300g and a blue correcting section 300b. The red, green and blue correcting sections 300r, 300g and 300b make corrections using the hue coefficients Hr, Hg and Hb, respectively. If the grayscale levels of red, green and blue subpixels as indicated by the input signal satisfy $r_{ave}=g_{ave}=b_{ave} \neq 0$, corrections are made on the grayscale levels of all of the red, green and blue subpixels. However, if the grayscale levels of red, green and blue subpixels as indicated by the input signal satisfy $r_{ave}=g_{ave}=b_{ave}=0$, correction is not made on the grayscale level of any of the red, green and blue subpixels. Furthermore, for example, if the grayscale levels of red, green and blue subpixels as indicated by the input signal satisfy $r_{ave}=g_{ave}>b_{ave} \neq 0$, corrections are made on the grayscale levels of all of the red, green and blue subpixels. Also, if the grayscale levels of the red, green and blue subpixels satisfy $r_{ave}=g_{ave}>b_{ave}=0$, corrections are made on the grayscale levels of the red and green subpixels. Furthermore, for example, if the grayscale levels of red, green and blue subpixels as indicated by the input signal satisfy $0 \neq r_{ave}=g_{ave} < b_{ave}$, corrections are made on the grayscale levels of all of the red, green and blue subpixels. On the other hand, if the grayscale levels of red, green and blue subpixels as indicated by the input signal satisfy $0=r_{ave}=g_{ave} < b_{ave}$, corrections are not made on the grayscale level of any of the red, green and blue subpixels. As can be seen, if at least two of the grayscale levels of red, green and blue subpixels as indicated by the input signal are not equal to zero, at least one of the red, green and blue correcting sections 300r, 300g and 300b makes a correction.

Still alternatively, the correcting section 300A may include any two of the red, green and blue correcting section 300r, 300g and 300b. Among other things, the luminous efficacy of the color green is higher, and a decrease in resolution is more easily sensible, than any other color's. For that reason, the correcting section 300A may have the red and blue correcting sections 300r and 300g with no green correcting section 300g.

Furthermore, in the preferred embodiment described above, when an achromatic color should be represented, the grayscale levels of red, green and blue subpixels yet to be entered into the LCD panel 200A are supposed to be equal to each other. However, this is just an example of the present invention. Optionally, the liquid crystal display device may further include an independent gamma correction processing section for performing independent gamma correction processing. And even when an achromatic color needs to be represented, the grayscale levels of red, green and blue subpixels yet to be entered into the LCD panel 200A may be slightly different from each other.

Hereinafter, a liquid crystal display device 100A' that further includes an independent gamma correction processing section 280 will be described with reference to FIG. 26. Except the independent gamma correction processing section, however, the liquid crystal display device 100A' has the same configuration as the liquid crystal display device 100A shown in FIG. 1.

Figure 26:
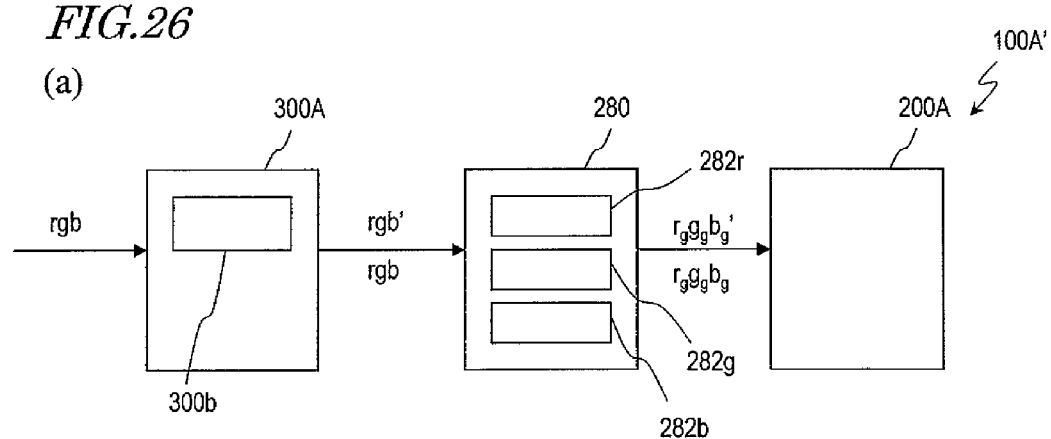
FIGS. 26(a) and 26(b) are schematic representations illustrating two configurations for a liquid crystal display device as still another modified example of the first preferred embodiment in which an independent gamma correction processing section is positioned after and before the correcting section, respectively.

In the liquid crystal display device 100A' shown in FIG. 26(*a*), the grayscale levels r, g and b' that have been corrected by the correcting section 300A are input to the independent gamma correction processing section 280, which performs independent gamma correction processing on them. Without the independent gamma correction processing, if the color indicated by the input signal changes from black to white while remaining achromatic colors, then the chromaticity of the achromatic color may vary uniquely to the LCD panel 200A when the LCD panel 200A is viewed straight on. By performing the independent gamma correction processing, however, such a chromaticity variation can be minimized.

The independent gamma correction processing section 280 includes red, green and blue processing sections 282r, 282g and 282b for performing independent gamma correction processing on the grayscale levels r, g and b', respectively. As a result of the independent gamma correction processing that has been performed by these processing sections 282r, 282g and 282b, the grayscale levels r, g and b' are converted into grayscale levels $r_g$, $g_g$ and $b_g'$, respectively. In the same way, grayscale levels r, g and b are converted into grayscale levels $r_g$, $g_g$ and $b_g$, respectively. After that, those grayscale levels $r_g$, $g_g$ and $b_g'$ or $r_g$, $g_g$ and $b_g$ that have been subjected to the independent gamma correction processing by the independent gamma correction processing section 280 are input to the LCD panel 200A.

In the liquid crystal display device 100A' shown in FIG. 26(*a*), the independent gamma correction processing section 280 is positioned after the correcting section 300A. However, the present invention is in no way limited to that specific preferred embodiment. Alternatively, the independent gamma correction processing section 280 may also be positioned before the correcting section 300A as shown in FIG. 26(*b*). In that case, the independent gamma correction processing section 280 makes independent gamma correction processing on the grayscale levels r, g and b indicated by the input signal, thereby obtaining grayscale levels $r_g$, $g_g$ and $b_g$. After that, the correcting section 300A makes correction on the signal that has already been subjected to the independent gamma correction processing. As the multiplier for use to perform a luminance-to-grayscale conversion in the correcting section 300A, not the fixed value (e.g., $2.2^{th}$ power) but a value that has been selected according to the characteristic of the LCD panel 200A is used. By providing the independent gamma correction processing section 280 in this manner, the variation in the chromaticity of an achromatic color according to the lightness can also be reduced.

Embodiment 2

In the preferred embodiment described above, each subpixel is supposed to have a single luminance. However, the present invention is in no way limited to that specific preferred embodiment. Optionally, a multi-pixel structure may be adopted and each subpixel may have multiple regions with mutually different luminances.

Figure 27:
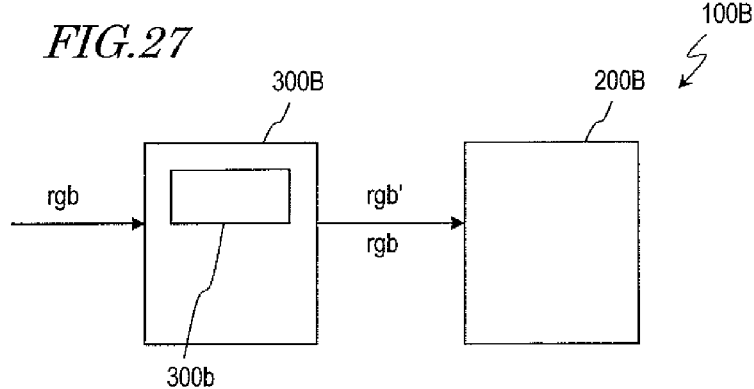
FIG. 27 is a schematic representation illustrating a liquid crystal display device as a second preferred embodiment of the present invention.

Hereinafter, a second specific preferred embodiment of a liquid crystal display device according to the present invention will be described with reference to FIG. 27. The liquid crystal display device 100B of this preferred embodiment includes an LCD panel 200B and a correcting section 300B, which also includes a blue correcting section 300b. This liquid crystal display device 100B has the same configuration as its counterpart of the first preferred embodiment described above except that each subpixel in the LCD panel 200B has multiple regions that may have mutually different luminances and that the effective potential of a divided electrode that defines such regions with different luminances varies with the potential on a CS bus line. Thus, description of their common features will be omitted herein to avoid redundancies.

Figure 28:
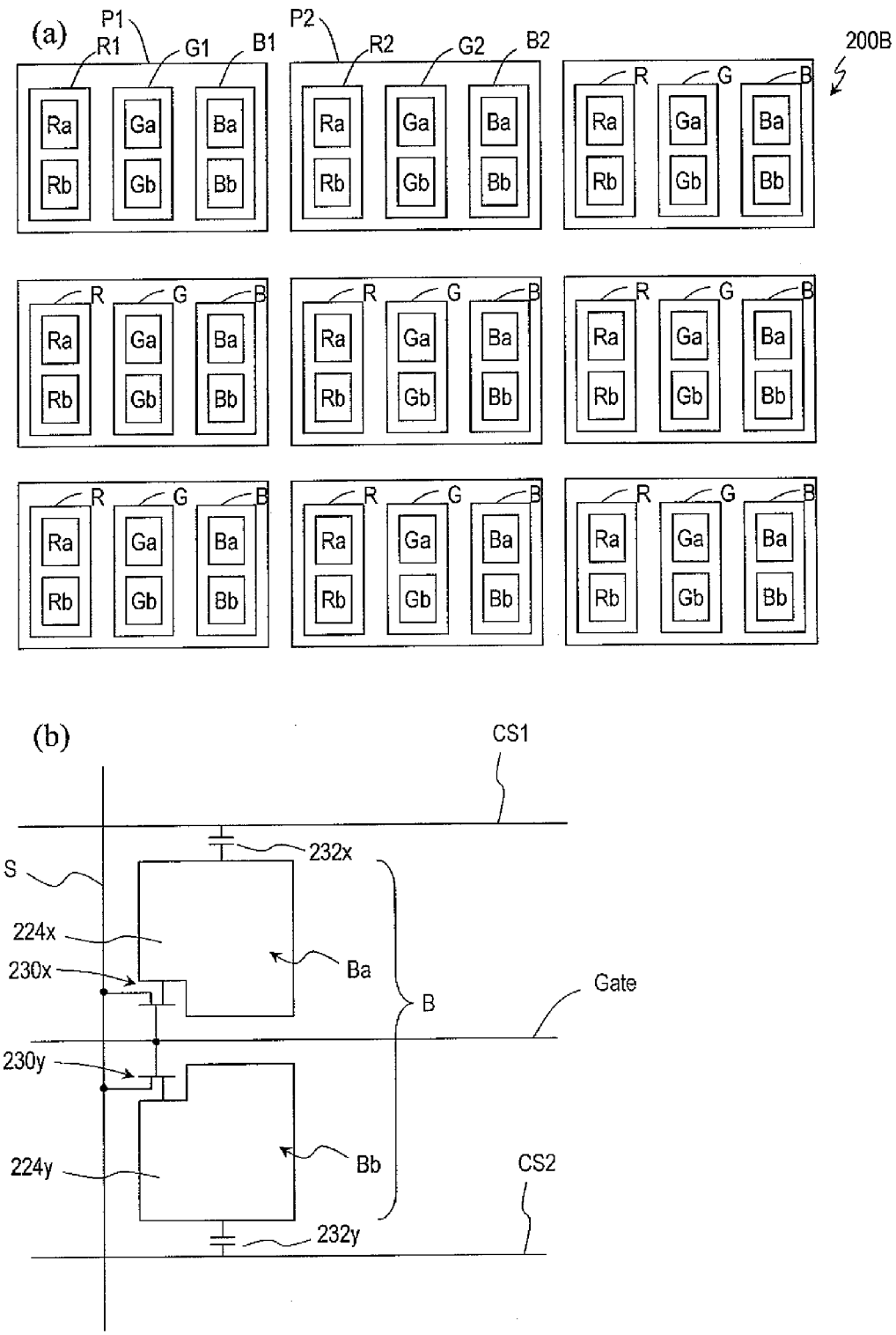
FIG. 28(a) is a schematic representation illustrating how respective pixels may be arranged in the liquid crystal display device shown in FIG. 27.
FIG. 28(b) is a circuit diagram illustrating the active-matrix substrate of its LCD panel.

FIG. 28(a) illustrates how pixels and subpixels, included in each of those pixels, may be arranged in this LCD panel 200B. As an example, FIG. 28(a) illustrates an arrangement of pixels in three columns and three rows. Each of those pixels includes three subpixels, which are red, green and blue subpixels R, G and B. The luminances of these subpixels can be controlled independently of each other.

In this liquid crystal display device 100B, each of the three subpixels R, G and B has two divided regions. Specifically, the red subpixel R has first and second regions Ra and Rb, the green subpixel G has first and second regions Ga and Gb, and the blue subpixel B has first and second regions Ba and Bb.

In each of these subpixels R, G and B, the luminance values of its multiple regions may be controlled to be different from each other. As a result, the viewing angle dependence of the gamma characteristic, which refers to a phenomenon that the gamma characteristic when the display screen is viewed straight on is different from the one when the display screen is viewed obliquely, can be reduced. Methods for reducing the viewing angle dependence of the gamma characteristic are disclosed in Japanese Patent Application Laid-Open Publications Nos. 2004-62146 and 2004-78157. By controlling the luminances of multiple different regions of each of those subpixels R, G and B so that those luminances are different from each other, the viewing angle dependence of the gamma characteristic can be reduced as well as is disclosed in Japanese Patent Application Laid-Open Publications Nos. 2004-62146 and 2004-78157. Such a red, green and blue (R, G and B) structure is also called a "divided structure". In the following description, one of the first and second regions that has the higher luminance will sometimes be referred to herein as a "bright region" and the other region with the lower luminance as a "dark region".

FIG. 28(b) illustrates a configuration for a blue subpixel B in the liquid crystal display device 100B. Although not shown in FIG. 28(b), red and green subpixels R and G also have the same configuration.

The blue subpixel B has two regions Ba and Bb that are defined by divided electrodes 224x and 224y, respectively. A TFT 230x and a storage capacitor 232x are connected to the divided electrode 224x and a TFT 230y and a storage capacitor 232y are connected to the divided electrode 224y. The TFTs 230x and 230y have their respective gate electrodes connected to the same gate bus line Gate and have their respective source electrodes connected in common to the same source bus line S. The storage capacitors 232x and 232y are connected to CS bus lines CS1 and CS2, respectively. The storage capacitor 232x is formed by a storage capacitor electrode that is electrically connected to the divided electrode 224x, a storage capacitor counter electrode that is electrically connected to the CS bus line CS1, and an insulating layer (not shown) that is arranged between those two electrodes. Likewise, the storage capacitor 232y is formed by a storage capacitor electrode that is electrically connected to the divided electrode 224y, a storage capacitor counter electrode that is electrically connected to the CS bus line CS2, and an insulating layer (not shown) that is arranged between those two electrodes. The storage capacitor counter electrodes of the storage capacitors 232x and 232y are independent of each other and can be supplied with mutually different storage capacitor counter voltages through the CS bus lines CS1 and CS2, respectively. Thus, after a voltage has been applied to the divided electrodes 224x and 224y through the source bus line S while the TFTs 230x and 230y are in ON state, the TFTs 230x and 230y may turn OFF and the potentials on the CS bus lines CS1 and CS2 may vary into different values. In that case, the divided electrode 224x will have a different effective voltage from the divided electrode 224y. As a result, the first region Ba comes to have a different luminance from the second region Bb.

Figure 29:
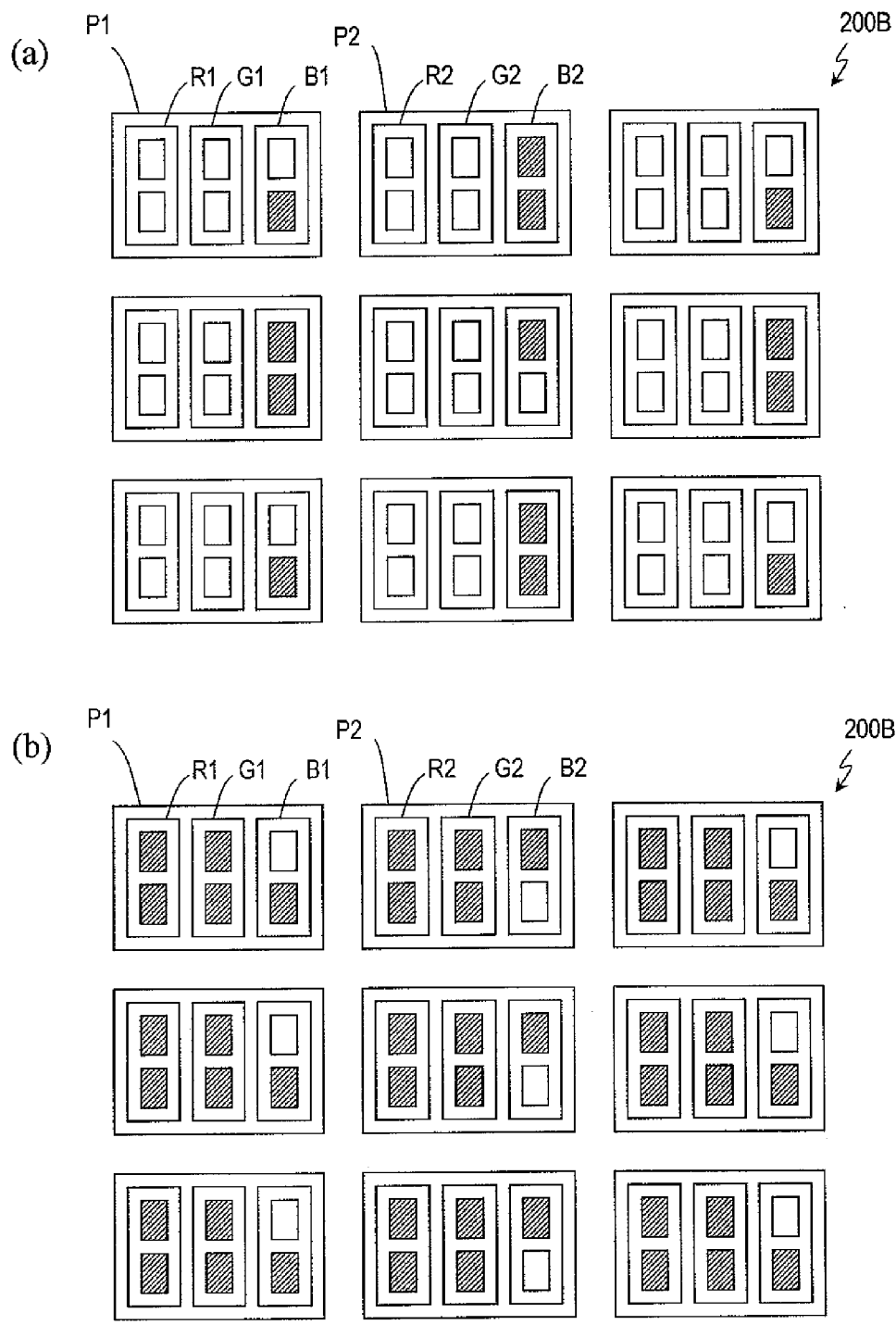
FIGS. 29(a) and 29(b) are schematic representations illustrating how the LCD panel of the liquid crystal display device shown in FIG. 27 looks when representing one color and when representing another color, respectively.

FIGS. 29(a) and 29(b) illustrate how the LCD panel 200B may look in this liquid crystal display device 100B. In FIG. 29(a), the input signal indicates that every pixel should represent the same achromatic color. On the other hand, in FIG. 29(b), the input signal indicates that every pixel should represent the same color blue. In FIGS. 29(a) and 29(b), two pixels that are adjacent to each other in the row direction are taken as an example. One of those two pixels is identified by P1 and its red, green and blue subpixels are identified by R1, G1 and B1, respectively. The other pixel is identified by P2 and its red, green and blue subpixels are identified by R2, G2 and B2, respectively.

First of all, it will be described with reference to FIG. 29(a) how the LCD panel 200B looks when the color indicated by the input signal is an achromatic color. In such a situation, the grayscale levels of the red, green and blue subpixels are equal to each other.

In this case, the luminances of the red and green subpixels R1 and G1 of one P1 of the two adjacent pixels are respectively equal to those of the red and green subpixels R2 and G2 of the other pixel P2. However, the blue correcting section 300b shown in FIG. 27(a) makes a correction so that the luminance of the blue subpixel B1 of one P1 of the two adjacent pixels in the LCD panel 200B is different from that of the blue subpixel B2 of the other pixel P2.

Using two blue subpixels belonging to two adjacent pixels as a unit, the blue correcting section 300b controls the luminances of the blue subpixels. That is why even if the input signal indicates that such blue subpixels belonging to two adjacent pixels have the same grayscale level, the LCD panel 200B corrects the grayscale level so that those two blue subpixels have mutually different luminances. In this preferred embodiment, the blue correcting section 300b makes a correction on the grayscale levels of the blue subpixels belonging to two pixels that are adjacent to each other in the row direction. As a result of the correction that has been made by the blue correcting section 300b, one of the two blue subpixels belonging to those two adjacent pixels has its luminance increased by the magnitude of shift $\Delta S\alpha$, while the blue other subpixel has its luminance decreased by the magnitude of shift $\Delta S\beta$. Consequently, those two blue subpixels belonging to the two adjacent pixels have mutually different luminances. In this case, the luminance of the bright blue subpixel is higher than a luminance corresponding to a reference grayscale level, while that of the dark blue subpixel is lower than the luminance corresponding to the reference grayscale level. Also, when the screen is viewed straight on, for example, the difference between the luminance of the bright blue subpixel and the luminance corresponding to the reference grayscale level is substantially equal to the difference between the luminance corresponding to the reference grayscale level and the luminance of the dark blue subpixel. That is why the average of the luminances of respective blue subpixels belonging to two adjacent pixels in this LCD panel 200B is equal to that of the luminances corresponding to the grayscale levels of two adjacent blue subpixels as indicated by the input signal. In this manner, the blue correcting section 300b makes a correction, thereby improving the viewing angle characteristic when the screen is viewed obliquely. Strictly speaking, the resolution somewhat decreases as a result of the correction. However, the correcting section 300B makes the correction in a situation where the decrease in resolution is not easily sensible. In FIG. 29(a), two blue subpixels belonging to two pixels that are adjacent to each other in the row direction have opposite brightness levels and two blue subpixels belonging to two pixels that are adjacent to each other in the column direction also have opposite brightness levels.

For example, if the input signal indicates that the grayscale levels of the red, green and blue subpixels should be (50, 50, 50), the liquid crystal display device 100B corrects the grayscale level of the blue subpixel into either 69 ($=(2\times(50/255)^{2.2})^{1/2.2}\times255$) or zero. As a result, in the LCD panel 200B, the red, green and blue subpixels R1, G1 and B1 belonging to the pixel P1 come to have luminances corresponding to the grayscale levels (0, 0, 69), while the red, green and blue subpixels R2, G2 and B2 belonging to the pixel P2 come to have luminances corresponding to the grayscale levels (0, 0, 0). In this LCD panel 200B, the blue subpixel B1 of the pixel P1 has an overall luminance corresponding to the grayscale level 69, the region Ba of the blue subpixel B1 has a luminance corresponding to the grayscale level 95 ($=(2\times(69/255)^{2.2})^{1/2.2}\times255$), and the region Bb of the blue subpixel B1 has a luminance corresponding to the grayscale level 0. On the other hand, the blue subpixel B2 of the pixel P2 has an overall luminance corresponding to the grayscale level 0 and the regions Ba and Bb of the blue subpixel B2 have a luminance corresponding to the grayscale level 0.

If a multi-pixel drive is performed, the distribution of the luminance levels $Y_{b1}$ and $Y_{b2}$ to the regions Ba and Bb of the blue subpixels B1 and B2 is determined by the structure and settings of the LCD panel 200B although not described in detail herein. Specifically, when viewed straight on, the LCD panel 200B may be designed so that the average luminance of the regions Ba and Bb of the blue subpixel B1 agrees with the luminance corresponding to the grayscale level b1' or b2' of the blue subpixel.

Next, it will be described with reference to FIG. 29(b) how the LCD panel 200B looks when the input signal indicates that the color blue should be represented. If the color blue is specified by the input signal, the red and green subpixels have a grayscale level of zero and the blue subpixel has a middle grayscale level.

In that case, the blue correcting section 300b does not make a correction. That is why if the input signal indicates that the blue subpixels belonging to two adjacent pixels should have the same grayscale level, the luminances of those two blue subpixels are equal to each other on the LCD panel 200B. Thus, if a decrease in resolution is easily sensible, the blue correcting section 300b never makes a correction.

For example, if the input signal indicates that the grayscale levels of the red, green and blue subpixels should be (0, 0, 50), the liquid crystal display device 100B does not correct the grayscale level of the blue subpixel. Consequently, the red, green and blue subpixels R1, G1 and B1 belonging to the pixel P1 in this LCD panel 200A come to have luminances corresponding to the grayscale levels (0, 0, 50) and the red, green and blue subpixels R2, G2 and B2 belonging to the pixel P2 come to have luminances corresponding to the grayscale levels (0, 0, 50), too.

In this LCD panel 200B, the blue subpixel B1 of the pixel P1 has an overall luminance corresponding to the grayscale level 50, the region Ba of the blue subpixel B1 has a luminance corresponding to the grayscale level 69 ($=(2\times(50/255)^{2.2})^{1/2.2}\times255$), and the region Bb of the blue subpixel B1 has a luminance corresponding to the grayscale level 0. In the same way, the region Ba of the blue subpixel B2 has a luminance corresponding to the grayscale level 0, and the region Bb of the blue subpixel B2 has a luminance corresponding to the grayscale level 69 ($=(2\times(50/255)^{2.2})^{1/2.2}\times255$). In that case, all of the red and green subpixels R1, R2, G1 and G2 are OFF but at least one region is turned ON in each of the blue subpixels B1 and B2. As a result, a decline in display quality can be minimized.

Embodiment 3

In the preferred embodiments of the present invention described above, the luminance is supposed to be controlled using two subpixels belonging to two adjacent pixels as a unit. However, the present invention is in no way limited to those specific preferred embodiments. Optionally, the luminance may also be controlled using multiple different regions of a single subpixel as a unit.

Figure 30:
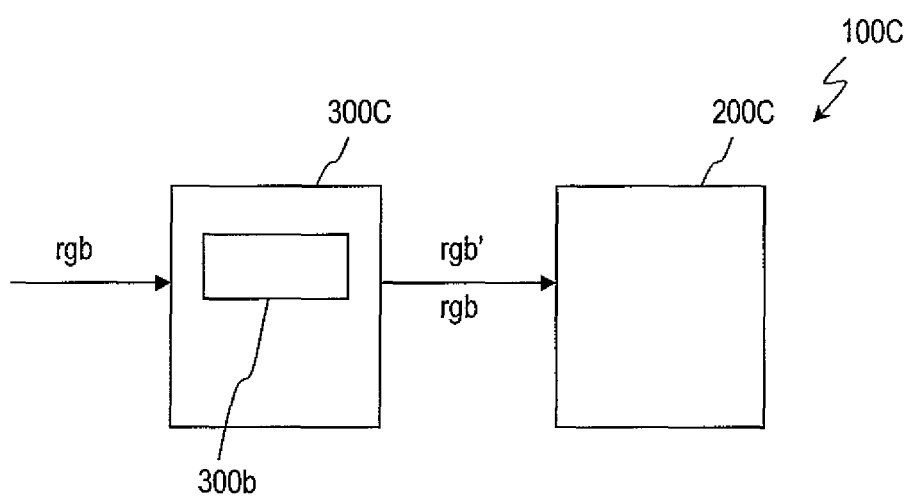
FIG. 30 is a schematic representation illustrating a liquid crystal display device as a third preferred embodiment of the present invention.

Hereinafter, a third specific preferred embodiment of a liquid crystal display device according to the present invention will be described with reference to FIG. 30. The liquid crystal display device 100C of this preferred embodiment includes an LCD panel 200C and a correcting section 300C, which also includes a blue correcting section 300b. This liquid crystal display device 100C has the same configuration as its counterpart of the first preferred embodiment described above except that each subpixel has multiple regions, of which the luminances can be different from each other, in the LCD panel 200C and two source bus lines are provided for each column of subpixels. And description of their common features will be omitted herein to avoid redundancies.

FIG. 31(a) illustrates how pixels may be arranged in the LCD panel 200C and how subpixels may be arranged in each of those pixels. In FIG. 31(a), illustrated as an example is a matrix of pixels that are arranged in three columns and three rows. Each of those pixels has three subpixels that are red, green and blue subpixels R, G and B.

In this liquid crystal display device 100C, each of the three subpixels R, G and B has two divided regions. Specifically, the red subpixel R has first and second regions Ra and Rb, the green subpixel G has first and second regions Ga and Gb, and the blue subpixel B has first and second regions Ba and Bb. The luminances of these two different regions of each subpixel are controllable independently of each other.

FIG. 31(b) illustrates a configuration for a blue subpixel B in the liquid crystal display device 100C. Although not shown in FIG. 31(b), red and green subpixels R and G also have the same configuration.

The blue subpixel B has two regions Ba and Bb that are respectively defined by divided electrodes 224x and 224y, to which TFTs 230x and 230y are respectively connected. The TFTs 230x and 230y have their respective gate electrodes connected to the same gate bus line Gate and have their respective source electrodes connected to two different source bus lines S1 and S2, respectively. Thus, while the TFTs 230x and 230y are in ON state, a voltage is applied to the divided electrodes 224x and 224y through the source bus lines S1 and S2, respectively, and the first region Ba may have a different luminance from the second region Bb.

In this LCD panel 200C, the voltage to be applied to the divided electrodes 224x and 224y can be set much more flexibly than in the LCD panel 200B described above. Thus, in this LCD panel 200C, the luminances can be controlled using multiple different regions of a single subpixel as a unit. In this LCD panel 200C, however, two source bus lines are provided for each column of subpixels and the source driver (not shown) needs to perform two different series of signal processing on the single column of subpixels.

In this LCD panel 200C, the luminances are controlled using multiple different regions of a single subpixel as a unit, and therefore, the resolution never decreases. When a middle grayscale is displayed, however, regions with low luminance may be sensed according to the pixel size and the color to be represented, and the display quality may be debased. To overcome such a problem, in this liquid crystal display device 100C, the correcting section 300C minimizes such a decline in display quality.

Figure 32:
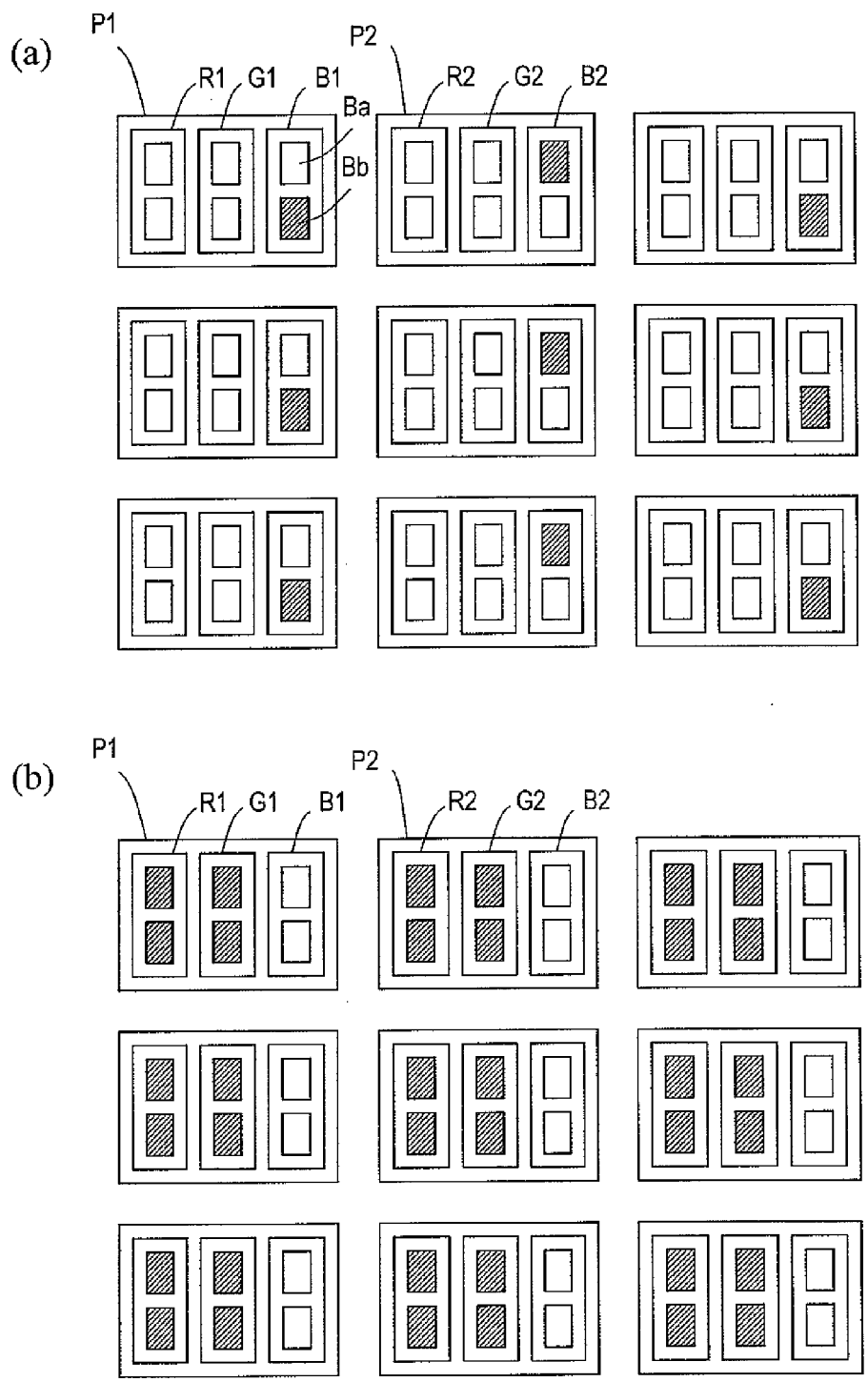
FIGS. 32(a) and 32(b) are schematic representations illustrating how the LCD panel of the liquid crystal display device shown in FIG. 30 looks when representing one color and when representing another color, respectively.

FIGS. 32(a) and 32(b) illustrate how the LCD panel 200C may look in this liquid crystal display device 100C. In FIG. 32(a), the input signal indicates that every pixel should represent the same achromatic color. On the other hand, in FIG. 32(b), the input signal indicates that every pixel should represent the same color blue. In FIGS. 32(a) and 32(b), two regions in a single subpixel are taken as an example.

First of all, it will be described with reference to FIG. 32(a) how the LCD panel 200C looks when the color indicated by the input signal is an achromatic color. In such a situation, the grayscale levels of the red, green and blue subpixels are equal to each other.

In this case, the luminances of the regions Ra and Ga of the red and green subpixels R1 and G1 are respectively equal to those of the regions Rb and Gb thereof. On the other hand, as the blue correcting section 300b shown in FIG. 30 makes a correction, the luminance of the region Ba of the blue subpixel B1 on the LCD panel 200C is different from that of the region Bb of the blue subpixel B2.

The blue correcting section 300b controls the luminance of the blue subpixel B1 using its multiple different regions as a unit and corrects the grayscale levels so that those regions Ba and Bb of the blue subpixel B1 have mutually different luminances on the LCD panel 200C.

As a result of the correction that has been made by the blue correcting section 300b, the region Ba of the blue subpixel B1 has its luminance increased by the magnitude of shift ΔSα, while the other region Bb thereof has its luminance decreased by the magnitude of shift ΔSβ. Consequently, those two regions Ba and Bb of the blue subpixel B1 have mutually different luminances. In this case, the luminance of the bright region is higher than a luminance corresponding to a reference grayscale level, while that of the dark region is lower than the luminance corresponding to the reference grayscale level. Also, when the screen is viewed straight on, for example, the first and second regions Ba and Bb have substantially the same area, the difference between the luminance of the bright region and the luminance corresponding to the reference grayscale level is substantially equal to the difference between the luminance corresponding to the reference grayscale level and the luminance of the dark region. That is why the average of the luminances of those two regions Ba and Bb on this LCD panel 200C is substantially equal to the luminance corresponding to the grayscale level of the blue subpixel as indicated by the input signal. The blue correcting section 300b makes correction in this manner, thereby improving the viewing angle characteristic when the screen is viewed obliquely. Strictly speaking, the resolution somewhat decreases as a result of the correction. However, the correcting section 300C makes the correction in a situation where the decrease in resolution is not easily sensible.

Next, it will be described with reference to FIG. 32(b) how the LCD panel 200C looks when the input signal indicates that the color blue should be represented. If the color blue is specified by the input signal, the red and green subpixels have a grayscale level of zero and the blue subpixel has a middle grayscale level.

In that case, the blue correcting section 300b does not make a correction. That is why the luminances of those two regions Ba and Bb of the blue subpixel B1 are equal to each other on the LCD panel 200C. Thus, if a decrease in resolution is easily sensible, the blue correcting section 300b never makes a correction.

Figure 33:
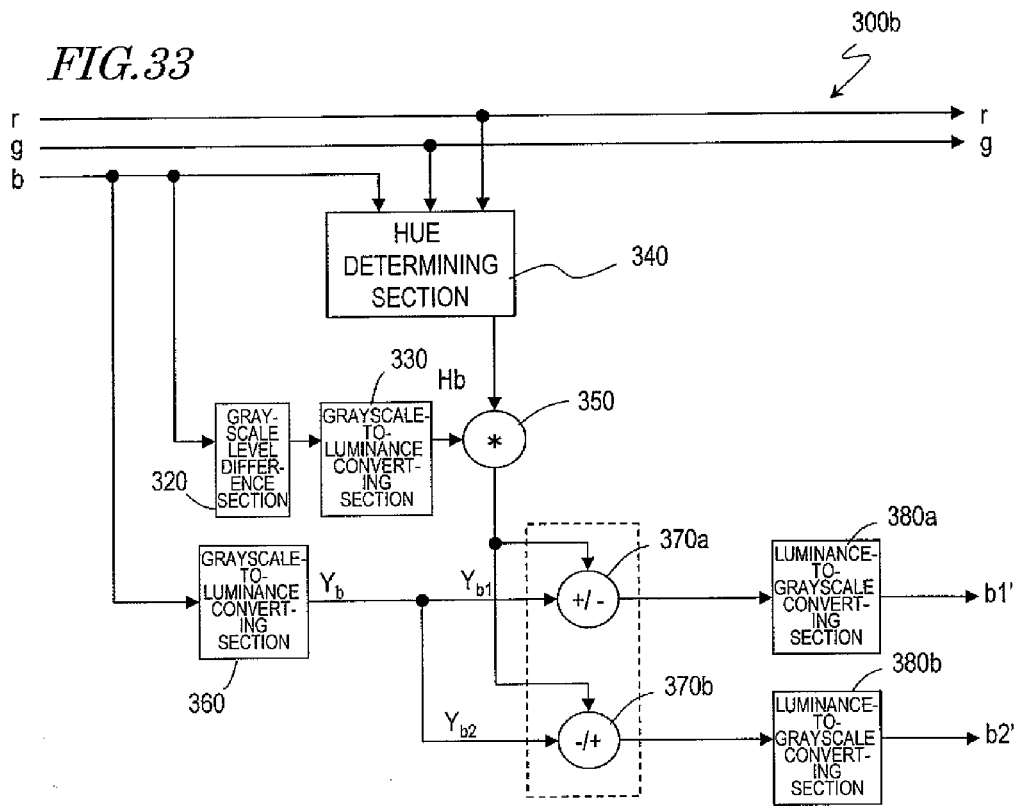
FIG. 33 is a schematic representation illustrating a configuration for the blue correcting section of the liquid crystal display device shown in FIG. 30.

FIG. 33 illustrates a specific configuration for the blue correcting section 300b. In this blue correcting section 300b, the luminance level $Y_b$ obtained by the grayscale-to-luminance converting section 360 includes luminance levels $Y_{b1}$ and $Y_{b2}$. That is why the luminance levels $Y_{b1}$ and $Y_{b2}$ are equal to each other before subjected to arithmetic operations in adding and subtracting sections 370a and 370b. In the correcting section 300C, the grayscale level b1' is associated with the region Ba of the blue subpixel B1 and the grayscale level b2' is associated with the region Bb of the blue subpixel B1.

In the LCD panel 200C described above, the number of source bus lines to provide is supposed to be double the number of columns of subpixels. However, the present invention is in no way limited to that specific preferred embodiment. Alternatively, the number of source bus lines may be the same as that of columns of subpixels and the number of gate bus lines to provide may be double the number of rows of subpixels.

Figure 34:
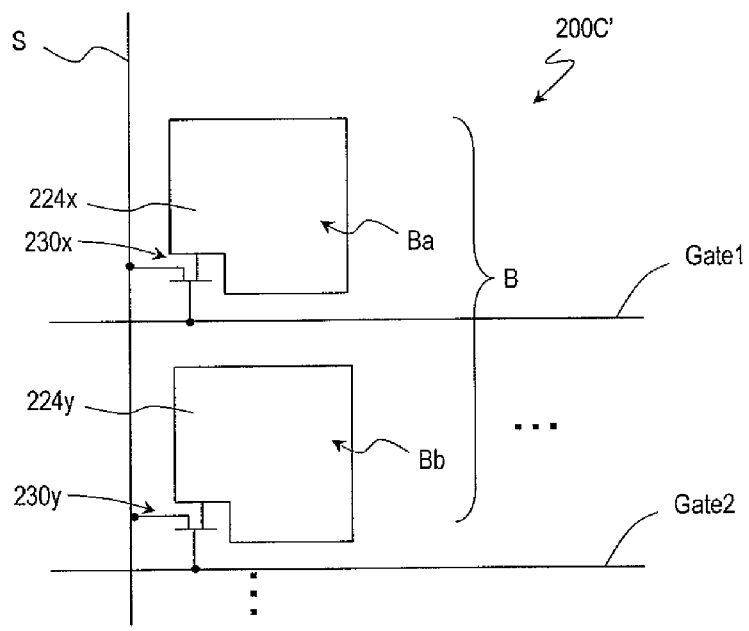
FIG. 34 is a schematic representation illustrating a liquid crystal display device as a modified example of the third preferred embodiment of the present invention.

FIG. 34 is a schematic representation illustrating an alternative LCD panel 200C'. In this LCD panel 200C', the blue subpixel B has two regions Ba and Bb that are respectively defined by divided electrodes 224x and 224y, to which TFTs 230x and 230y are respectively connected. The TFTs 230x and 230y have their respective gate electrodes connected to two different gate bus lines Gate1 and Gate2 and have their respective source electrodes connected to the same source bus line S. Thus, when the TFT 230x is in ON state, a voltage is applied to the divided electrode 224x through the source bus line S. On the other hand, when the TFT 230y is in ON state, a voltage is applied to the divided electrode 224y through the source bus line S, too. As a result, the first region Ba may have a different luminance from the second region Bb. In this manner, in this alternative LCD panel 200C', the luminances can also be controlled using two different regions of a single subpixel as a unit. However, in this LCD panel 200C', two gate bus lines need to be provided for each row of pixels and need to be driven at a high rate by a gate driver (not shown).

In the preferred embodiments of the present invention described above, each subpixel R, G or B is supposed to be split into two regions. However, the present invention is in no way limited to those specific preferred embodiments. Optionally, each subpixel R, G or B may be divided into three or more regions.

Embodiment 4

Hereinafter, a fourth preferred embodiment of a liquid crystal display device according to the present invention will be described. As shown in FIG. 35(a), the liquid crystal display device 100D of this preferred embodiment includes an LCD panel 200D and a correcting section 300D, which includes a blue correcting section 300b for controlling the luminances using, as a unit, two blue subpixels belonging to two pixels that are adjacent to each other in the row direction.

FIG. 35(b) is an equivalent circuit diagram of a region of the LCD panel 200D. In this LCD panel 200D, subpixels are arranged in columns and rows so as to form a matrix pattern. Each of those subpixels has two regions, of which the luminances may be different from each other. Since the configuration of each subpixel is the same as what has already been described with reference to FIG. 28(b), the description thereof will be omitted herein to avoid redundancies.

Now look at the subpixel that is defined by a gate bus line GBL_n representing an $n^{th}$ row and a source bus line SBL_m representing an $m^{th}$ column. Region A of that subpixel includes a liquid crystal capacitor CLCA_n,m and a storage capacitor CCSA_n,m, while region B of that subpixel includes a liquid crystal capacitor CLCB_n,m and a storage capacitor CCSB_n,m. Each liquid crystal capacitor is formed by a divided electrode 224x or 224y, a counter electrode ComLC, and a liquid crystal layer interposed between them. Each storage capacitor is formed by a storage capacitor electrode, an insulating film, and a storage capacitor counter electrode (ComCSA_n or ComCSB_n). The two divided electrodes 224x and 224y are connected to a common source bus line SBL_m by way of their associated TFTA_n,m and TFTB_n,m, respectively. The ON/OFF states of TFTA_n,m and TFTB_n,m are controlled with a scan signal voltage supplied to a common gate bus line GBL_n. When the two TFTs are ON, a display signal voltage is applied to the respective divided electrodes 224x and 224y and storage capacitor electrodes of the two regions A and B through a common source bus line. The storage capacitor counter electrode of one of the two regions A and B is connected to a storage capacitor trunk (CS trunk) CSVtype1 by way of a CS bus line CSAL and that of the other region is connected to a storage capacitor trunk (CS trunk) CSVtype2 by way of a CS bus line CSBL.

As shown in FIG. 35(b), each CS bus line is also provided for one of the two regions of each subpixel on a different row that is adjacent to the current row in the column direction. Specifically, the CS bus line CSBL is provided for not only respective regions B of the subpixels on the $n^{th}$ row but also respective regions A of the subpixels on the $(n+1)^{th}$ row that is adjacent to the $n^{th}$ row in the column direction.

In this liquid crystal display device 100D, the direction of the electric field applied to the liquid crystal layer of each subpixel inverts at regular time intervals. As for the storage capacitor counter voltages VCSVtype1 and VCSVtype2 supplied to the CS trunks CSVtype1 and CSVtype2, respectively, the first change of the voltage after the voltage on its associated arbitrary gate bus line has fallen from VgH to VgL is "increase" for the voltage VCSVtype1 but "decrease" for the voltage VCSVtype2.

Figure 36:
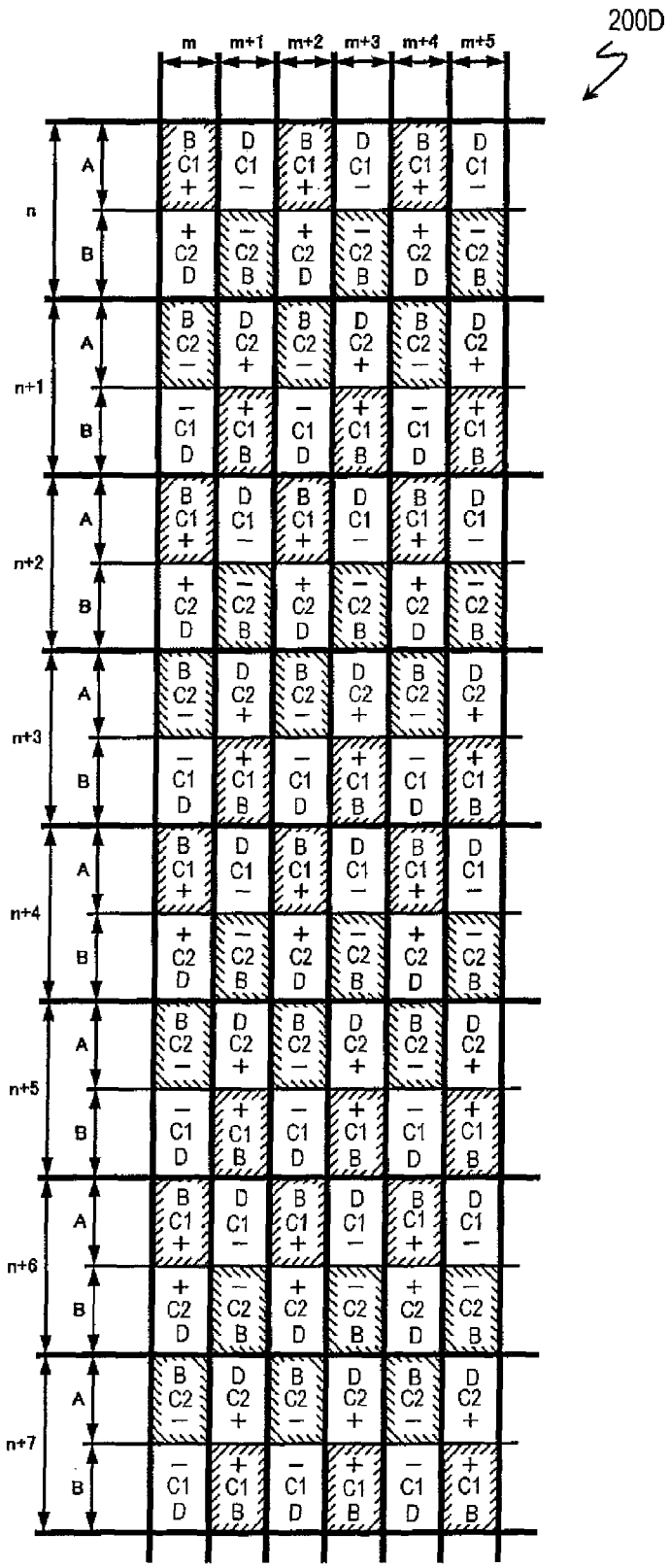
FIG. 36 is a schematic representation showing the respective polarities and brightness levels of the liquid crystal display device shown in FIG. 35.

FIG. 36 is a schematic representation of this LCD panel 200D. In FIG. 36, "B (bright)" and "D (dark)" indicate whether a region of each subpixel is a bright region or a dark region, and "C1" and "C2" indicates whether a region of each subpixel is associated with the CS trunk CSVtype1 or the CS trunk CSVtype2. Also, "+" and "−" indicate that the electric field applied to the liquid crystal layer has two different directions (i.e., two opposite polarities). That is to say, "+" indicates that the potential is higher at the counter electrode than at a subpixel electrode, while "−" indicates that the potential is higher at a subpixel electrode than at the counter electrode.

As can be seen from FIG. 36, when attention is paid to one particular subpixel, one of the two regions thereof is associated with one of the CS trunks CSVtype1 and CSVtype2, while the other region thereof is associated with the other CS trunk CSVtype1 or CSVtype2. Also, look at the arrangement of subpixels, and it can be seen that any two pixels that are adjacent to each other in either the row direction or the column direction have two opposite polarities. That is to say, subpixels of opposite polarities are arranged on a subpixel-by-subpixel basis to form a checkered pattern. Furthermore, look at the respective regions of the subpixels on one row that are associated with the CS trunk CSVtype1, and it can be seen that their brightness and polarity both invert every region. In this manner, the bright and dark regions are also arranged so as to invert their brightness on a region-by-region basis. It should be noted that the state of the LCD panel 200D in one frame is shown in FIG. 36. In the next frame, however, the polarity of each region will be inverted, thereby minimizing the flicker.

Another liquid crystal display device will now be described as Comparative Example 3. The liquid crystal display device of Comparative Example 3 has the same configuration as the liquid crystal display device 100D of this preferred embodiment except that the former device does not include the correcting section 300D.

FIG. 37(a) is a schematic representation illustrating how the liquid crystal display device of Comparative Example 3 looks when the input signal indicates that every pixel should represent an achromatic color at the same grayscale level. In the liquid crystal display device of Comparative Example 3, any two regions that are adjacent to each other in the row or column direction have mutually different grayscale levels but each pair of diagonally adjacent regions has the same grayscale level. Also, the polarity is inverted on a subpixel-by-subpixel basis in the row and column directions. FIG. 37(b) illustrates only blue subpixels of the liquid crystal display device of Comparative Example 3 for the sake of simplicity. Look at only the blue subpixels of the liquid crystal display device of Comparative Example 3, and it can be seen that any two regions that are adjacent to each other in the row or column direction have different luminance levels (or grayscale levels) and that the bright and dark regions are arranged in a checkered pattern.

Hereinafter, the liquid crystal display device 100D of this fourth preferred embodiment will be described with reference to FIGS. 36, 38, 39 and 40. In the following example, the input signal is supposed to indicate that at least blue subpixels should have the same grayscale level.

As described above, if the input signal indicates that the pixel should represent the color blue, the blue correcting section 300b does not make any correction. Look at only the blue subpixels of the LCD panel 200D in such a situation, and it can be seen that the bright and dark regions of the blue subpixels are arranged in a checkered pattern so that the brightness level inverts on a region-by-region basis as shown in FIG. 38(a). Meanwhile, the polarity inverts on a subpixel-by-subpixel basis in both of the row and column directions. It should be noted that the LCD panel 200D shown in FIG. 38(a) is the same as the schematic representation of the liquid crystal display device of Comparative Example 3 shown in FIG. 37(b).

On the other hand, if the input signal indicates that the pixel should represent an achromatic color, then the blue correcting section 300b controls the luminances using, as a unit, two blue subpixels belonging to two pixels that are adjacent to each other in the row direction so that bright blue subpixels are diagonally adjacent to each other. In that case, if attention is paid to the brightness levels of those blue subpixels, it can be seen that the bright and dark blue subpixels are arranged in a checkered pattern on a blue subpixel basis. Thus, it can be said that the blue correcting section 300b causes the respective blue subpixels to have the bright and dark pattern shown in FIG. 38(b). That is why in this LCD panel 200D, the bright and dark regions of bright blue subpixels and those of dark blue subpixels are arranged as shown in FIG. 38(c). In this case, in two diagonally adjacent bright blue subpixels, their bright regions are arranged close to each other. And if those bright regions of bright blue subpixels are arranged unevenly in this manner, the display quality may decrease.

In the example just described, the blue correcting section 300b is supposed to make a correction so that if the input signal indicates that every pixel should represent an achromatic color, the blue subpixels change their brightness level every subpixel in both of the row and column directions. However, the present invention is in no way limited to that specific preferred embodiment. Alternatively, the blue correcting section 300b may also make a correction so that the blue subpixels change their brightness level every other subpixel.

Hereinafter, it will be described with reference to FIG. 39 how the blue correcting section 300b makes such a correction. If the input signal indicates that the pixel should represent the color blue, the blue correcting section 300b does not make any correction as described above. Look at only the blue subpixels of the LCD panel 200D in such a situation, and it can be seen that the bright and dark regions of the blue subpixels are arranged in a checkered pattern so that the brightness level inverts on a region-by-region basis as shown in FIG. 39(a).

On the other hand, if the input signal indicates that the pixel should represent an achromatic color, then the blue correcting section 300b makes a correction using, as a unit, two blue subpixels belonging to two pixels that are adjacent to each other in the row direction so that the blue subpixels change their brightness level every other subpixel in the row direction (i.e., two bright blue subpixels alternate with two dark subpixels every two subpixels in the row direction). Thus, it can be said that the blue correcting section 300b causes the respective blue subpixels to have the bright and dark pattern shown in FIG. 39(b). In that case, the blue subpixels with "+" and "−" polarities include not only bright blue subpixels but also dark blue subpixels as well. That is why the unevenness of polarities and brightness levels can be reduced and the flicker can be minimized. Also, as a result of the correction made by the blue correcting section 300b, in this LCD panel 200D, the bright and dark regions of bright blue subpixels and those of dark blue subpixels are arranged as shown in FIG. 39(c). In this case, the respective bright regions of bright blue subpixels are arranged in line so as to be diagonally adjacent to each other. And if those bright regions of bright blue subpixels are arranged unevenly in this manner, the display quality may decrease.

In the example described above, the blue correcting section 300b is supposed to make a correction so that if the input signal indicates that every pixel should represent the achromatic color, each blue subpixel becomes either a bright blue subpixel or a dark blue subpixel. However, this is only an example of the present invention. Even if the input signal indicates that every pixel should represent the achromatic color, the blue correcting section 300b may also make a correction so that a portion of a blue subpixel becomes darker than a bright blue subpixel and brighter than a dark blue subpixel. Such a portion that is darker than a bright blue subpixel and brighter than a dark blue subpixel will be referred to herein as a "moderate blue subpixel".

Hereinafter, it will be described with reference to FIG. 40 how the blue correcting section 300b makes such a correction. If the input signal indicates that the pixel should represent the color blue, the blue correcting section 300b does not make any correction as described above. Look at only the blue subpixels of the LCD panel 200D in such a situation, and it can be seen that the bright and dark regions of the blue subpixels are arranged in a checkered pattern so that the brightness level inverts on a region-by-region basis as shown in FIG. 40(a).

On the other hand, if the input signal indicates that every pixel should represent the achromatic color, then the blue correcting section 300b makes a correction using, as a unit, two blue subpixels that interpose another blue subpixel. In FIG. 40(b), four blue subpixels that are arranged in the row direction are identified by B1, B2, B3 and B4, respectively. The blue correcting section 300b controls luminances using the two blue subpixels B1 and B3 as a unit but does not make any correction on the other blue subpixels B2 and B4. In that case, if attention is paid to the brightness levels of those blue subpixels that are arranged in the row direction, it can be seen that bright and dark blue subpixels are arranged alternately with a moderate blue subpixel interposed between them. Thus, it can be said that the blue correcting section 300b causes the respective blue subpixels to have the bright and dark pattern shown in FIG. 40(b). That is why in this LCD panel 200D, the bright and dark regions of bright, moderate and dark blue subpixels are arranged as shown in FIG. 40(c). If attention is paid to the brightness levels of a row of subpixels, a bright blue subpixel, a moderate blue subpixel, a dark blue subpixel and a moderate blue subpixel are arranged in this order. By having the blue correcting section 300b make such a correction, it is possible to prevent the bright regions of bright blue subpixels from being arranged unevenly and a decrease in display quality can be minimized.

Hereinafter, the liquid crystal display device 100D that makes a correction as shown in FIG. 40 will be described. FIG. 41(a) is a schematic representation illustrating the LCD panel 200D of this liquid crystal display device 100D. As described above, in the LCD panel 200D, each subpixel has multiple regions that may have mutually different luminances. However, illustration of those regions is omitted in FIG. 41(a). Also, shown in FIG. 41(a) are red, green and blue subpixels R1, G1 and B1 belonging to a pixel P1, red, green and blue subpixels R2, G2 and B2 belonging to a pixel P2, red, green and blue subpixels R3, G3 and B3 belonging to a pixel P3, and red, green and blue subpixels R4, G4 and B4 belonging to a pixel P4.

FIG. 41(b) is a schematic representation illustrating a blue correcting section 300b. In FIG. 41(b), the grayscale levels r1, g1 and b1 are indicated by the input signal for the subpixels R1, G1 and B1, respectively, which belong to the pixel P1 as shown in FIG. 41(a). The grayscale levels r2, g2 and b2 are indicated by the input signal for the subpixels R2, G2 and B2, respectively, which belong to the pixel P2. Also, the grayscale levels r3, g3 and b3 are indicated by the input signal for the subpixels R3, G3 and B3, respectively, which belong to the pixel P3 as shown in FIG. 41(a). And the grayscale levels r4, g4 and b4 are indicated by the input signal for the subpixels R4, G4 and B4, respectively, which belong to the pixel P4.

In the blue correcting section 300b, the average grayscale level $b_{ave}$ of the grayscale levels b1 and b3 is calculated by using an adding section 310b. Next, a grayscale level difference section 320 calculates two grayscale level differences $\Delta b\alpha$ and $\Delta b\beta$ with respect to the single average grayscale level $b_{ave}$. Next, a grayscale-to-luminance converting section 330 converts the grayscale level differences $\Delta b\alpha$ and $\Delta b\beta$ into luminance level differences $\Delta Y_b\alpha$ and $\Delta Y_b\beta$, respectively.

Meanwhile, the average grayscale level $r_{ave}$ of the grayscale levels r1 and r3 is calculated by using an adding section 310r. And the average grayscale level $g_{ave}$ of the grayscale levels g1 and g3 is calculated by using an adding section 310g. Then, a hue determining section 340 calculates a hue coefficient Hb based on these average grayscale levels $r_{ave}$, $g_{ave}$ and $b_{ave}$.

Next, the magnitudes of shift $\Delta S\alpha$ and $\Delta S\beta$ are calculated. In this case, the magnitude of shift $\Delta S\alpha$ is obtained as the product of $\Delta Y_b\alpha$ and the hue coefficient Hb, while the magnitude of shift $\Delta S\beta$ is obtained as the product of $\Delta_b\beta$ and the hue coefficient 510. A multiplying section 350 multiplies the luminance level differences $\Delta Y_b\alpha$ and $\Delta Y_b\beta$ by the hue coefficient Hb, thereby obtaining the magnitudes of shift $\Delta S\alpha$ and $\Delta S\beta$.

Meanwhile, a grayscale-to-luminance converting section 360a carries out a grayscale-to-luminance conversion on the grayscale level b1, thereby obtaining a luminance level $Y_{b1}$. In the same way, another grayscale-to-luminance converting section 360b carries out a grayscale-to-luminance conversion on the grayscale level b3, thereby obtaining a luminance level $Y_{b3}$. Next, an adding and subtracting section 370a adds the luminance level $Y_{b1}$ and the magnitude of shift $\Delta S\alpha$ together, and then the sum is subjected to luminance-to-grayscale conversion by a luminance-to-grayscale converting section 380a, thereby obtaining a grayscale level b1'. On the other hand, another adding and subtracting section 370b subtracts the magnitude of shift $\Delta S\beta$ from the luminance level $Y_{b3}$, and then the remainder is subjected to luminance-to-grayscale conversion by another luminance-to-grayscale converting section 380b, thereby obtaining a grayscale level b3'. No correction is made on the grayscale levels r1 to r4, g1 to g4, b2, and b4. By having the blue correcting section 300b make such a correction, it is possible to prevent the bright regions of bright blue subpixels from being arranged unevenly and a decrease in display quality can be minimized.

Figure 42:
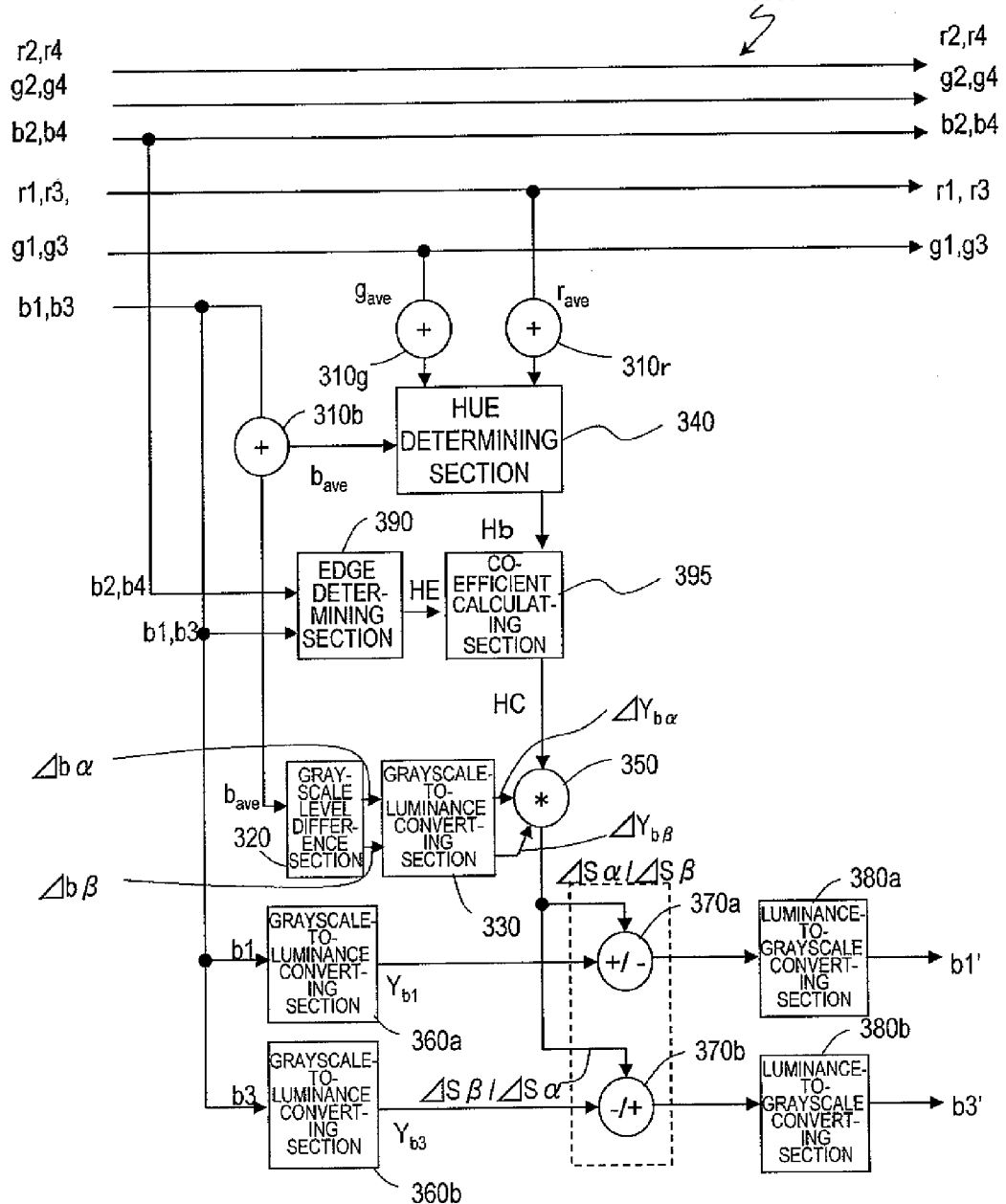
FIG. 42 is a schematic representation illustrating a configuration for the blue correcting section of a liquid crystal display device as a modified example of the fifth preferred embodiment of the present invention.

It is preferred that edge processing be further performed. FIG. 42 is a schematic representation illustrating an alternative correcting section 300b', which has the same configuration as the blue correcting section 300b except that this correcting section 300b' further includes the edge determining section 390 and coefficient calculating section 395 that have already been described with reference to FIG. 16. Thus, description of their common features will be omitted herein to avoid redundancies.

The edge determining section 390 obtains an edge coefficient HE based on the grayscale levels b1 to b4 indicated by the input signal. In this case, the edge coefficient is a function that increases as the difference between the grayscale levels b1 to b4 increases. And the edge coefficient HE may be represented as HE=(MAX (b1, b2, b3, b4)−MIN (b1, b2, b3, b4))/MAX (b1, b2, b3, b4), for example. However, the edge coefficient HE may also be obtained by any other method and may be calculated based on only the grayscale levels b1 and b3.

Next, the coefficient calculating section 395 calculates a correction coefficient HC based on the hue coefficient Hb that has been obtained by the hue determining section 340 and the edge coefficient HE that has been obtained by the edge determining section 390. The correction coefficient HC may be represented as HC=Hb−HE, for example. The grayscale levels b1 and b3 are corrected just as described above using this correction coefficient HC. The edge processing may be performed in this manner.

Embodiment 5

The liquid crystal display device 100D described above controls the luminances by using, as a unit, two blue subpixels belonging to two pixels that are arranged in the row direction. However, the present invention is in no way limited to that specific preferred embodiment. Alternatively, the luminances may also be controlled by using, as a unit, two blue subpixels belonging to two pixels that are arranged in the column direction.

Hereinafter, a fifth specific preferred embodiment of a liquid crystal display device according to the present invention will be described with reference to FIG. 43. Specifically, FIG. 43(a) is a schematic representation illustrating a liquid crystal display device 100E according to this preferred embodiment. This liquid crystal display device 100E includes an LCD panel 200F and a correcting section 300E, which includes a blue correcting section 300b".

FIG. 43(b) is a schematic representation illustrating the LCD panel 200F, in which each subpixel has multiple regions that may have mutually different luminances. A pixel P3 consisting of red, green and blue subpixels R3, G3 and B3 is arranged adjacent in the column direction to a pixel P1 consisting of red, green and blue subpixels R1, G1 and B1. Likewise, a pixel P4 consisting of red, green and blue subpixels R4, G4 and B4 is arranged adjacent in the column direction to a pixel P2 consisting of red, green and blue subpixels R2, G2 and B2.

Even in a situation where the blue correcting section 300b" controls the luminances by using, as a unit, two blue subpixels belonging to two pixels that are adjacent to each other in the column direction, if the blue correcting section 300b" gives the bright and dark pattern shown in FIG. 38(b) to the blue subpixels, then the bright regions of the bright blue subpixels will be arranged unevenly as shown in FIG. 38(c). That is why it is preferred that the blue correcting section 300b" give the bright and dark pattern shown in FIG. 40(b) to the blue subpixels.

Hereinafter, the blue correcting section 300b" of the liquid crystal display device 100E of this preferred embodiment will be described with reference to FIG. 44. As shown in FIG. 44(a), the blue correcting section 300b includes first-stage line memories 300s, a grayscale control section 300t, and second-stage line memories 300u. The grayscale levels r1, g1 and b1 are indicated by the input signal for the subpixels R1, G1 and B1, respectively, which belong to the pixel P1 as shown in FIG. 43(b). The grayscale levels r2, g2 and b2 are indicated by the input signal for the subpixels R2, G2 and B2, respectively, which belong to the pixel P2. Also, the grayscale levels r3, g3 and b3 are indicated by the input signal for the subpixels R3, G3 and B3, respectively, which belong to the pixel P3 as shown in FIG. 43(b). And the grayscale levels r4, g4 and b4 are indicated by the input signal for the subpixels R4, G4 and B4, respectively, which belong to the pixel P4. The first-stage line memories 300s delay the input of the grayscale levels r1, g1, b1, r2, g2 and b2 to the grayscale control section 300t by one line.

FIG. 44(b) is a schematic representation illustrating the grayscale control section 300t. In the grayscale control section 300t, the average grayscale level $b_{ave}$ of the grayscale levels b1 and b3 is calculated by using an adding section 310b. Next, a grayscale level difference section 320 calculates two grayscale level differences $\Delta b\alpha$ and $\Delta b\beta$ with respect to the single average grayscale level $b_{ave}$. Next, a grayscale-to-luminance converting section 330 converts the grayscale level differences $\Delta b\alpha$ and $\Delta b\beta$ into luminance level differences $\Delta Y_b\alpha$ and $\Delta Y_b\beta$, respectively.

Meanwhile, the average grayscale level $r_{ave}$ of the grayscale levels r1 and r3 is calculated by using an adding section 310r. And the average grayscale level $g_{ave}$ of the grayscale levels g1 and g3 is calculated by using an adding section 310g. Then, a hue determining section 340 calculates a hue coefficient Hb based on these average grayscale levels $r_{ave}$, $g_{ave}$ and $b_{ave}$.

Next, a multiplying section 350 multiplies the luminance level differences $\Delta Y_b \alpha$ and $\Delta Y_b \beta$ by the hue coefficient Hb, thereby obtaining the magnitudes of shift $\Delta S\alpha$ and $\Delta S\beta$. Meanwhile, a grayscale-to-luminance converting section 360a carries out a grayscale-to-luminance conversion on the grayscale level b1, thereby obtaining a luminance level $Y_{b1}$. In the same way, another grayscale-to-luminance converting section 360b carries out a grayscale-to-luminance conversion on the grayscale level b3, thereby obtaining a luminance level $Y_{b3}$. Next, an adding and subtracting section 370a adds the luminance level $Y_{b1}$ and the magnitude of shift $\Delta S\alpha$ together, and then the sum is subjected to luminance-to-grayscale conversion by a luminance-to-grayscale converting section 380a, thereby obtaining a grayscale level b1'. On the other hand, another adding and subtracting section 370b subtracts the magnitude of shift $\Delta S\beta$ from the luminance level $Y_{b3}$, and then the remainder is subjected to luminance-to-grayscale conversion by another luminance-to-grayscale converting section 380b, thereby obtaining a grayscale level b3'. By having the blue correcting section 300b'' make such a correction, it is possible to prevent the bright regions of bright blue subpixels from being arranged unevenly and a decrease in display quality can be minimized.

Figure 45:
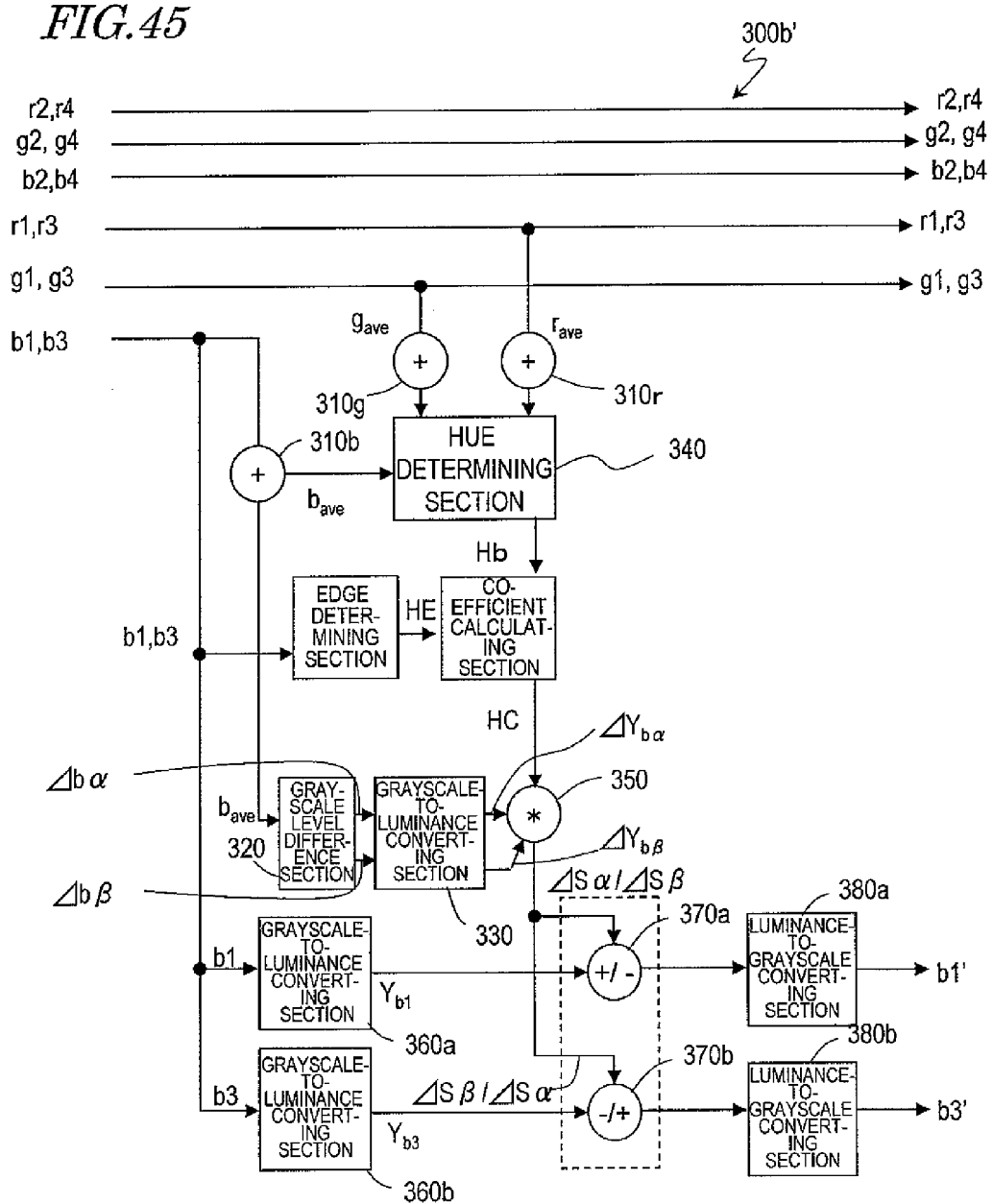
FIG. 45 is a schematic representation illustrating a configuration for the blue correcting section of a liquid crystal display device as a modified example of the fifth preferred embodiment of the present invention.

It is preferred that edge processing be further performed. FIG. 45 is a schematic representation illustrating an alternative blue correcting section 300b', which has the same configuration as the blue correcting section 300b'' shown in FIG. 44 except that this correcting section 300b' further includes the edge determining section 390 and coefficient calculating section 395 that have already been described with reference to FIG. 16. Thus, description of their common features will be omitted herein to avoid redundancies.

The edge determining section 390 obtains an edge coefficient HE based on the grayscale levels b1 to b3 indicated by the input signal. In this case, the edge coefficient HE may be represented as HE=(MAX(b1,b3)−MIN(b1,b3))/MAX(b1,b3). However, the edge coefficient HE may also be obtained by any other method.

Next, the coefficient calculating section 395 calculates a correction coefficient HC based on the hue coefficient Hb that has been obtained by the hue determining section 340 and the edge coefficient HE that has been obtained by the edge determining section 390. The correction coefficient HC may be represented as HC=Hb−HE, for example. The grayscale levels b1 and b3 are corrected just as described above using this correction coefficient HC. The edge processing may be performed in this manner.

Embodiment 6

In the first through fifth preferred embodiments of the present invention described above, a display operation is supposed to be performed using three primary colors per pixel. However, the present invention is in no way limited to those specific preferred embodiments. Alternatively, a display operation may also be performed using four or more primary colors per pixel. For example, each pixel may include red, green, blue, yellow, cyan and magenta subpixels.

Figure 46:
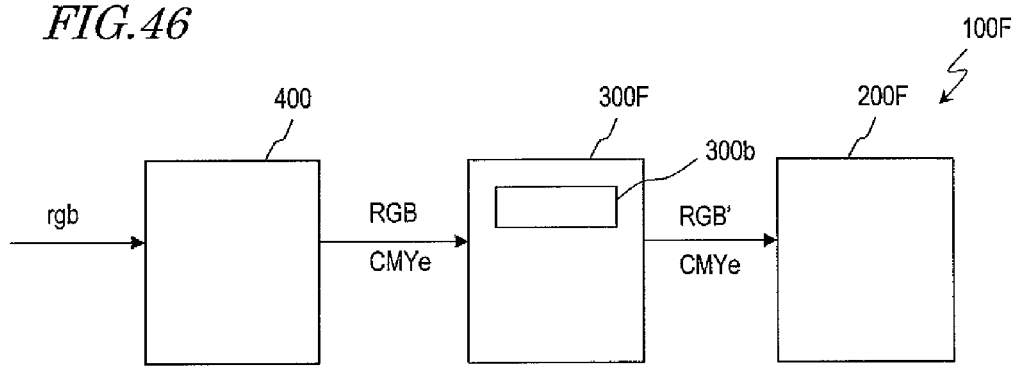
FIG. 46 is a schematic representation illustrating a liquid crystal display device as a sixth preferred embodiment of the present invention.

FIG. 46 is a schematic representation illustrating a liquid crystal display device as a sixth preferred embodiment of the present invention. The liquid crystal display device 100F of this preferred embodiment includes a multi-primary-color display panel 200F and a correcting section 300F, which includes a blue correcting section 300b for controlling the luminance using two blue subpixels as a unit.

FIG. 47(a) is a schematic representation illustrating the multi-primary-color display panel 200F. Although each subpixel actually has multiple regions with mutually different luminances, illustration of those regions is omitted in FIG. 47(a).

In the multi-primary-color display panel 200F, each pixel includes red (R), green (G), blue (B), yellow (Ye), cyan (C) and magenta (M) subpixels. One row is formed by red, green, magenta, cyan, blue and yellow subpixels that belong to one pixel and that are arranged in this order in the row direction. The adjacent next row is formed by cyan, blue, yellow, red, green and magenta subpixels that belong to another pixel and that are arranged in this order in the row direction. Look at two adjacent rows of subpixels in this multi-primary-color display panel 200F, and it can be seen that one row of subpixels are shifted from the adjacent row of subpixels by three subpixels. Also, when attention is paid to arrangements of subpixels in the column direction, it can be seen that red and cyan subpixels alternate with each other, green and blue subpixels also alternate with each other, and magenta and yellow subpixels also alternate with each other. It should be noted that the six subpixels do not have to be arranged in this manner. However, it is preferred that at least blue subpixels be arranged at regular intervals over multiple pixels.

In this liquid crystal display device 100F, the luminances are controlled by using, as a unit, two blue subpixels belonging to two pixels that are adjacent to each other in the column direction. FIG. 47(b) schematically illustrates how the multi-primary-color display panel 200F looks in a situation where the input signal indicates that every pixel should represent an achromatic color at the same grayscale level. In FIG. 47(b), those pairs of blue subpixels, of which the luminances need to be controlled, are indicated by the arrows. In FIG. 47(b), the non-shadowed blue subpixels are bright blue subpixels and the shadowed ones are dark blue subpixels. Using two blue subpixels belonging to two pixels that are adjacent to each other in the column direction as a unit, the liquid crystal display device 100F controls the luminances so that bright blue subpixels are arranged in the row direction. Consequently, it is possible to prevent the bright blue subpixels from being arranged unevenly and a substantial decrease in the resolution of the color blue can be minimized.

Figure 47:
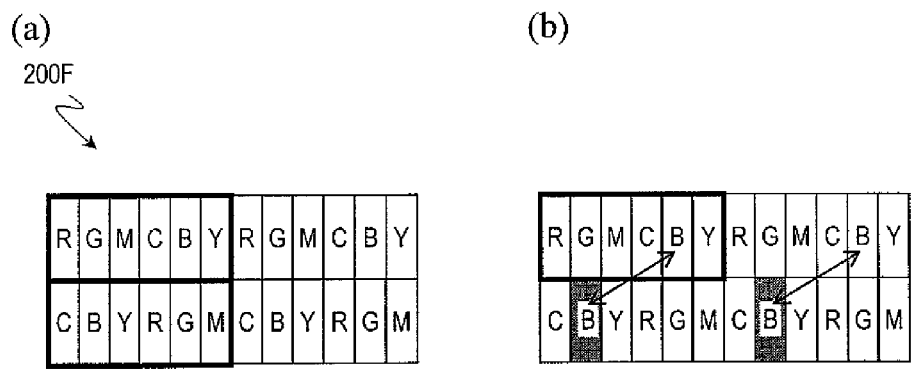
FIG. 47(a) is a schematic representation illustrating how subpixels may be arranged in the multi-primary-color display panel of the liquid crystal display device shown in FIG. 46
FIG. 47(b) is a schematic representation illustrating where blue subpixels, of which the luminances need to be controlled, are located with respect to bright blue subpixels.

Also, in the multi-primary-color display panel 200F shown in FIG. 47, subpixels belonging to a single pixel are arranged in a row. However, this is just an example of the present invention. Alternatively, subpixels belonging to a single pixel may also be arranged in multiple rows.

Figure 48:
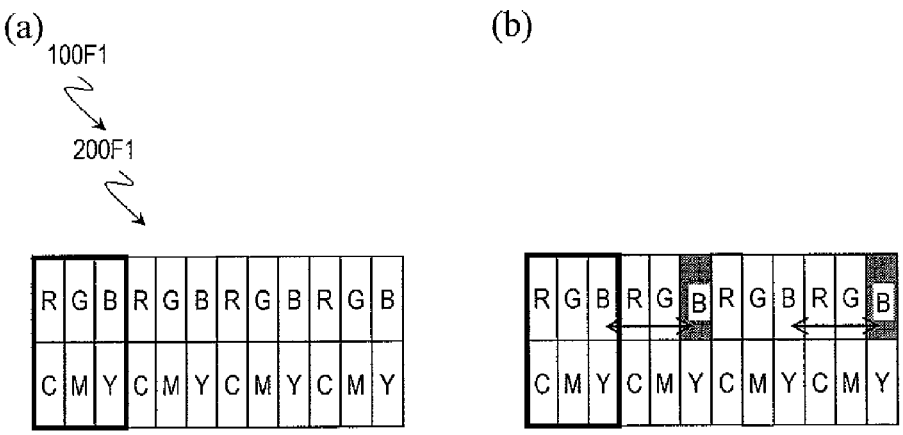
FIG. 48(a) is a schematic representation illustrating how subpixels may be arranged in the multi-primary-color display panel of a liquid crystal display device as a modified example of the sixth preferred embodiment and FIG. 48(b) is a schematic representation illustrating where blue subpixels, of which the luminances need to be controlled, are located with respect to bright blue subpixels.

FIG. 48(a) is a schematic representation illustrating a multi-primary-color display panel 200F1 for a liquid crystal display device 100F1. In this multi-primary-color display panel 200F1, subpixels included in a single pixel are arranged in three columns and two rows. Specifically, red, green and blue subpixels belonging to the same pixel are arranged in this order in a row in the row direction, and cyan, magenta and yellow subpixels belonging to that pixel are arranged in this order in the adjacent next row in the row direction. Look at the arrangement of subpixels in the column direction, and it can be seen that red and cyan subpixels are arranged alternately, green and magenta subpixels are also arranged alternately, and blue and yellow subpixels are also arranged alternately. As shown in FIG. 48(b), this liquid crystal display device 100F1 controls the luminances by using, as a unit, two blue subpixels belonging to two pixels that are adjacent to each other in the row direction so that bright and dark blue subpixels alternate with each other in the row direction. Consequently, it is possible to prevent the bright blue subpixels from being arranged unevenly and a substantial decrease in the resolution of the color blue can be minimized.

Optionally, each pixel may also consist of first red, green, blue, yellow, cyan and second red subpixels. In the multi-primary-color display panels 200F and 200F1 described above, each pixel is supposed to consist of six subpixels. However, the present invention is in no way limited to that specific preferred embodiment. Alternatively, in a multi-primary-color display panel, one pixel may be made up of four subpixels, too.

FIG. 49(*a*) is a schematic representation illustrating a multi-primary-color display panel 200F2 for a liquid crystal display device 100F2. In this multi-primary-color display panel 200F2, each pixel consists of red (R), green (G), blue (B) and yellow (Y) subpixels, which are arranged in this order in a row in the row direction. Look at the arrangement of subpixels in the column direction, and it can be seen that subpixels representing the same color are arranged. As shown in FIG. 49(*b*), this liquid crystal display device 100F2 controls the luminances by using, as a unit, two blue subpixels belonging to two pixels that are adjacent to each other in the row direction so that bright blue subpixels are diagonally adjacent to each other. Consequently, it is possible to prevent the bright blue subpixels from being arranged unevenly and a substantial decrease in the resolution of the color blue can be minimized.

In the multi-primary-color display panel 200F2 shown in FIG. 49, subpixels to represent the same color are arranged in the column direction. However, the present invention is in no way limited to that specific preferred embodiment. Alternatively, subpixels representing mutually different colors may also be arranged in the column direction.

FIG. 50(*a*) is a schematic representation illustrating a multi-primary-color display panel 200F3 for a liquid crystal display device 100F3. In the multi-primary-color display panel 200F3, one row is formed by red, green, blue and yellow subpixels that belong to one pixel and that are arranged in this order in the row direction. The adjacent next row is formed by blue, yellow, red, and green subpixels that belong to another pixel and that are arranged in this order in the row direction. Look at two adjacent rows of subpixels, and it can be seen that one row of subpixels are shifted from the adjacent row of subpixels by two subpixels. Also, when attention is paid to arrangements of subpixels in the column direction, it can be seen that red and blue subpixels alternate with each other and green and yellow subpixels also alternate with each other. It should be noted that the four subpixels do not have to be arranged in this manner. However, it is preferred that at least blue subpixels be arranged at regular intervals over multiple pixels.

If the luminances are controlled by using, as a unit, two blue subpixels belonging to two pixels that are adjacent to each other in the row direction so that bright blue subpixels are diagonally adjacent to each other, several blue subpixels will be located spatially closest to a particular bright blue subpixel and some of those blue subpixels will be bright blue subpixels. That is to say, bright blue subpixels will be arranged unevenly in that case. Also, even if the luminances are controlled as shown in FIG. 50(*b*) by using, as a unit, two blue subpixels belonging to two pixels that are adjacent to each other in the row direction so that bright blue subpixels belong to pixels that are adjacent to each other in the column direction, bright blue subpixels will also be arranged unevenly. However, if the luminances are controlled as shown in FIG. 50(*c*) by using, as a unit, two blue subpixels belonging to two pixels that are adjacent to each other in the column direction so that bright blue subpixels are arranged in the row direction, it is possible to prevent the bright blue subpixels from being arranged unevenly and a substantial decrease in the resolution of the color blue can be minimized.

Also, in the multi-primary-color display panels 200F2 and 200F3 shown in FIGS. 49 and 50, subpixels belonging to a single pixel are arranged in a row. However, this is just an example of the present invention. Alternatively, subpixels belonging to a single pixel may also be arranged in multiple rows.

FIG. 51(*a*) is a schematic representation illustrating a multi-primary-color display panel 200F4 for a liquid crystal display device 100F4. In this multi-primary-color display panel 200F4, subpixels included in a single pixel are arranged in two columns and two rows. Specifically, red and green subpixels belonging to the same pixel are arranged in this order in a row in the row direction and blue and yellow subpixels belonging to that pixel are arranged in this order in an adjacent row in the row direction. Look at the arrangement of subpixels in the column direction, and it can be seen that red and blue subpixels are arranged alternately and green and yellow subpixels are arranged alternately. As shown in FIG. 51(*b*), in this liquid crystal display device 100F4, the luminances are controlled by using, as a unit, two blue subpixels belonging to two pixels that are adjacent to each other in the row direction so that bright blue subpixels are diagonally adjacent to each other. Consequently, it is possible to prevent the bright blue subpixels from being arranged unevenly and a substantial decrease in the resolution of the color blue can be minimized.

In the multi-primary-color display panels 200F2, 200F3 and 200F4 shown in FIGS. 49, 50 and 51, each pixel consists of red, green, blue and yellow subpixels. However, this is only an example of the present invention. Alternatively, each pixel may include a white subpixel instead of the yellow subpixel.

In the preferred embodiments described above, each of the correcting sections 300B, 300C, 300D, 300E and 300F includes a blue correcting section 300*b*. However, the present invention is in no way limited to those specific preferred embodiments. Alternatively, as already described with reference to FIGS. 24 and 25, each of these correcting sections may include at least one of a red correcting section 300*r* and a green correcting section 300*g* instead of, or in addition to, the blue correcting section 300*b*.

Furthermore, in the preferred embodiments described above, the liquid crystal layer is supposed to be a vertical alignment liquid crystal layer. However, the present invention is in no way limited to those specific preferred embodiments. If necessary, a liquid crystal layer of any other mode may also be used.

The entire disclosures of Japanese Patent Applications Nos. 2008-335247 and 2009-132499, from which the present application claims priority, are hereby incorporated by reference.

INDUSTRIAL APPLICABILITY

The present invention provides a liquid crystal display device that can improve the viewing angle characteristic and minimize a decline in display quality.

REFERENCE SIGNS LIST 100 liquid crystal display device
200 LCD panel
300 correcting section

The invention claimed is:

1. A liquid crystal device having multiple pixels including first and second pixels that are arranged adjacent to each other,
   wherein each said pixel includes a number of subpixels including first, second and third subpixels, and
   wherein the average luminance of the respective third subpixels of the first and second pixels when an input signal indicates that each of the first and second pixels should represent a first color is substantially equal to that of the respective third subpixels of the first and second pixels when the input signal indicates that each of the first and second pixels should represent a second color, which is different from the first color, and
   wherein when the input signal indicates that each of the first and second pixels should represent the first color, the luminances of the respective third subpixels of the first and second pixels are different from each other, and
   wherein when the input signal indicates that each of the first and second pixels should represent the second color, the luminances of the respective third subpixels of the first and second pixels are substantially equal to each other.

2. The liquid crystal display device of claim 1, wherein the difference in luminance between the respective third subpixels of the first and second pixels changes according to at least one of the average luminance of the respective first subpixels of the first and second pixels and that of the respective second subpixels of the first and second pixels.

3. The liquid crystal display device of claim 1, wherein when the input signal indicates that each of the first and second pixels should represent the first color, the respective first and second subpixels of the first and second pixels are in ON state.

4. The liquid crystal display device of claim 1, wherein when the input signal indicates that each of the first and second pixels should represent the second color, the respective first and second subpixels of the first and second pixels are in OFF state.

5. The liquid crystal display device of claim 1, wherein the first, second and third subpixels are red, green and blue subpixels, respectively.

6. The liquid crystal display device of claim 1, wherein the first color is an achromatic color and the second color is blue.

7. The liquid crystal display device of claim 1, further comprising:
   first, second and third subpixel electrodes that define the first, second and third subpixels, respectively; and
   source bus lines, which are provided for the first, second and third subpixel electrodes, respectively.

8. The liquid crystal display device of claim 1, wherein each of the first, second and third subpixels has multiple regions that are able to have mutually different luminances.

9. The liquid crystal display device of claim 8, further comprising:
   first, second and third subpixel electrodes, which define the first, second and third subpixels, respectively, and each of which has divided electrodes that define the multiple regions;
   source bus lines, which are provided for the first, second and third subpixel electrodes, respectively; and
   storage capacitor bus lines, which are provided for the respective divided electrodes of the first, second and third subpixel electrodes.

10. The liquid crystal display device of claim 1, wherein the multiple pixels are arranged in columns and rows to form a matrix pattern, and
    wherein the multiple pixels further include a third pixel, which is adjacent to the first pixel in one of row and column directions and which is diagonally adjacent to the second pixel, and a fourth pixel, which is adjacent to the third and second pixels in the one direction and in the other direction, respectively, and
    wherein when the input signal indicates that each of the third and fourth pixels should represent the first color, the luminances of the respective third subpixels of the third and fourth pixels are substantially equal to each other.

11. The liquid crystal display device of claim 1, wherein either the input signal or a signal obtained by converting the input signal indicates the respective grayscale levels of the multiple subpixels that are included in each of the multiple pixels, and
    wherein the grayscale levels of the respective third subpixels of the first and second pixels, which are indicated by either the input signal or the converted signal, are corrected according to the hues of the first and second pixels that are also indicated by the input signal.

12. The liquid crystal display device of claim 1, wherein either the input signal or a signal obtained by converting the input signal indicates the respective grayscale levels of the multiple subpixels that are included in each of the multiple pixels, and
    wherein the grayscale levels of the respective third subpixels of the first and second pixels, which are indicated by either the input signal or the converted signal, are corrected according to not only the hues of the first and second pixels that are also indicated by the input signal but also a difference in grayscale level between the respective third subpixels of the first and second pixels, which is also indicated by the input signal.

13. The liquid crystal display device of claim 1, wherein if the input signal indicates that the third subpixel of one of the first and second pixels has a first grayscale level and that the third subpixel of the other pixel has either the first grayscale level or a second grayscale level, which is higher than the first grayscale level, then the luminances of the respective third subpixels of the first and second pixels are different from ones that are associated with the grayscale levels indicated by either the input signal or the signal obtained by converting the input signal, and
    wherein if the input signal indicates that the third subpixel of the one pixel has the first grayscale level and that the third subpixel of the other pixel has a third grayscale level, which is higher than the second grayscale level, then the luminances of the respective third subpixels of the first and second pixels are substantially equal to ones that are associated with the grayscale levels indicated by either the input signal or the signal obtained by converting the input signal.

14. A liquid crystal device comprising a pixel that has a number of subpixels including first, second and third subpixels,
    wherein each of the first, second and third subpixels has a number of regions including first and second regions that are able to have mutually different luminances, and
    wherein the average luminance of the first and second regions of the third subpixel when an input signal indicates that the pixel should represent a first color is substantially equal to that of the first and second regions of the third subpixel when the input signal indicates that the pixel should represent a second color, which is different from the first color, and wherein when the input signal indicates that the pixel should represent the first color, the luminances of the first and second regions of the third subpixel are different from each other, and wherein when the input signal indicates that the pixel should represent the second color, the luminances of the first and second regions of the third subpixel are substantially equal to each other.

15. The liquid crystal display device of claim 14, further comprising:
   first, second and third subpixel electrodes, which define the first, second and third subpixels, respectively, and each of which has first and second divided electrodes that define the first and second regions, respectively; and
   source bus lines, which are provided for the first and second divided electrodes of the first, second and third subpixel electrodes, respectively.

16. The liquid crystal display device of claim 14, further comprising:
   first, second and third subpixel electrodes, which define the first, second and third subpixels, respectively, and each of which has first and second divided electrodes that define the first and second regions, respectively;
   source bus lines, which are provided for the first, second and third subpixel electrodes, respectively; and
   gate bus lines, which are provided for the respective first and second divided electrodes of the first, second and third subpixel electrodes.

17. The liquid crystal display device of claim 14, wherein the first, second and third subpixels are red, green and blue subpixels, respectively.

18. A liquid crystal display device comprising multiple pixels that are arranged in columns and rows to form a matrix pattern,
   wherein the multiple pixels include first, second, third and fourth pixels, which are arranged in this order along either one of the columns or one of the rows, and
   wherein each of the pixels has a number of subpixels including first, second and third subpixels, and
   wherein the average luminance of the respective third subpixels of the first and third pixels when an input signal indicates that each of the first and third pixels should represent a first color is substantially equal to that of the respective third subpixels of the first and third pixels when the input signal indicates that each of the first and third pixels should represent a second color, which is different from the first color, and
   wherein when the input signal indicates that each of the first and third pixels should represent the first color, the luminances of the respective third subpixels of the first and third pixels are different from each other, and
   wherein when the input signal indicates that each of the first and third pixels should represent the second color, the luminances of the respective third subpixels of the first and third pixels are substantially equal to each other.

19. The liquid crystal display device of claim 18, wherein the luminance of the respective third subpixels of the second and fourth pixels is substantially equal to a one that is associated with a grayscale level indicated by either the input signal or a signal obtained by converting the input signal.

* * * * *